(12) United States Patent
Liu et al.

(10) Patent No.: US 12,437,199 B2
(45) Date of Patent: Oct. 7, 2025

(54) ACTIVATION COMPRESSION METHOD FOR DEEP LEARNING ACCELERATION

(71) Applicant: Arm Limited, Cambridge (GB)

(72) Inventors: Zhi-Gang Liu, Westford, MA (US); Matthew Mattina, Boylston, MA (US)

(73) Assignee: Arm Limited, Cambridge, MA (US)

( * ) Notice: Subject to any disclaimer, the term of this patent is extended or adjusted under 35 U.S.C. 154(b) by 1062 days.

(21) Appl. No.: 17/157,319

(22) Filed: Jan. 25, 2021

(65) Prior Publication Data

US 2022/0164663 A1    May 26, 2022

Related U.S. Application Data

(60) Provisional application No. 63/117,728, filed on Nov. 24, 2020.

(51) Int. Cl.
| | |
|---|---|
| G06N 3/082 | (2023.01) |
| G06F 7/523 | (2006.01) |
| G06F 9/50 | (2006.01) |
| G06F 17/16 | (2006.01) |
| G06N 3/084 | (2023.01) |

(52) U.S. Cl.
CPC .......... *G06N 3/082* (2013.01); *G06F 7/523* (2013.01); *G06F 9/5027* (2013.01); *G06F 17/16* (2013.01); *G06N 3/084* (2013.01)

(58) Field of Classification Search
CPC ........ G06N 3/082; G06N 3/084; G06F 7/523; G06F 9/5027; G06F 17/16
See application file for complete search history.

(56) References Cited

U.S. PATENT DOCUMENTS

| | | | | |
|---|---|---|---|---|
| 2017/0344876 A1* | 11/2017 | Brothers | ................ | G06N 3/082 |
| 2019/0050734 A1* | 2/2019 | Li | ............. | G06N 3/04 |

(Continued)

FOREIGN PATENT DOCUMENTS

| | | | | |
|---|---|---|---|---|
| WO | WO-2020014590 A1 * | 1/2020 | ............... | G06N 3/04 |
| WO | WO-2020190772 A1 * | 9/2020 | ............. | G06N 3/045 |

OTHER PUBLICATIONS

Jeongmyung Lee, (Apr. 2020). Optimization of GPU-based Sparse Matrix Multiplication for Large Sparse Networks. (Year: 2020).*

(Continued)

*Primary Examiner* — Li B. Zhen
*Assistant Examiner* — Sadik A Alshahari
(74) *Attorney, Agent, or Firm* — Leveque Intellectual Property Law, P.C.

(57) ABSTRACT

A system and method for multiplying matrices, and method for training a convolutional neural network (CNN), are provided. The system includes a processor and a matrix multiply accelerator (MMA). The processor is configured to generate, based on an input tensor, a number of basic block matrices, each basic block matrix including a number of elements; for each basic block matrix: prune, based on a sparsity value, the elements of the basic block matrix, generate a mask for the basic block matrix, each mask including a number of bits, each bit corresponding to a different element of the basic block matrix, and compress the basic block matrix to generate a compressed basic block matrix having fewer elements than the basic block matrix. The MMA is configured to multiply, based on the masks, the compressed basic block matrices and a weight matrix to generate an output matrix.

17 Claims, 23 Drawing Sheets

(56) References Cited

U.S. PATENT DOCUMENTS

| | | | |
|---|---|---|---|
| 2019/0205746 A1* | 7/2019 | Nurvitadhi | G06N 3/045 |
| 2019/0340499 A1* | 11/2019 | Burger | G06N 3/063 |
| 2019/0370645 A1* | 12/2019 | Lee | G06N 3/063 |
| 2020/0104692 A1* | 4/2020 | Hill | G06F 7/5443 |
| 2020/0160226 A1* | 5/2020 | Ross | G06F 7/5443 |
| 2020/0228137 A1* | 7/2020 | Chinya | G06N 3/063 |
| 2020/0334322 A1* | 10/2020 | Liu | G06F 17/16 |
| 2021/0103550 A1* | 4/2021 | Appu | G06T 1/20 |
| 2021/0150362 A1* | 5/2021 | Zhang | G06N 3/063 |
| 2021/0240684 A1* | 8/2021 | Xiao | G06F 16/1744 |
| 2021/0303909 A1* | 9/2021 | Gunnam | G06V 10/764 |
| 2021/0334142 A1* | 10/2021 | Wang | G06N 3/063 |
| 2022/0019430 A1* | 1/2022 | Sun | G06F 9/30043 |
| 2022/0067509 A1* | 3/2022 | Qin | G06N 3/063 |
| 2022/0101118 A1* | 3/2022 | Yan | G06N 3/082 |
| 2022/0129521 A1* | 4/2022 | Surti | G06F 12/0888 |
| 2022/0147826 A1* | 5/2022 | Xiao | G06F 7/5443 |
| 2022/0261616 A1* | 8/2022 | Li | G06N 3/063 |

OTHER PUBLICATIONS

Xiao Liu, (Mar. 2020). Layerwise Sparse Coding for Pruned Deep Neural Networks with Extreme Compression Ratio. (Year: 2020).*

Zhekai Zhang, (Feb. 2020). SpArch: Efficient Architecture for Sparse Matrix Multiplication. (Year: 2020).*

Songming Yu, (Oct. 2020). High Area/Energy Efficiency Rram Cnn Accelerator with Kernel-Reordering Weight Mapping Scheme Based on Pattern Pruning. (Year: 2020).*

Nan Cui, (2018). Applying Gradient Descent in Convolutional Neural Networks (Year: 2018).*

Songming et al., "High Area/Energy Efficiency RRAM CNN Accelerator with Kernel-Reordering Weight Mapping Scheme Based on Pattern Pruning," Oct. 13, 2020, arXiv:2010.06156 [cs.AR].

Yu et al., "AntiDote: Attention-based Dynamic Optimization for Neural Network Runtime Efficiency," Aug. 14, 2020, arXiv:2008.06543v1 [cs.CV].

Liu et al., "DUET: Boosting Deep Neural Network Efficiency on Dual-Module Architecture," 2020 53rd Annual IEEE/ACM International Symposium on Microarchitecture (MICRO), 2020, pp. 738-750, doi: 10.1109/MICRO50266.2020.00066.

Chen et al., "Eyeriss: A Spatial Architecture for Energy-Efficient Dataflow for Convolutional Neural Networks," 2016 ACM/IEEE 43rd Annual International Symposium on Computer Architecture (ISCA), Seoul, Korea, 2016, pp. 367-379.

Jouppi et al., "In-Datacenter Performance Analysis of a Tensor Processing Unit," 44th International Symposium on Computer Architecture (ISCA), Toronto, Canada, Jun. 24-28, 2017.

* cited by examiner

Compressed Basic Block Matrices (2x1)x25

ACTIVATION COMPRESSION METHOD FOR DEEP LEARNING ACCELERATION

CROSS-REFERENCE TO RELATED APPLICATIONS

This application claims the benefit of U.S. Provisional Patent Application Ser. No. 63/117,728 (filed on Nov. 24, 2020), the disclosure of which is incorporated herein by reference in its entirety.

BACKGROUND

The present disclosure relates to computer systems. More particularly, the present disclosure relates to a matrix multiplication system and method.

Artificial neural networks (ANNs), such as deep neural networks (DNNs), convolutional neural networks (CNNs), etc., are a popular solution to a wide array of challenging classification, recognition and regression problems. However, many ANN models require a large number of calculations involving a large number of weights and activations, which presents a significant challenge with respect to access, storage and performance, particularly for mobile and other power or storage-constrained devices. An ANN hardware accelerator accelerates these calculations, such as, for example, convolution operations performed by CNNs.

Typically, native convolution operations are not performed by a CNN due to the complicated dataflow and expensive datapaths that are usually required. Instead, native convolution operations are converted into generic matrix multiplication (GEMM) operations, and then the GEMM operations are executed more efficiently by a central processing unit (CPU), specialized processor, hardware accelerator processing engine, etc., using optimized software libraries or specialized hardware. More particularly, an "IM2COL" software function may be used to convert the filter (weight) matrix and the input feature map (IFM) matrix for each convolution operation into an expanded format that is compatible with a GEMM operation. The IM2COL versions of each filter (weight) matrix and each IFM matrix are generated and stored in memory, and then loaded from memory and processed by the GEMM operation.

Generally, matrices may be classified as either sparse or dense. Most elements of a sparse matrix have a value of zero, while most elements of a dense matrix have a non-zero value. For the simple matrix multiplication operation C=A·B, when matrix A or matrix B is sparse, most of the matrix calculations will include a value of zero for at least one of the operands. When both matrix A and matrix B are sparse, an even greater number of matrix calculations will include a value of zero for at least one of the operands. Since multiplication by an operand that has a value of zero will always result in a product that has a value of zero, applying standard matrix multiplication techniques to sparse matrices is very inefficient due to the large number of operands that have a value of zero.

DETAILED DESCRIPTION

Figure 1:
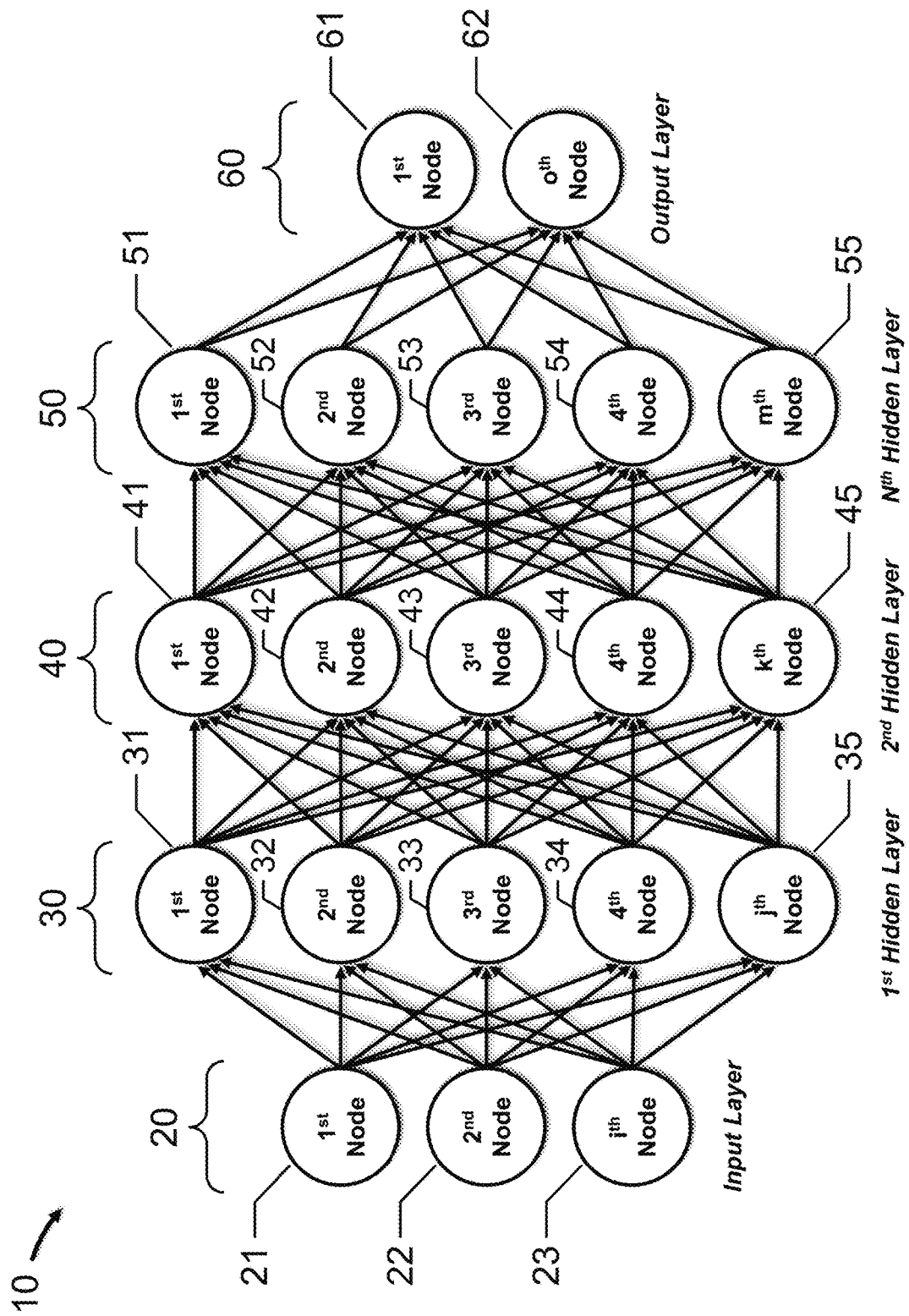
FIG. 1 depicts an ANN, in accordance with embodiments of the present disclosure.

Embodiments of the present disclosure will now be described with reference to the drawing figures, in which like reference numerals refer to like parts throughout.

Embodiments of the present disclosure advantageously provide a system and method for multiplying matrices that significantly reduce "multiply by zero" conditions. Embodiments of the present disclosure are applicable to the multiplication of a dense matrix with a "sparse" matrix, and many embodiments accommodate any degree of sparsity ratio.

In one embodiment, a system includes a processor coupled to a memory, and a matrix multiply accelerator (MMA) coupled to the processor and the memory. The processor is configured to generate, based on an input tensor, a number of basic block matrices, each basic block matrix including a number of elements; for each basic block matrix: prune, based on a sparsity value, the elements of the basic block matrix, generate a mask for the basic block matrix, each mask including a number of bits, each bit corresponding to a different element of the basic block matrix, and compress the basic block matrix to generate a compressed basic block matrix having fewer elements than the basic block matrix. The MMA is configured to multiply, based on the masks, the compressed basic block matrices and a weight matrix to generate an output matrix.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tan h function, a rectified linear unit (ReLU) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation value that is provided to the activation function for that node. The output of the activation function is then provided as an input data value to each output layer node. At each output layer node, the output data value received from each hidden layer node is multiplied by a respective connection weight, and the resulting products are summed or accumulated into an activation value that is provided to the activation function for that node. The output of the activation function is then provided as output data. Additional hidden layers may be similarly configured to process data.

FIG. 1 depicts ANN 10, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes.

In one embodiment, N equals 3, i equals 3, j, k and m equal 5 and o equals 2 (depicted in FIG. 1). Input node 21 is coupled to hidden nodes 31 to 35, input node 22 is coupled to hidden nodes 31 to 35, and input node 23 is coupled to hidden nodes 31 to 35. Hidden node 31 is coupled to hidden nodes 41 to 45, hidden node 32 is coupled to hidden nodes 41 to 45, hidden node 33 is coupled to hidden nodes 41 to 45, hidden node 34 is coupled to hidden nodes 41 to 45, and hidden node 35 is coupled to hidden nodes 41 to 45. Hidden node 41 is coupled to hidden nodes 51 to 55, hidden node 42 is coupled to hidden nodes 51 to 55, hidden node 43 is coupled to hidden nodes 51 to 55, hidden node 44 is coupled to hidden nodes 51 to 55, and hidden node 45 is coupled to hidden nodes 51 to 55. Hidden node 51 is coupled to output nodes 61 and 62, hidden node 52 is coupled to output nodes 61 and 62, hidden node 53 is coupled to output nodes 61 and 62, hidden node 54 is coupled to output nodes 61 and 62, and hidden node 55 is coupled to output nodes 61 and 62.

Many other variations of input, hidden and output layers are clearly possible, including hidden layers that are locally-connected, rather than fully-connected, to one another.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

A multi-layer perceptron (MLP) is a fully-connected ANN that has an input layer, an output layer and one or more hidden layers. MLPs may be used for natural language processing applications, such as machine translation, speech recognition, etc. Other ANNs include recurrent neural networks (RNNs), long short-term memories (LSTMs), sequence-to-sequence models that include an encoder RNN and a decoder RNN, shallow neural networks, etc.

A CNN is a variation of an MLP that may be used for classification or recognition applications, such as image recognition, speech recognition, etc. A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLU function as the activation function. In certain embodiments, the activation function is provided in a separate activation layer, such as, for example, a ReLU layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

Figure 2:
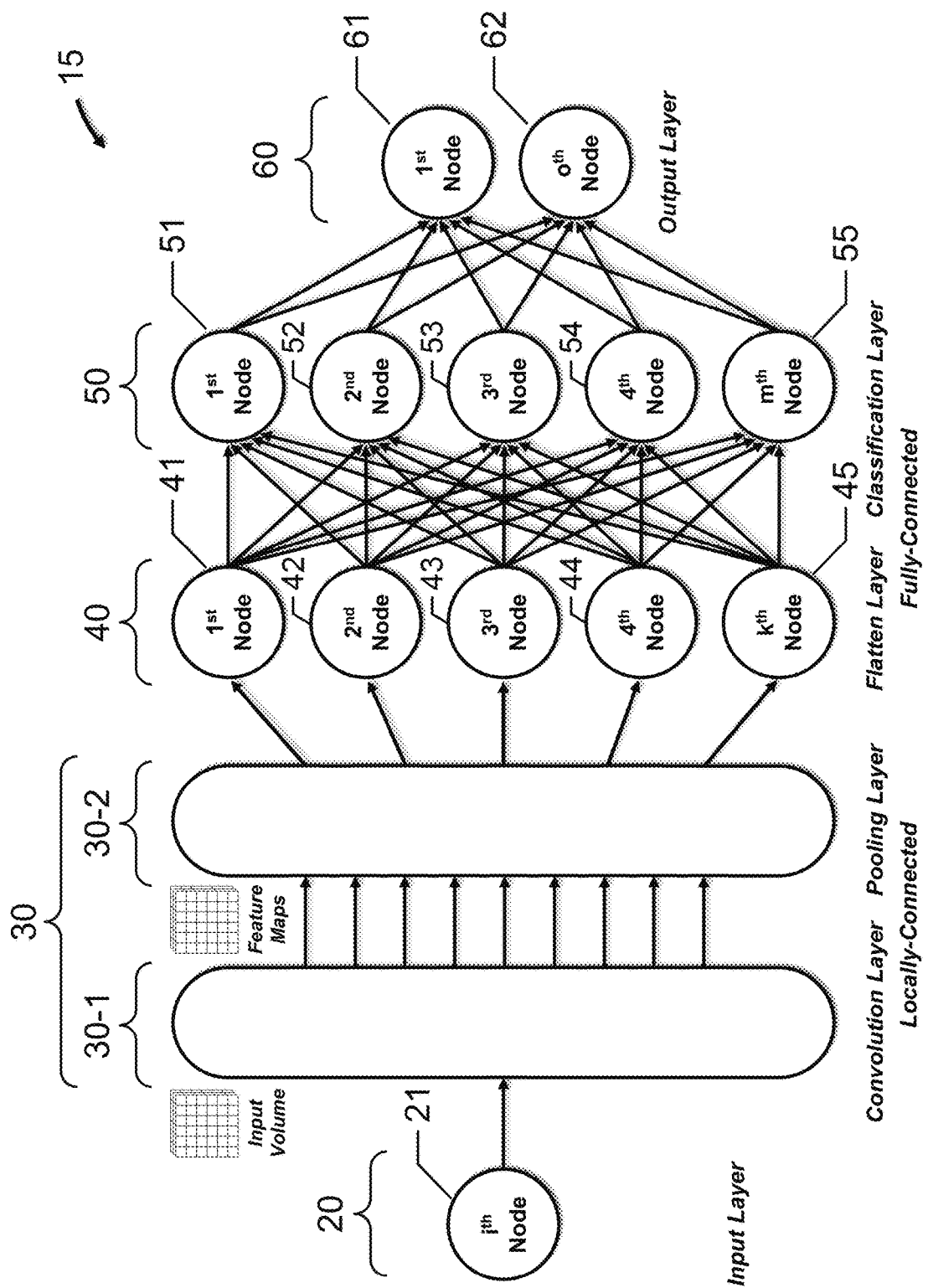
FIG. 2 depicts a CNN, in accordance with embodiments of the present disclosure.

FIG. 2 depicts CNN 15, in accordance with an embodiment of the present disclosure. CNN 15 includes input layer 20, one or more hidden layers, such as convolutional layer 30-1, pooling layer 30-2, hidden (flatten) layer 40, hidden (classification) layer 50, etc., and output layer 60. Many other variations of input, hidden and output layers are contemplated.

Input layer 20 includes one or more input nodes 21, etc., that present the input data, such as a color image, as an input volume to the first convolutional layer, e.g., convolutional layer 30-1. The input volume is a three-dimensional matrix that has a width, a height and a depth. For example, input data that represent a color image are presented as an input volume that is 512 pixels×512 pixels×3 channels (red, green, blue); other input volume dimensions may also be used, such as 32×32×3, 64×64×3, 128×128×3, etc., 32×32×1, 64×64×1, 128×128×1, 512×512×1, etc.

Convolutional layer 30-1 is locally-connected to input layer 20, and includes a plurality of nodes that are connected to local regions in the input volume (not depicted for clarity). For a CNN that uses a standard convolution, each node computes a dot product between the node's weights and the respective local region of the input volume. An activation function is then applied to the results of each convolution calculation to produce an output volume that is provided as an input volume to the subsequent layer. The activation function may be applied by each convolutional layer node or by the nodes of a subsequent locally-connected ReLU layer.

Pooling layer 30-2 is locally-connected to convolutional layer 30-1, and includes a plurality of nodes that are connected to local regions in the input volume (not depicted for clarity). Pooling layer 30-2 also produces an output volume that is provided as the input volume to the subsequent layer, such as, for example, another convolutional layer 30-1, a flatten layer 40, etc. In certain embodiments, convolutional layer 30-1 and pooling layer 30-2 form a single hidden layer 30. Similarly, in certain embodiments, convolutional layer 30-1, a ReLU layer and pooling layer 30-2 form a single hidden layer 30. Generally, the output volumes of the convolutional and pooling layers may be described as feature maps, and one or more single hidden layers 30 form a feature learning portion of CNN 15.

Hidden layer 40 is a "flatten" layer that is locally-connected to pooling layer 30-2, and includes one or more hidden (flatten) nodes 41, 42, 43, 44, 45, etc. Hidden (flatten) layer 40 "flattens" the output volume produced by the preceding pooling layer 30-2 into a column vector, which is provided to the subsequent, fully-connected hidden layer 50.

Hidden layer 50 is a classification layer that is fully-connected to hidden (flatten) layer 40, and includes one or more hidden (classification) nodes 51, 52, 53, 54, 55, etc.

Output layer 60 includes one or more output nodes 61, 62, etc., and is fully-connected to hidden (classification) layer 50. Fully-connected output layer 60 receives the classification results output by hidden (classification) layer 50, and each node outputs a predicted class score. A normalization function, such as a Softmax function, may be applied to the predicted class scores by output layer 60, or, alternatively, by an additional layer interposed between hidden (classification) layer 50 and output layer 60.

Similar to ANNs, training a CNN includes optimizing the connection weights between nodes by minimizing the prediction error of the output data until the CNN achieves a particular level of accuracy. As noted above, backpropagation may be used to iteratively and recursively determines a gradient descent with respect to the connection weights, and then adjusts the connection weights to improve the performance of the network. Matrix multiplication operations, and, more particularly, multiply-and-accumulate (MAC) operations, are used extensively by CNNs, as well as other ANNs.

Figure 3A:
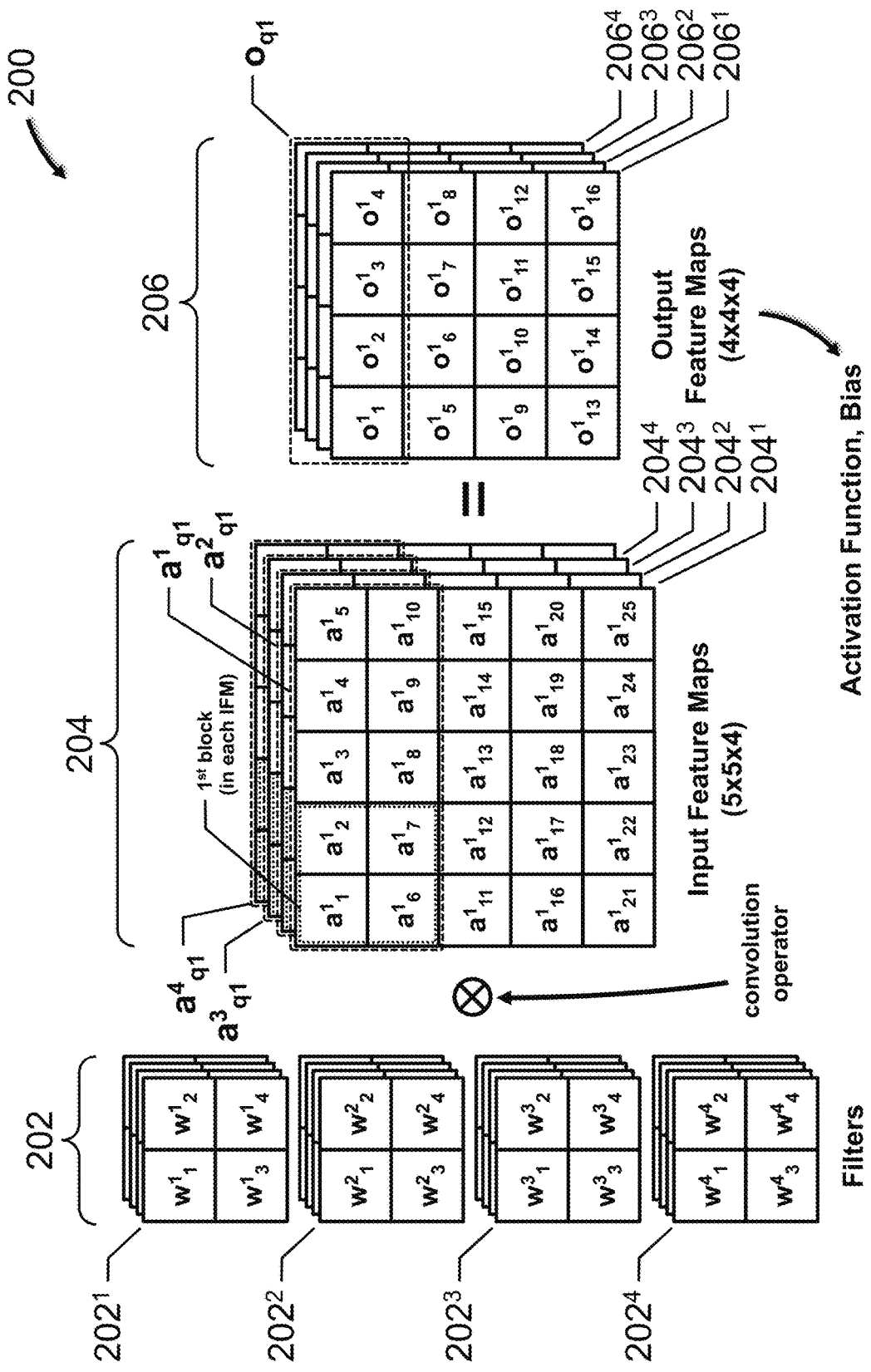
FIG. 3A depicts convolutional layer calculation for a CNN.

FIG. 3A depicts convolutional layer calculation 200 for a CNN, in accordance with an embodiment of the present disclosure.

Input feature maps 204 include four channels and one input data matrix for each channel, i.e., input data matrices $204^1$, $204^2$, $204^3$ and $204^4$. Filter 202 includes four filter or weight sets $202^1$, $202^2$, $202^3$ and $202^4$, and each filter or weight set includes four weight matrices, one weight matrix for each channel. Output feature maps 206 include four channels and one output data matrix for each filter or weight set, i.e., output data matrices $206^1$, $206^2$, $206^3$ and $206^4$.

Convolutional layer calculation 200 convolves filter 202 with input feature maps 204 to produce output feature maps 206.

Generally, input data matrices $204^1$, $204^2$, $204^3$ and $204^4$ form an input tensor, each weight set $202^1$, $202^2$, $202^3$ and $202^4$ forms a weight tensor, and output data matrices $206^1$, $206^2$, $206^3$ and $206^4$ form an output tensor. In this embodiment, each tensor has a height, a width and a depth. The depth of the input tensor is equal to the number of channels, the depth of each weight tensor is equal to the number of channels, and the depth of the output tensor is equal to the number of weight tensors (i.e., weight sets). While particular dimensions for the tensors and matrices have been selected for clarity of illustration and explanation, embodiments of the present disclosure are not so limited.

In one embodiment, input data matrix $204^1$ is a 5×5 matrix associated with the first channel and includes activations $a^1_1$, $a^1_2$, $a^1_3$, $a^1_4$, $a^1_5$, $a^1_6$, $a^1_7$, $a^1_8$, $a^1_9$, $a^1_{10}$, $a^1_{11}$, $a^1_{12}$, $a^1_{13}$, $a^1_{14}$, $a^1_{15}$, $a^1_{16}$, $a^1_{17}$, $a^1_{18}$, $a^1_{19}$, $a^1_{20}$, $a^1_{21}$, $a^1_{22}$, $a^1_{23}$, $a^1_{24}$ and $a^1_{25}$. Input data matrix $204^2$ is a 5×5 matrix associated with the second channel and includes activations $a^2_1$, $a^2_2$, $a^2_3$, $a^2_4$, $a^2_5$, $a^2_6$, $a^2_7$, $a^2_8$, $a^2_9$, $a^2_{10}$, $a^2_{11}$, $a^2_{12}$, $a^2_{13}$, $a^2_{14}$, $a^2_{15}$, $a^2_{16}$, $a^2_{17}$, $a^2_{18}$, $a^2_{19}$, $a^2_{20}$, $a^2_{21}$, $a^2_{22}$, $a^2_{23}$, $a^2_{24}$ and $a^2_{25}$. Input data matrix $204^3$ is a 5×5 matrix associated with the third channel and includes activations $a^3_1$, $a^3_2$, $a^3_3$, $a^3_4$, $a^3_5$, $a^3_6$, $a^3_7$, $a^3_8$, $a^3_9$, $a^3_{10}$, $a^3_{11}$, $a^3_{12}$, $a^3_{13}$, $a^3_{14}$, $a^3_{15}$, $a^3_{16}$, $a^3_{17}$, $a^3_{18}$, $a^3_{19}$, $a^3_{20}$, $a^3_{21}$, $a^3_{22}$, $a^3_{23}$, $a^3_{24}$ and $a^3_{25}$. Input data matrix $204^4$ is a 5×5 matrix associated with the fourth channel and includes activations $a^4_1$, $a^4_2$, $a^4_3$, $a^4_4$, $a^4_5$, $a^4_6$, $a^4_7$, $a^4_8$, $a^4_9$, $a^4_{10}$, $a^4_{11}$, $a^4_{12}$, $a^4_{13}$, $a^4_{14}$, $a^4_{15}$, $a^4_{16}$, $a^4_{17}$, $a^4_{18}$, $a^4_{19}$, $a^4_{20}$, $a^4_{21}$, $a^4_{22}$, $a^4_{23}$, $a^4_{24}$ and $a^4_{25}$.

In this embodiment, weight set $202^1$ includes four weight matrices. The first weight matrix is a 2×2 matrix associated with the first channel, and includes weights $w^1_1$, $w^1_2$, $w^1_3$ and $w^1_4$. The second weight matrix is a 2×2 matrix associated with the second channel, and includes weights $w^1_5$, $w^1_6$, $w^1_7$ and $w^1_8$. The third weight matrix is a 2×2 matrix associated with the third channel, and includes weights $w^1_9$, $w^1_{10}$, $w^1_{11}$ and $w^1_{12}$. The fourth weight matrix is a 2×2 matrix associated with the fourth channel, and includes weights $w^1_{13}$, $w^1_{14}$, $w^1_{15}$ and $w^1_{16}$.

Weight set $202^2$ includes four weight matrices. The first weight matrix is a 2×2 matrix associated with the first channel, and includes weights $w^2_1$, $w^2_2$, $w^2_3$ and $w^2_4$. The second weight matrix is a 2×2 matrix associated with the second channel, and includes weights $w^2_5$, $w^2_6$, $w^2_7$ and $w^2_8$. The third weight matrix is a 2×2 matrix associated with the third channel, and includes weights $w^2_9$, $w^2_{10}$, $w^2_{11}$ and $w^2_{12}$. The fourth weight matrix is a 2×2 matrix associated with the fourth channel, and includes weights $w^2_{13}$, $w^2_{14}$, $w^2_{15}$ and $w^2_{16}$.

Weight set $202^3$ includes four weight matrices. The first weight matrix is a 2×2 matrix associated with the first channel, and includes weights $w^3_1$, $w^3_2$, $w^3_3$ and $w^3_4$. The second weight matrix is a 2×2 matrix associated with the second channel, and includes weights $w^3_5$, $w^3_6$, $w^3_7$ and $w^3_8$. The third weight matrix is a 2×2 matrix associated with the third channel, and includes weights $w^3_9$, $w^3_{10}$, $w^3_{11}$ and $w^3_{12}$. The fourth weight matrix is a 2×2 matrix associated with the fourth channel, and includes weights $w^3_{13}$, $w^3_{14}$, $w^3_{15}$ and $w^3_{16}$.

Weight set $202^4$ includes four weight matrices. The first weight matrix is a 2×2 matrix associated with the first channel, and includes weights $w^4_1$, $w^4_2$, $w^4_3$ and $w^4_4$. The second weight matrix is a 2×2 matrix associated with the second channel, and includes weights $w^4_5$, $w^4_6$, $w^4_7$ and $w^4_8$. The third weight matrix is a 2×2 matrix associated with the third channel, and includes weights $w^4_9$, $w^4_{10}$, $w^4_{11}$ and $w^4_{12}$. The fourth weight matrix is a 2×2 matrix associated with the fourth channel, and includes weights $w^4_{13}$, $w^4_{14}$, $w^4_{15}$ and $w^4_{16}$.

In this embodiment, output data matrix $206^1$ is a 4×4 matrix associated with weight set $202^1$ and includes activations $o^1_1, o^1_2, o^1_3, o^1_4, o^1_5, o^1_6, o^1_7, o^1_8, o^1_9, o^1_{10}, o^1_{11}, o^1_{12}, o^1_{13}, o^1_{14}, o^1_{15}$ and $o^1_{16}$. Output data matrix $206^2$ is a 4×4 matrix associated with weight set $202^2$ and includes activations $o^2_1, o^2_2, o^2_3, o^2_4, o^2_5, o^2_6, o^2_7, o^2_8, o^2_9, o^2_{10}, o^2_{11}, o^2_{12}, o^2_{13}, o^2_{14}, o^2_{15}$ and $o^2_{16}$. Output data matrix $206^3$ is a 4×4 matrix associated with weight set $202^3$ and includes activations $o^3_1, o^3_2, o^3_3, o^3_4, o^3_5, o^3_6, o^3_7, o^3_8, o^3_9, o^3_{10}, o^3_{11}, o^3_{12}, o^3_{13}, o^3_{14}, o^3_{15}$ and $o^3_{16}$. Output data matrix $206^4$ is a 4×4 matrix associated with weight set $202^4$ and includes activations $o^4_1, o^4_2, o^4_3, o^4_4, o^4_5, o^4_6, o^4_7, o^4_8, o^4_9, o^4_{10}, o^4_{11}, o^4_{12}, o^4_{13}, o^4_{14}, o^4_{15}$ and $o^4_{16}$.

For ease of explanation, each input data matrix $204^1$, $204^2$, $204^3$ and $204^4$ may be divided into four quadrants. The first quadrant spans the top (first) row and the second row, the second quadrant spans the second row and the third row, the third quadrant spans the third row and the fourth row, and the fourth quadrant spans the fourth row and the fifth (bottom) row. The first quadrant for input data matrix $204^1$ ($a^1_{q1}$), the first quadrant for input data matrix $204^2$ ($a^2_{q1}$), the first quadrant for input data matrix $204^3$ ($a^3_{q1}$), and the first quadrant for input data matrix $204^4$ ($a^4_{q1}$) are depicted; the remaining three quadrants for each input data matrix are not depicted for clarity.

First quadrant $a^1_{q1}$ includes elements $a^1_1, a^1_2, a^1_3, a^1_4, a^1_5, a^1_6, a^1_7, a^1_8, a^1_9$ and $a^1_{10}$, from which four blocks of elements are formed, i.e., a first block ($a^1_1, a^1_2, a^1_6$ and $a^1_7$), a second block ($a^1_2, a^1_3, a^1_7$ and $a^1_8$), a third block ($a^1_3, a^1_4, a^1_8$ and $a^1_9$), and a fourth block ($a^1_4, a^1_5, a^1_9$ and $a^1_{10}$). First quadrant $a^2_{q1}$ includes elements $a^2_1, a^2_2, a^2_3, a^2_4, a^2_5, a^2_6, a^2_7, a^2_8, a^2_9$ and $a^2_{10}$, from which four blocks of elements are formed, i.e., a first block ($a^2_1, a^2_2, a^2_6$ and $a^2_7$), a second block ($a^2_2, a^2_3, a^2_7$ and $a^2_8$), a third block ($a^2_3, a^2_4, a^2_8$ and $a^2_9$), and a fourth block ($a^2_4, a^2_5, a^2_9$ and $a^2_{10}$). First quadrant $a^3_{q1}$ includes elements $a^3_1, a^3_2, a^3_3, a^3_4, a^3_5, a^3_6, a^3_7, a^3_8, a^3_9$ and $a^3_{10}$, from which four blocks of elements are formed, i.e., a first block ($a^3_1, a^3_2, a^3_6$ and $a^3_7$), a second block ($a^3_2, a^3_3, a^3_7$ and $a^3_8$), a third block ($a^3_3, a^3_4, a^3_8$ and $a^3_9$), and a fourth block ($a^3_4, a^3_5, a^3_9$ and $a^3_{10}$). First quadrant $a^4_{q1}$ includes elements $a^4_1, a^4_2, a^4_3, a^4_4, a^4_5, a^4_6, a^4_7, a^4_8, a^4_9$ and $a^4_{10}$, from which four blocks of elements are formed, i.e., a first block ($a^4_1, a^4_2, a^4_6$ and $a^4_7$), a second block ($a^4_2, a^4_3, a^4_7$ and $a^4_8$), a third block ($a^4_3, a^4_4, a^4_8$ and $a^4_9$), and a fourth block ($a^4_4, a^4_5, a^4_9$ and $a^4_{10}$).

Second quadrant $a^1_{q2}$ includes elements $a^1_6, a^1_7, a^1_8, a^1_9, a^1_{10}, a^1_{11}, a^1_{12}, a^1_{13}, a^1_{14}$ and $a^1_{15}$, from which four blocks of elements are formed, i.e., a first block ($a^1_6, a^1_7, a^1_{11}$ and $a^1_{12}$), a second block ($a^1_7, a^1_8, a^1_{12}$ and $a^1_{13}$), a third block ($a^1_8, a^1_9, a^1_{13}$ and $a^1_{14}$), and a fourth block ($a^1_9, a^1_{10}, a^1_{14}$ and $a^1_{15}$). Second quadrant $a^2_{q2}$ includes elements $a^2_6, a^2_7, a^2_8, a^2_9, a^2_{10}, a^2_{11}, a^2_{12}, a^2_{13}, a^2_{14}$ and $a^2_{15}$, from which four blocks of elements are formed, i.e., a first block ($a^2_6, a^2_7, a^2_{11}$ and $a^2_{12}$), a second block ($a^2_7, a^2_8, a^2_{12}$ and $a^2_{13}$), a third block ($a^2_8, a^2_9, a^2_{13}$ and $a^2_{14}$), and a fourth block ($a^2_9, a^2_{10}, a^2_{14}$ and $a^2_{15}$). Second quadrant $a^3_{q2}$ includes elements $a^3_6, a^3_7, a^3_8, a^3_9, a^3_{10}, a^3_{11}, a^3_{12}, a^3_{13}, a^3_{14}$ and $a^3_{15}$, from which four blocks of elements are formed, i.e., a first block ($a^3_6, a^3_7, a^3_{11}$ and $a^3_{12}$), a second block ($a^3_7, a^3_8, a^3_{12}$ and $a^3_{13}$), a third block ($a^3_8, a^3_9, a^3_{13}$ and $a^3_{14}$), and a fourth block ($a^3_9, a^3_{10}, a^3_{14}$ and $a^3_{15}$). Second quadrant $a^4_{q2}$ includes elements $a^4_6, a^4_7, a^4_8, a^4_9, a^4_{10}, a^4_{11}, a^4_{12}, a^4_{13}, a^4_{14}$ and $a^4_{15}$, from which four blocks of elements are formed, i.e., a first block ($a^4_6, a^4_7, a^4_{11}$ and $a^4_{12}$), a second block ($a^4_7, a^4_8, a^4_{12}$ and $a^4_{13}$), a third block ($a^4_8, a^4_9, a^4_{13}$ and $a^4_{14}$), and a fourth block ($a^4_9, a^4_{10}, a^4_{14}$ and $a^4_{15}$).

Third quadrant $a^1_{q3}$ includes elements $a^1_{11}, a^1_{12}, a^1_{13}, a^1_{14}, a^1_{15}, a^1_{16}, a^1_{17}, a^1_{18}, a^1_{19}$ and $a^1_{20}$, from which four blocks of elements are formed, i.e., a first block ($a^1_{11}, a^1_{12}, a^1_{16}$ and $a^1_{17}$), a second block ($a^1_{12}, a^1_{13}, a^1_{17}$ and $a^1_{18}$), a third block ($a^1_{13}, a^1_{14}, a^1_{18}$ and $a^1_{19}$), and a fourth block ($a^1_{14}, a^1_{15}, a^1_{19}$ and $a^1_{20}$). Third quadrant $a^2_{q3}$ includes elements $a^2_{11}, a^2_{12}, a^2_{13}, a^2_{14}, a^2_{15}, a^2_{16}, a^2_{17}, a^2_{18}, a^2_{19}$ and $a^2_{20}$, from which four blocks of elements are formed, i.e., a first block ($a^2_{11}, a^2_{12}, a^2_{16}$ and $a^2_{17}$), a second block ($a^2_{12}, a^2_{13}, a^2_{17}$ and $a^2_{18}$), a third block ($a^2_{13}, a^2_{14}, a^2_{18}$ and $a^2_{19}$), and a fourth block ($a^2_{14}, a^2_{15}, a^2_{19}$ and $a^2_{20}$). Third quadrant $a^3_{q3}$ includes elements $a^3_{11}, a^3_{12}, a^3_{13}, a^3_{14}, a^3_{15}, a^3_{16}, a^3_{17}, a^3_{18}, a^3_{19}$ and $a^3_{20}$, from which four blocks of elements are formed, i.e., a first block ($a^3_{11}, a^3_{12}, a^3_{16}$ and $a^3_{17}$), a second block ($a^3_{12}, a^3_{13}, a^3_{17}$ and $a^3_{18}$), a third block ($a^3_{13}, a^3_{14}, a^3_{18}$ and $a^3_{19}$), and a fourth block ($a^3_{14}, a^3_{15}, a^3_{19}$ and $a^3_{20}$). Third quadrant $a^4_{q3}$ includes elements $a^4_{11}, a^4_{12}, a^4_{13}, a^4_{14}, a^4_{15}, a^4_{16}, a^4_{17}, a^4_{18}, a^4_{19}$ and $a^4_{20}$, from which four blocks of elements are formed, i.e., a first block ($a^4_{11}, a^4_{12}, a^4_{16}$ and $a^4_{17}$), a second block ($a^4_{12}, a^4_{13}, a^4_{17}$ and $a^4_{18}$), a third block ($a^4_{13}, a^4_{14}, a^4_{18}$ and $a^4_{19}$), and a fourth block ($a^4_{14}, a^4_{15}, a^4_{19}$ and $a^4_{20}$).

Fourth quadrant $a^1_{q4}$ includes elements $a^1_{16}, a^1_{17}, a^1_{18}, a^1_{19}, a^1_{20}, a^1_{21}, a^1_{22}, a^1_{23}, a^1_{24}$ and $a^1_{25}$, from which four blocks of elements are formed, i.e., a first block ($a^1_{16}, a^1_{17}, a^1_{21}$ and $a^1_{22}$), a second block ($a^1_{17}, a^1_{18}, a^1_{22}$ and $a^1_{23}$), a third block ($a^1_{18}, a^1_{19}, a^1_{23}$ and $a^1_{24}$), and a fourth block ($a^1_{19}, a^1_{20}, a^1_{24}$ and $a^1_{25}$). Fourth quadrant $a^2_{q4}$ includes elements $a^2_{16}, a^2_{17}, a^2_{18}, a^2_{19}, a^2_{20}, a^2_{21}, a^2_{22}, a^2_{23}, a^2_{24}$ and $a^2_{25}$, from which four blocks of elements are formed, i.e., a first block ($a^2_{16}, a^2_{17}, a^2_{21}$ and $a^2_{22}$), a second block ($a^2_{17}, a^2_{18}, a^2_{22}$ and $a^2_{23}$), a third block ($a^2_{18}, a^2_{19}, a^2_{23}$ and $a^2_{24}$), and a fourth block ($a^2_{19}, a^2_{20}, a^2_{24}$ and $a^2_{25}$). Fourth quadrant $a^3_{q4}$ includes elements $a^3_{16}, a^3_{17}, a^3_{18}, a^3_{19}, a^3_{20}, a^3_{21}, a^3_{22}, a^3_{23}, a^3_{24}$ and $a^3_{25}$, from which four blocks of elements are formed, i.e., a first block ($a^3_{16}, a^3_{17}, a^3_{21}$ and $a^3_{22}$), a second block ($a^3_{17}, a^3_{18}, a^3_{22}$ and $a^3_{23}$), a third block ($a^3_{18}, a^3_{19}, a^3_{23}$ and $a^3_{24}$), and a fourth block ($a^3_{19}, a^3_{20}, a^3_{24}$ and $a^3_{25}$). Fourth quadrant $a^4_{q4}$ includes elements $a^4_{16}, a^4_{17}, a^4_{18}, a^4_{19}, a^4_{20}, a^4_{21}, a^4_{22}, a^4_{23}, a^4_{24}$ and $a^4_{25}$, from which four blocks of elements are formed, i.e., a first block ($a^4_{16}, a^4_{17}, a^4_{21}$ and $a^4_{22}$), a second block ($a^4_{17}, a^4_{18}, a^4_{22}$ and $a^4_{23}$), a third block ($a^4_{18}, a^4_{19}, a^4_{23}$ and $a^4_{24}$), and a fourth block ($a^4_{19}, a^4_{20}, a^4_{24}$ and $a^4_{25}$).

Output feature maps 206 may also be divided into four quadrants; in this case, each quadrant spans all four output data matrices $206^1$, $206^2$, $206^3$ and $206^4$. The first quadrant spans the top (first) row of each output data matrix, the second quadrant spans the second row of each output data matrix, the third quadrant spans the third row of each output data matrix, and the fourth quadrant spans the fourth (bottom) row of each output data matrix. The first quadrant for output feature maps 206 ($o_{q1}$), is depicted; the remaining three quadrants are not depicted for clarity.

First quadrant $o_{q1}$ includes $o^{q1}, o^1_2, o^1_3, o^1_4, o^2_1, o^2_2, o^2_3, o^2_4, o^3_1, o^3_2, o^3_3, o^3_4, o^4_1, o^4_2, o^4_3$ and $o^4_4$. Second quadrant $o_{q2}$ includes $o^1_5, o^1_6, o^1_7, o^1_8, o^2_5, o^2_6, o^2_7, o^2_8, o^3_5, o^3_6, o^3_7, o^3_8, o^4_5, o^4_6, o^4_7$ and $o^4_8$. Third quadrant $o_{q3}$ includes $o^1_9, o^1_{10}, o^1_{11}, o^1_{12}, o^2_9, o^2_{10}, o^2_{11}, o^2_{12}, o^3_9, o^3_{10}, o^3_{11}, o^3_{12}, o^4_9, o^4_{10}, o^4_{11}$ and $o^4_{12}$. Fourth quadrant $o_{q4}$ includes $o^1_{13}, o^1_{14}, o^1_{15}, o^1_{16}, o^2_{13}, o^2_{14}, o^2_{15}, o^2_{16}, o^3_{13}, o^3_{14}, o^3_{15}, o^3_{16}, o^4_{13}, o^4_{14}, o^4_{15}$ and $o^4_{16}$.

Generally, each output element within output data matrices $206^1$, $206^2$, $206^3$ and $206^4$ is the sum of the dot products of one of the weight sets $202^1$, $202^2$, $202^3$ and $202^4$ and a block of activation elements within a particular quadrant of input data matrices $204^1$, $204^2$, $204^3$ and $204^4$.

The calculation of the output elements in quadrant $o_{q1}$ follows.

Output element $o^1_1$ of output data matrix $206^1$ is the sum of the dot products of weight set $202^1$ and the first block of activation elements within first quadrants $a^1_{q1}$, $a^2_{q1}$, $a^3_{q1}$ and $a^4_{q1}$ of input data matrices $204^1$, $204^2$, $204^3$ and $204^4$, respectively. The first block of activation elements within first quadrants $a^1_{q1}$, $a^2_{q1}$, $a^3_{q1}$ and $a^4_{q1}$ includes $a^1_1$, $a^1_2$, $a^1_6$ and $a^1_7$; $a^2_1$, $a^2_2$, $a^2_6$ and $a^2_7$; $a^3_1$, $a^3_2$, $a^3_6$ and $a^3_7$; and $a^4_1$, $a^4_2$, $a^4_6$ and $a^4_7$, respectively.

More particularly, the following dot products are summed to generate output element $o^1_1$: the dot product of the first weight matrix of weight set $202^1$ and the first block of quadrant $a^1_{q1}$ (i.e., $w^1_1 \cdot a^1_1 + w^1_2 \cdot a^1_2 + w^1_3 \cdot a^1_6 + w^1_4 \cdot a^1_7$), the dot product of the second weight matrix of weight set $202^1$ and the first block of quadrant $a^2_{q1}$ (i.e., $w^1_5 \cdot a^2_1 + w^1_6 \cdot a^2_2 + w^1_7 \cdot a^2_6 + w^1_8 \cdot a^2_7$), the dot product of the third weight matrix of weight set $202^1$ and the first block of quadrant $a^3_{q1}$ (i.e., $w^1_9 \cdot a^3_1 + w^1_{10} \cdot a^3_2 + w^1_{11} \cdot a^3_6 + w^1_{12} \cdot a^3_7$), and the dot product of the fourth weight matrix of weight set $202^1$ and the first block of quadrant $a^4_{q1}$ (i.e., $w^1_{13} \cdot a^4_1 + w^1_{14} \cdot a^4_2 + w^1_{15} \cdot a^4_6 + w^1_{16} \cdot a^4_7$).

Similarly, output element $o^2_1$ of output data matrix $206^2$ is the sum of the dot products of weight set $202^2$ and the first block of activation elements within first quadrants $a^1_{q1}$, $a^2_{q1}$, $a^3_{q1}$ and $a^4_{q1}$ of input data matrices $204^1$, $204^2$, $204^3$ and $204^4$, respectively. Output element $o^3_1$ of output data matrix $206^3$ is the sum of the dot products of weight set $202^3$ and the first block of activation elements within first quadrants $a^1_{q1}$, $a^2_{q1}$, $a^3_{q1}$ and $a^4_{q1}$ of input data matrices $204^1$, $204^2$, $204^3$ and $204^4$, respectively. And, output element $o^4_1$ of output data matrix $206^4$ is the sum of the dot products of weight set $202^4$ and the first block of activation elements within first quadrants $a^1_{q1}$, $a^2_{q1}$, $a^3_{q1}$ and $a^4_{q1}$ of input data matrices $204^1$, $204^2$, $204^3$ and $204^4$, respectively.

Output element $o^1_2$ of output data matrix $206^1$ is the sum of the dot products of weight set $202^1$ and the second block of activation elements within the first quadrants $a^1_{q1}$, $q^2_{q1}$, $a^3_{q1}$ and $a^4_{q1}$ of input data matrices $204^1$, $204^2$, $204^3$ and $204^4$, respectively. The second block of activation elements within the first quadrants $a^1_{q1}$, $a^2_{q1}$, $a^3_{q1}$ and $a^4_{q1}$ includes $a^1_2$, $a^1_3$, $a^1_7$ and $a^1_8$; $a^2_2$, $a^2_3$, $a^2_7$ and $a^2_8$; $a^3_2$, $a^3_3$, $a^3_7$ and $a^3_8$; and $a^4_2$, $a^4_3$, $a^4_7$ and $a^4_8$, respectively.

More particularly, the following dot products are summed to generate output element $o^1_2$: the dot product of the first weight matrix of weight set $202^1$ and the second block of quadrant $a^1_{q1}$ (i.e., $w^1_1 \cdot a^1_2 + w^1_2 \cdot a^1_3 + w^1_3 \cdot a^1_7 + w^1_4 \cdot a^1_8$), the dot product of the second weight matrix of weight set $202^1$ and the second block of quadrant $a^2_{q1}$ (i.e., $w^1_5 \cdot a^2_2 + w^1_6 \cdot a^2_3 + w^1_7 \cdot a^2_7 + w^1_8 \cdot a^2_8$), the dot product of the third weight matrix of weight set $202^1$ and the second block of quadrant $a^3_{q1}$ (i.e., $w^1_9 \cdot a^3_2 + w^1_{10} \cdot a^3_3 + w^1_{11} \cdot a^3_7 + w^1_{12} \cdot a^3_8$), and the dot product of the fourth weight matrix of weight set $202^1$ and the second block of quadrant $a^4_{q1}$ (i.e., $w^1_{13} \cdot a^4_2 + w^1_{14} \cdot a^4_3 + w^1_{15} \cdot a^4_7 + w^1_{16} \cdot a^4_8$).

Similarly, output element $o^2_2$ of output data matrix $206^2$ is the sum of the dot products of weight set $202^2$ and the second block of activation elements within first quadrants $a^1_{q1}$, $a^2_{q1}$, $a^3_{q1}$ and $a^4_{q1}$ of input data matrices $204^1$, $204^2$, $204^3$ and $204^4$, respectively. Output element $o^3_2$ of output data matrix $206^3$ is the sum of the dot products of weight set $202^3$ and the second block of activation elements within first quadrants $a^1_{q1}$, $a^2_{q1}$, $a^3_{q1}$ and $a^4_{q1}$ of input data matrices $204^1$, $204^2$, $204^3$ and $204^4$, respectively. And, output element $o^4_2$ of output data matrix $206^4$ is the sum of the dot products of weight set $202^4$ and the second block of activation elements within the quadrants $a^1_{q1}$, $a^2_{q1}$, $a^3_{q1}$ and $a^4_{q1}$ of input data matrices $204^1$, $204^2$, $204^3$ and $204^4$, respectively.

And so on for output elements $o^1_3$ and $o^1_4$, $o^2_3$ and $o^2_4$, $o^3_3$ and $o^3_4$, and $o^4_3$ and $o^4_4$ of the first rows of output data matrices $206^1$, $206^2$, $206^3$ and $206^4$.

With respect to quadrant $o_{q2}$, output element $o^1_5$ of output data matrix $206^1$ is the sum of the dot products of weight set $202^1$ and the first block of activation elements within second quadrants $a^1_{q2}$, $a^2_{q2}$, $a^3_{q2}$ and $a^4_{q2}$ of input data matrices $204^1$, $204^2$, $204^3$ and $204^4$, respectively. Output element $o^2_5$ of output data matrix $206^2$ is the sum of the dot products of weight set $202^2$ and the first block of activation elements within second quadrants $a^1_{q2}$, $a^2_{q2}$, $a^3_{q2}$ and $a^4_{q2}$ of input data matrices $204^1$, $204^2$, $204^3$ and $204^4$, respectively. Output element $o^3_5$ of output data matrix $206^3$ is the sum of the dot products of weight set $202^3$ and the first block of activation elements within second quadrants $a^1_{q2}$, $a^2_{q2}$, $a^3_{q2}$ and $a^4_{q2}$ of input data matrices $204^1$, $204^2$, $204^3$ and $204^4$, respectively. And, output element $o^4_5$ of output data matrix $206^4$ is the sum of the dot products of weight set $202^4$ and the first block of activation elements within second quadrants $a^1_{q2}$, $a^2_{q2}$, $a^3_{q2}$ and $a^4_{q2}$ of input data matrices $204^1$, $204^2$, $204^3$ and $204^4$, respectively. And so on for output elements $o^1_6$, $o^1_7$ and $o^1_8$, $o^2_6$, $o^2_7$ and $o^2_8$, $o^3_6$, $o^3_7$ and $o^3_8$, and $o^4_6$, $o^4_7$ and $o^4_8$ of the second rows of output data matrices $206^1$, $206^2$, $206^3$ and $206^4$.

With respect to quadrant $o_{q3}$, output element $o^1_9$ of output data matrix $206^1$ is the sum of the dot products of weight set $202^1$ and the first block of activation elements within third quadrants $a^1_{q3}$, $a^2_{q3}$, $a^3_{q3}$ and $a^4_{q3}$ of input data matrices $204^1$, $204^2$, $204^3$ and $204^4$, respectively. Output element $o^2_9$ of output data matrix $206^2$ is the sum of the dot products of weight set $202^2$ and the first block of activation elements within third quadrants $a^1_{q3}$, $a^2_{q3}$, $a^3_{q3}$ and $a^4_{q3}$ of input data matrices $204^1$, $204^2$, $204^3$ and $204^4$, respectively. Output element $o^3_9$ of output data matrix $206^3$ is the sum of the dot products of weight set $202^3$ and the first block of activation elements within third quadrants $a^1_{q3}$, $a^2_{q3}$, $a^3_{q3}$ and $a^4_{q3}$ of input data matrices $204^1$, $204^2$, $204^3$ and $204^4$, respectively. And, output element $o^4_9$ of output data matrix $206^4$ is the sum of the dot products of weight set $202^4$ and the first block of activation elements within third quadrants $a^1_{q3}$, $a^2_{q3}$, $a^3_{q3}$ and $a^4_{q3}$ of input data matrices $204^1$, $204^2$, $204^3$ and $204^4$, respectively. And so on for output elements $o^1_{10}$, $o^1_{11}$ and $o^1_{12}$, $o^2_{10}$, $o^2_{11}$ and $o^2_{12}$, $o^3_{10}$, $o^3_{11}$ and $o^3_{12}$, and $o^4_{10}$, $o^4_{11}$ and $o^4_{12}$ of the third rows of output data matrices $206^1$, $206^2$, $206^3$ and $206^4$.

With respect to quadrant $o_{q4}$, output element $o^1_{13}$ of output data matrix $206^1$ is the sum of the dot products of weight set $202^1$ and the first block of activation elements within fourth quadrants $a^1_{q4}$, $a^2_{q4}$, $a^3_{q4}$ and $a^4_{q4}$ of input data matrices $204^1$, $204^2$, $204^3$ and $204^4$, respectively. Output element $o^2_{13}$ of output data matrix $206^2$ is the sum of the dot products of weight set $202^2$ and the first block of activation elements within fourth quadrants $a^1_{q4}$, $a^2_{q4}$, $a^3_{q4}$ and $a^4_{q4}$ of input data matrices $204^1$, $204^2$, $204^3$ and $204^4$, respectively. Output element $o^3_{13}$ of output data matrix $206^3$ is the sum of the dot products of weight set $202^3$ and the first block of activation elements within fourth quadrants $a^1_{q4}$, $a^2_{q4}$, $a^3_{q4}$ and $a^4_{q4}$ of input data matrices $204^1$, $204^2$, $204^3$ and $204^4$, respectively. And, output element $o^4_{13}$ of output data matrix $206^4$ is the sum of the dot products of weight set $202^4$ and the first block of activation elements within third quadrants $a^1_{q4}$, $a^2_{q4}$, $a^3_{q4}$ and $a^4_{q4}$ of input data matrices $204^1$, $204^2$, $204^3$ and $204^4$, respectively. And so on for output elements $o^1_{14}$, $o^1_{15}$ and $o^1_{16}$, $o^2_{14}$, $o^2_{15}$ and $o^2_{16}$, $o^3_{14}$, $o^3_{15}$ and $o^3_{16}$, and $o^4_{14}$, $o^4_{15}$ and $o^4_{16}$ of the fourth rows of output data matrices $206^1$, $206^2$, $206^3$ and $206^4$.

Figure 3B:
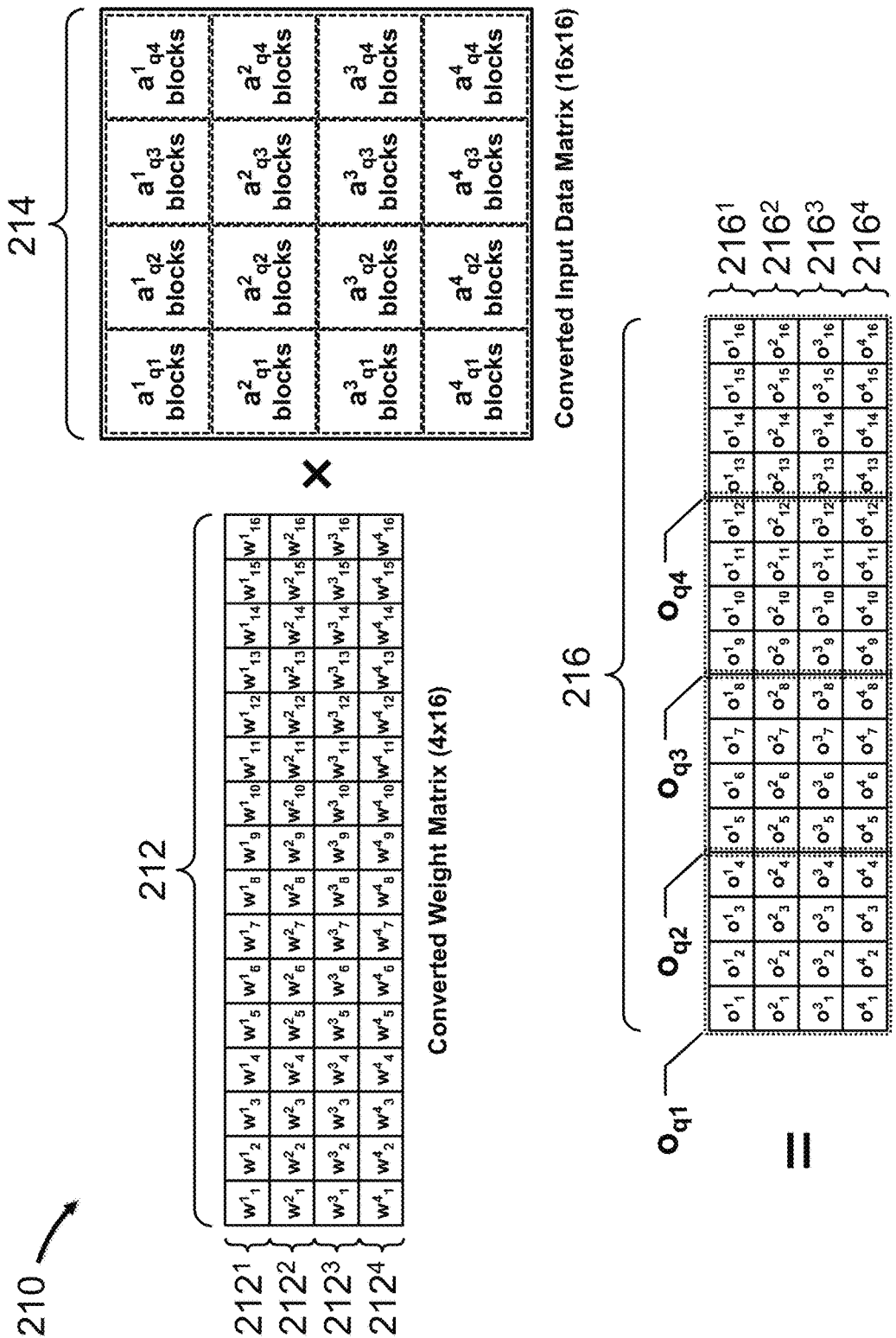
FIG. 3B depicts a converted convolutional layer calculation for a CNN.
Figure 3C:
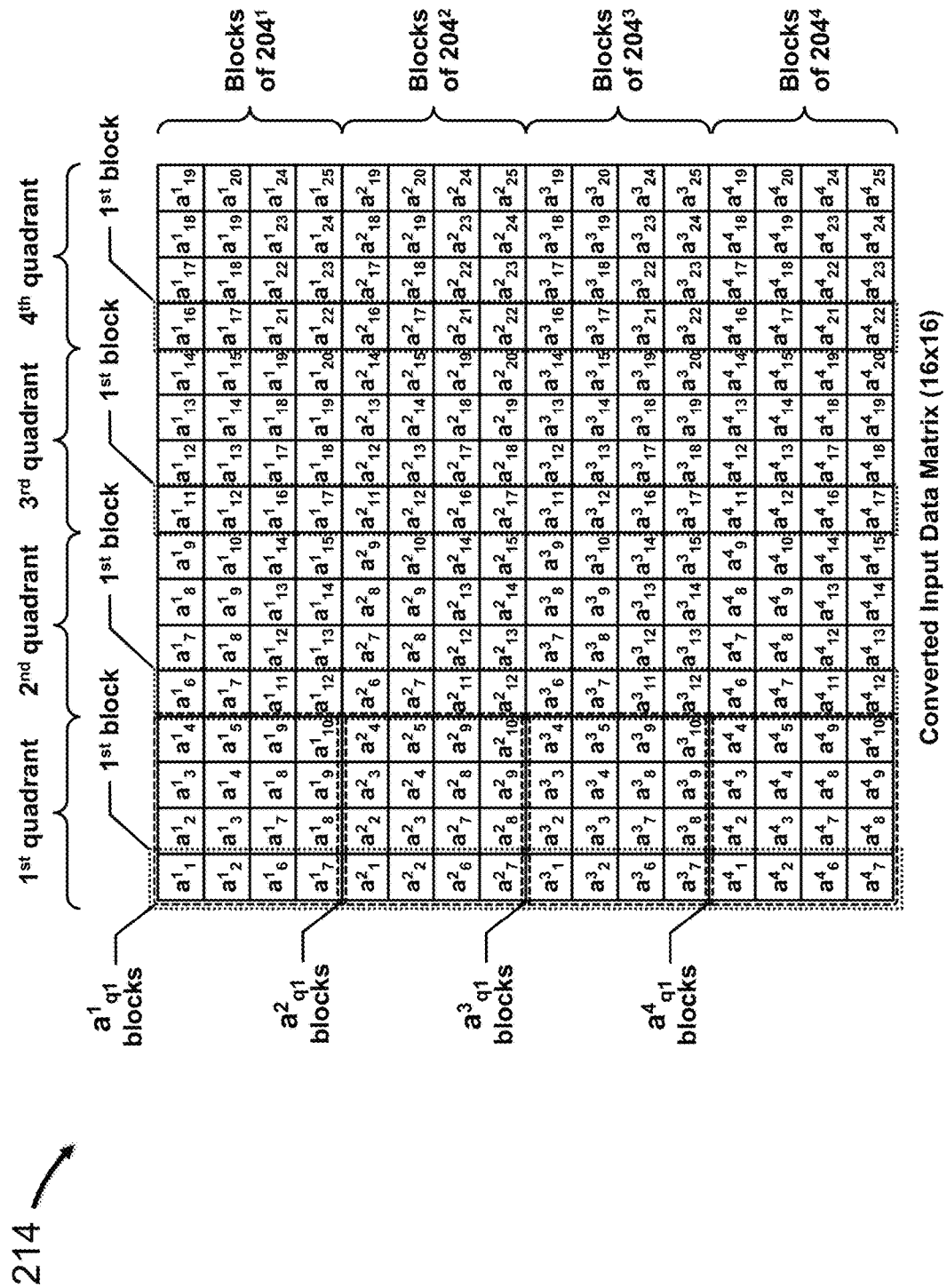
FIG. 3C depicts a converted input data matrix, in accordance with an embodiment of the present disclosure.

FIG. 3B depicts converted convolutional layer calculation 210 for a CNN, while FIG. 3C depicts converted input data matrix 214, in accordance with an embodiment of the present disclosure.

In one embodiment, the convolutional layer calculations for CNNs executing on central processor units (CPUs) may be converted into generic matrix multiplication (GEMM) operations, which may leverage GEMM-optimized software libraries. Convolution layer calculation 200 is converted into a GEMM operation by converting filters 202 into converted weight matrix 212, converting input feature maps 204 into converted input data matrix 214, and then multiplying converted weight matrix 212 and converted input data matrix 214 to generate converted output data matrix 216. Because simple matrix multiplication is performed rather than a convolution operation, each output element within converted output data matrix 216 is the dot product of one row of converted weight matrix 212 and one column of converted input data matrix 214. Converted output data matrix 216 is then reformed into output feature maps 206.

Converted weight matrix 212 is a 4×16 matrix, and includes converted weight sets $212^1$, $212^2$, $212^3$ and $212^4$. Weight set $202^1$ is flattened to form converted weight set $212^1$, i.e., the first row, and includes weights $w^1_1$, $w^1_2$, $w^1_3$, $w^1_4$, $w^1_5$, $w^1_6$, $w^1_7$, $w^1_8$, $w^1_9$, $w^1_{10}$, $w^1_{11}$, $w^1_{12}$, $w^1_{13}$, $w^1_{14}$, $w^1_{15}$ and $w^1_{16}$. Weight set $202^2$ is flattened to form converted weight set $212^2$, i.e., the second row, and includes weights $w^2_1$, $w^2_2$, $w^2_3$, $w^2_4$, $w^2_5$, $w^2_6$, $w^2_7$, $w^2_8$, $w^2_9$, $w^2_{10}$, $w^2_{11}$, $w^2_{12}$, $w^2_{13}$, $w^2_{14}$, $w^2_{15}$ and $w^2_{16}$. Weight set $202^3$ is flattened to form converted weight set $212^3$, i.e., the third row, and includes weights $w^3_1$, $w^3_2$, $w^3_3$, $w^3_4$, $w^3_5$, $w^3_6$, $w^3_7$, $w^3_8$, $w^3_9$, $w^3_{10}$, $w^3_{11}$, $w^3_{12}$, $w^3_{13}$, $w^3_{14}$, $w^3_{15}$ and $w^3_{16}$. And, weight set $202^4$ is flattened to form converted weight set $212^4$, i.e., the fourth row, and includes weights $w^4_1$, $w^4_2$, $w^4_3$, $w^4_4$, $w^4_5$, $w^4_6$, $w^4_7$, $w^4_8$, $w^4_9$, $w^4_{10}$, $w^4_{11}$, $w^4_{12}$, $w^4_{13}$, $w^4_{14}$, $w^4_{15}$ and $w^4_{16}$.

Converted input data matrix 214 is a 16×16 matrix, and includes the blocks of each quadrant of input data matrices $204^1$, $204^2$, $204^3$ and $204^4$, i.e., quadrants $a^1_{q1}$, $a^1_{q2}$, $a^1_{q3}$, $a^1_{q4}$, $a^2_{q1}$, $a^2_{q2}$, $a^2_{q3}$, $a^2_{q4}$, $a^3_{q1}$, $a^3_{q2}$, $a^3_{q3}$, $a^3_{q4}$, $a^4_{q1}$, $a^4_{q2}$, $a^4_{q3}$ and $a^4_{q4}$, respectively. Generally, each block is flattened to form a portion of a single column of converted input data matrix 214.

More particularly, the first column of converted input matrix 214 includes the first blocks from quadrants $a^1_{q1}$, $a^2_{q1}$, $a^3_{q1}$ and $a^4_{q1}$, i.e., activations $a^1_1$, $a^1_2$, $a^1_6$, $a^1_7$, $a^2_1$, $a^2_2$, $a^2_6$, $a^2_7$, $a^3_1$, $a^3_2$, $a^3_6$, $a^3_7$, $a^4_1$, $a^4_2$, $a^4_6$ and $a^4_7$. The second column of converted input matrix 214 includes the second blocks from quadrants $a^1_{q1}$, $a^2_{q1}$, $a^3_{q1}$ and $a^4_{q1}$, i.e., activations $a^1_2$, $a^1_3$, $a^1_7$, $a^1_8$, $a^2_2$, $a^2_3$, $a^2_7$, $a^2_8$, $a^3_2$, $a^3_3$, $a^3_7$, $a^3_8$, $a^4_2$, $a^4_3$, $a^4_7$ and $a^4_8$. The third column of converted input matrix 214 includes the third blocks from quadrants $a^1_{q1}$, $a^2_{q1}$, $a^3_{q1}$ and $a^4_{q1}$, i.e., activations $a^1_3$, $a^1_4$, $a^1_8$, $a^1_9$, $a^2_3$, $a^2_4$, $a^2_8$, $a^2_9$, $a^3_3$, $a^3_4$, $a^3_8$, $a^3_9$, $a^4_3$, $a^4_4$, $a^4_8$, and $a^4_9$. And, the fourth column of converted input matrix 214 includes the fourth blocks from quadrants $a^1_{q1}$, $a^2_{q1}$, $a^3_{q1}$ and $a^4_{q1}$, i.e., activations $a^1_4$, $a^1_5$, $a^1_9$, $a^1_{10}$, $a^2_4$, $a^2_5$, $a^2_9$, $a^2_{10}$, $a^3_4$, $a^3_5$, $a^3_9$, $a^3_{10}$, $a^4_4$, $a^4_5$, $a^4_9$, and $a4_{10}$.

The remaining columns of converted input data matrix 214 are formed in a similar manner. The fourth to the eighth columns are formed from the blocks of quadrants $a^1_{q2}$, $a^2_{q2}$, $a^3_{q2}$ and $a^4_{q2}$, the ninth to the twelfth columns are formed from the blocks of quadrants $a^1_{q3}$, $a^2_{q3}$, $a^3_{q3}$ and $a^4_{q3}$, and the thirteenth to the sixteenth columns are formed from the blocks of quadrants $a^1_{q4}$, $a^2_{q4}$, $a^3_{q4}$ and $a^4_{q4}$.

Converted output data matrix 216 is a 4×16 matrix, and includes flattened versions of output data matrices $206^1$, $206^2$, $206^3$ and $206^4$, i.e., converted output data matrices $216^1$, $216^2$, $216^3$ and $216^4$. Converted output data matrix 216 may also be arranged into four quadrants $o_{q1}$, $o_{q2}$, $o_{q3}$ and $o_{q4}$, which include the same output elements as the four quadrants $o_{q1}$, $o_{q2}$, $o_{q3}$ and $o_{q4}$ of output feature maps 206.

The calculation of the output elements in the first row of quadrant $o_{q1}$ of converted output data matrix 216 follows.

Output element $o^1_1$ is the dot product of the first row of converted weight matrix 212, i.e., converted weight set $212^1$, and the first column of converted input data matrix 214. More particularly, output element $o^1_1$ is equal to $w^1_1 \cdot a^1_1 + w^1_2 \cdot a^1_2 + w^1_3 \cdot a^1_6 + w^1_4 \cdot a^1_7 + w^1_5 \cdot a^2_1 + w^1_6 \cdot a^2_2 + w^1_7 \cdot a^2_6 + w^1_8 \cdot a^2_7 + w^1_9 \cdot a^3_1 + w^1_{10} \cdot a^3_2 + w^1_{11} \cdot a^3_6 + w^1_{12} \cdot a^3_7 + w^1_{13} \cdot a^4_1 + w^1_{14} \cdot a^4_2 + w^1_{15} \cdot a^4_6 + w^1_{16} \cdot a^4_7$. As shown above, output element oil of converted output data matrix 216 is equal to output element oil of output feature maps 206.

Output element $o^1_2$ is the dot product of the first row of converted weight matrix 212, i.e., converted weight set $212^1$, and the second column of converted input data matrix 214. More particularly, output element $o^1_2$ is equal to $w^1_1 \cdot a^1_2 + w^1_2 \cdot a^1_3 + w^1_3 \cdot a^1_7 + w^1_4 \cdot a^1_8 + w^1_5 \cdot a^2_2 + w^1_6 \cdot a^2_3 + w^1_7 \cdot a^2_7 + w^1_8 \cdot a^2_8 + w^1_9 \cdot a^3_2 + w^1_{10} \cdot a^3_3 + w^1_{11} \cdot a^3_7 + w^1_{12} \cdot a^3_8 + w^1_{13} \cdot a^4_2 + w^1_{14} \cdot a^4_3 °w^1_{15} \cdot a^4_7 + w^1_{16} \cdot a^4_8$. As shown above, output element $o^1_2$ of converted output data matrix 216 is equal to output element $o^1_2$ of output feature maps 206.

Output element $o^1_3$ is the dot product of the first row of converted weight matrix 212, i.e., converted weight set $212^1$, and the third column of converted input data matrix 214. More particularly, output element $o^1_3$ is equal to $w^1_1 \cdot a^1_3 + w^1_2 \cdot a^1_4 + w^1_3 \cdot a^1_8 + w^1_4 \cdot a^1_9 + w^1_5 \cdot a^2_3 + w^1_6 \cdot a^2_4 + w^1_7 \cdot a^2_8 + w^1_8 \cdot a^2_9 + w^1_9 \cdot a^3_3 + w^1_{10} \cdot a^3_4 + w^1_{11} \cdot a^3_8 + w^1_{12} \cdot a^3_9 + w^1_{13} \cdot a^4_3 + w^1_{14} \cdot a^4_4 + w^1_{15} \cdot a^4_8 + w^1_{16} \cdot a^4_9$. As shown above, output element $o^1_3$ of converted output data matrix 216 is equal to output element $o^1_3$ of output feature maps 206.

Output element $o^1_4$ is the dot product of the first row of converted weight matrix 212, i.e., converted weight set $212^1$, and the fourth column of converted input data matrix 214. More particularly, output element $o^1_4$ is equal to $w^1_1 \cdot a^1_4 + w^1_2 \cdot a^1_5 + w^1_3 \cdot a^1_9 + w^1_4 \cdot a^1_{10} + w^1_5 \cdot a^2_4 \cdot w^1_6 \cdot a^2_5 \cdot w^1_7 \cdot a^2_9 \cdot w^1_8 \cdot a^2_{10} + w^1_9 \cdot a^3_4 + w^1_{10} \cdot a^3_5 + w^1_{11} \cdot a^3_9 + w^1_{12} \cdot a^3_{10} + w^1_{13} \cdot a^4_4 + w^1_{14} \cdot a^4_5 + w^1_{15} \cdot a^4_9 + w^1_{16} \cdot a^4_{10}$. As shown above, output element $o^1_4$ of converted output data matrix 216 is equal to output element $o^1_4$ of output feature maps 206.

For the second row of quadrant $o_{q1}$, output element $o^2_1$ is the dot product of the second row of converted weight matrix 212, i.e., converted weight set $212^2$, and the first column of converted input data matrix 214, output element $o^2_2$ is the dot product of the second row of converted weight matrix 212, i.e., converted weight set $212^2$, and the second column of converted input data matrix 214, output element $o^2_3$ is the dot product of the second row of converted weight matrix 212, i.e., converted weight set $212^2$, and the third column of converted input data matrix 214, and output element $o^2_4$ is the dot product of the second row of converted weight matrix 212, i.e., converted weight set $212^2$, and the fourth column of converted input data matrix 214.

For the third row of quadrant $o_{q1}$, output element $o^3_1$ is the dot product of the third row of converted weight matrix 212, i.e., converted weight set $212^3$, and the first column of converted input data matrix 214, output element $o^3_2$ is the dot product of the third row of converted weight matrix 212, i.e., converted weight set $212^3$, and the second column of converted input data matrix 214, output element $o^3_3$ is the dot product of the third row of converted weight matrix 212, i.e., converted weight set 212$^3$, and the third column of converted input data matrix 214, and output element $o^3_4$ is the dot product of the third row of converted weight matrix 212, i.e., converted weight set 212$^3$, and the fourth column of converted input data matrix 214.

For the fourth row of quadrant $o_{q1}$, output element $o^4_1$ is the dot product of the fourth row of converted weight matrix 212, i.e., converted weight set 212$^4$, and the first column of converted input data matrix 214, output element $o^4_2$ is the dot product of the fourth row of converted weight matrix 212, i.e., converted weight set 212$^4$, and the second column of converted input data matrix 214, output element $o^4_3$ is the dot product of the fourth row of converted weight matrix 212, i.e., converted weight set 212$^4$, and the third column of converted input data matrix 214, and output element $o^4_4$ is the dot product of the fourth row of converted weight matrix 212, i.e., converted weight set 212$^4$, and the fourth column of converted input data matrix 214.

The elements of the quadrants $o_{q2}$, $o_{q3}$ and $o_{q4}$ are calculated in a similar manner.

Figure 4:
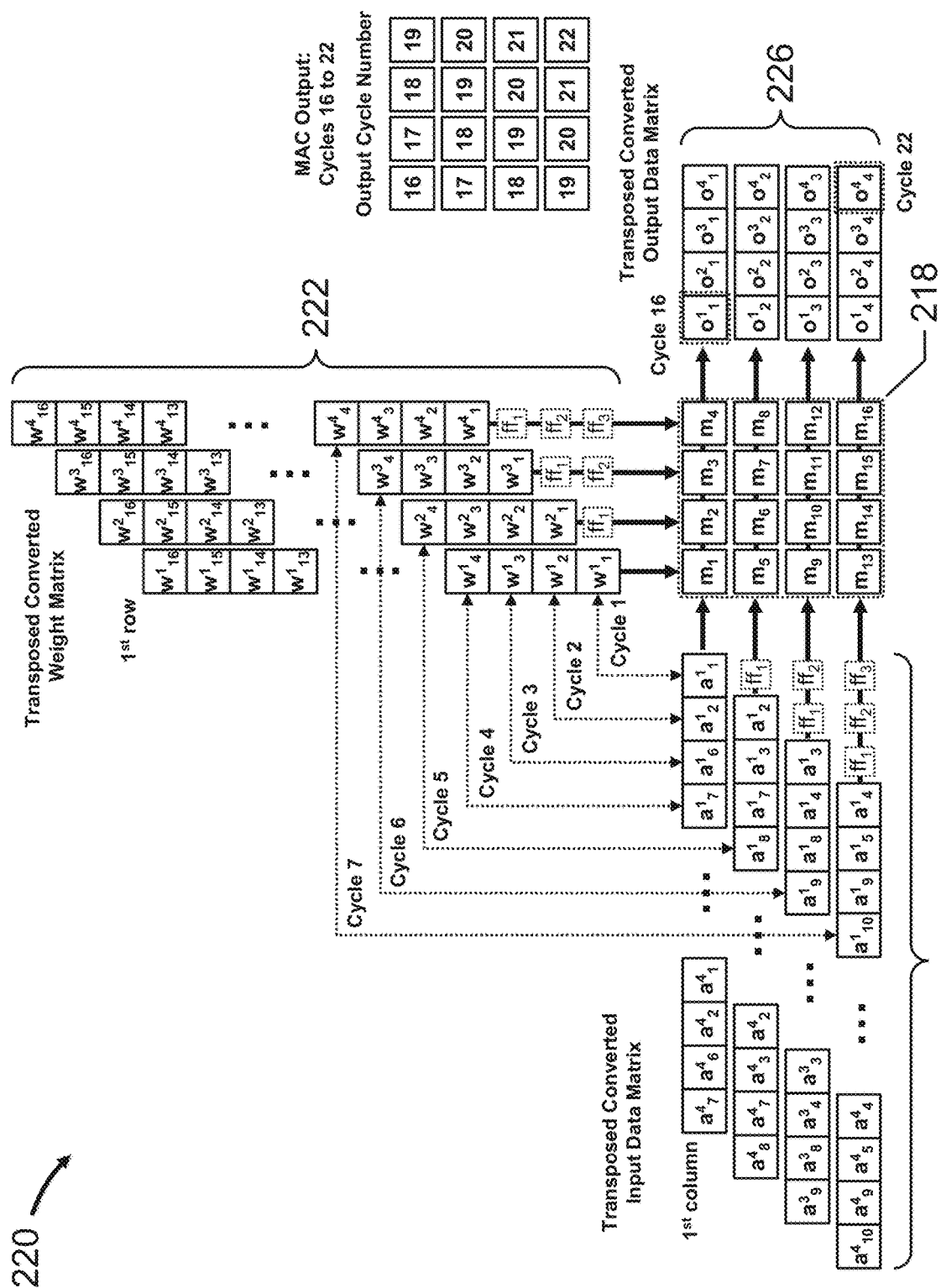
FIG. 4 depicts a data flow diagram for a multiply-and-accumulate (MAC) array.

FIG. 4 depicts a data flow diagram 220 for MAC array 218.

As noted above, GEMM operations may be implemented in a dedicated ANN hardware accelerator using an array of MAC units. In this embodiment, MAC array 218 is a systolic, output stationary array that implements converted convolution operation 210 using a 4×4 array of MAC units $m_1, \ldots, m_{16}$. The orientation of transposed converted weight matrix 222, transposed converted input data matrix 224, and transposed converted output data matrix 226 relative to MAC array 218 simplifies illustration; other orientations are also contemplated.

As discussed above, each MAC unit calculates a dot product, between a row of converted weight matrix 212 and a column of converted input data matrix 214, to generate an element of converted output data matrix 216. Generally, a MAC unit includes, inter alia, a multiplier, an adder and a storage register. Each MAC unit is reset by clearing or zeroing its storage register prior to, or at the start of, a new dot product calculation.

Generally, the rows from converted weight matrix 212 are read from local memory, enter MAC array 218 at the first row of MAC units $m_1$, $m_2$, $m_3$ and $m_4$, and propagate one MAC unit down at the beginning of each processing cycle. Similarly, the columns from converted input data matrix 214 are read from local memory, enter MAC array 218 at the first column of MAC units $m_1$, $m_5$, $m_9$ and $m_{13}$, and propagate one MAC unit to the right at the beginning of each processing cycle.

The dot product calculations performed by MAC unit $m_1$ for the blocks of the first quadrants $a^1_{q1}$, $a^2_{q1}$, $a^3_{q1}$ and $a^4_{q1}$ of converted input data matrix 214 are discussed in detail below, while the dot product calculations performed by the remaining MAC units of MAC array 218 are summarized below.

MAC unit $m_1$ calculates the dot product of the first row of converted weight matrix 212 (i.e., converted weight set 212$^1$) and the first column of converted input data matrix 214 to generate element $o^1_1$ of converted output data matrix 216. During the processing cycle 1, MAC unit mi receives $a_1$ and $w^1_1$ from local memory, multiplies $a_1$ and $w^1_1$ to generate an intermediate product, adds the intermediate product to the value stored in the storage register (i.e., 0), and stores the accumulated result back in the storage register. During processing cycle 2, MAC unit $m_1$ transmits $a_1$ to MAC unit $m_2$ and $w^1_1$ to MAC unit $m_5$, receives $a_2$ and $w^1_2$ from local memory, multiplies $a_2$ and $w^1_2$ to generate an intermediate product, adds the intermediate product to the value stored in the storage register, and stores the accumulated result back in the storage register.

During processing cycle 3, MAC unit $m_1$ transmits $a_2$ to MAC unit $m_2$ and $w^1_2$ to MAC unit $m_5$, receives $a_6$ and $w^1_3$ from local memory, multiplies as and $w^1_3$ to generate an intermediate product, adds the intermediate product to the value stored in the storage register, and stores the accumulated result back in the storage register. During processing cycle 4, MAC unit $m_1$ transmits as to MAC unit $m_2$ and $w^1_3$ to MAC unit $m_5$, receives $a_7$ and $w^1_4$ from the local memory, multiplies $a_7$ and $w^1_4$ to generate an intermediate product, adds the intermediate product to the value stored in the storage register, and stores the accumulated result back in the storage register.

Processing cycles 5 through 16 multiply and accumulate the remaining 12 elements of the first row of converted weight matrix 212 and the first column of converted input data matrix 214. At the end of the processing cycle 16, MAC unit $m_1$ outputs element $o^1_1$.

The remainder of the first row of MAC array 218 includes MAC units $m_2$, $m_3$ and $m_4$.

After an initial delay of one processing cycle, MAC unit $m_2$ receives weights from the first delay register $ff_1$ and input data from MAC unit $m_1$, transmits weights to MAC unit $m_6$ and input data to MAC unit $m_3$, and calculates the dot product of the second row of converted weight matrix 212 (i.e., converted weight set 212$^2$) and the first column of converted input data matrix 214 to generate element $o^2_1$ of converted output data matrix 216. The initial delay of one processing cycle allows the delay pipeline (i.e., delay register $ff_1$) to be filled with weights transferred from memory, and the input data to become available from MAC unit $m_1$. At the end of the processing cycle 17, MAC unit $m_2$ outputs element $o^2_1$.

After an initial delay of two processing cycles, MAC unit $m_3$ receives weights from the second delay register $ff_2$ and input data from MAC unit $m_2$, transmits weights to MAC unit $m_7$ and input data to MAC unit $m_4$, and calculates the dot product of the third row of converted weight matrix 212 (i.e., converted weight set 212$^3$) and the first column of converted input data matrix 214 to generate element $o^3_1$ of converted output data matrix 216. The initial delay of two processing cycles allows the delay pipeline (i.e., delay registers $ff_1$ and $ff_2$) to be filled with weights transferred from memory, and the input data to become available from MAC unit $m_2$. At the end of processing cycle 18, MAC unit $m_3$ outputs element $o^3_1$.

After an initial delay of three processing cycles, MAC unit $m_4$ receives weights from the third delay register $ff_3$ and input data from MAC unit $m_3$, transmits weights to MAC unit $m_8$, and calculates the dot product of the fourth row of converted weight matrix 212 (i.e., converted weight set 212$^4$) and the first column of converted input data matrix 214 to generate element $o^4_1$ of converted output data matrix 216. The initial delay of three processing cycles allows the delay pipeline (i.e., delay registers $ff_1$, $ff_2$ and $ff_3$) to be filled with weights transferred from memory, and the input data to become available from MAC unit $m_3$. At the end of processing cycle 19, MAC unit $m_4$ outputs element $o^4_1$.

The second row of MAC array 218 includes MAC units $m_5$, $m_6$, $m_7$ and $m_8$.

After an initial delay of one processing cycle, MAC unit $m_5$ receives weights from MAC unit $m_1$ and input data from a first delay register $ff_1$, transmits weights to MAC unit $m_9$ and input data to MAC unit $m_6$, and calculates the dot product of the first row of converted weight matrix 212 (i.e., converted weight set $212^1$) and the second column of converted input data matrix 214 to generate element $o^1_2$ of converted output data matrix 216. The initial delay of one processing cycle allows the delay pipeline (i.e., delay register $ff_1$) to be filled with input data transferred from memory, and the weights to become available from MAC unit $m_1$. At the end of processing cycle 17, MAC unit $m_5$ outputs element $o^1_2$.

After an initial delay of two processing cycles, MAC unit $m_6$ receives weights from MAC unit $m_2$ and input data from MAC unit $m_5$, transmits weights to MAC unit $m_{10}$ and input data to MAC unit $m_7$, and calculates the dot product of the second row of converted weight matrix 212 (i.e., converted weight set $212^2$) and the second column of converted input data matrix 214 to generate element $o^2_2$ of converted output data matrix 216. The initial delay of two processing cycles allows the weights to become available from MAC unit $m_2$, and the input data to become available from MAC unit $m_5$. At the end of processing cycle 18, MAC unit mo outputs element $o^2_2$.

After an initial delay of three processing cycles, MAC unit $m_7$ receives weights from MAC unit $m_3$ and input data from MAC unit $m_6$, transmits weights to MAC unit $m_{11}$ and input data to MAC unit $m_8$, and calculates the dot product of the third row of converted weight matrix 212 (i.e., converted weight set $212^3$) and the second column of converted input data matrix 214 to generate element $o^3_2$ of converted output data matrix 216. The initial delay of three processing cycles allows the weights to become available from MAC unit $m_3$, and the input data to become available from MAC unit $m_6$. At the end of processing cycle 19, MAC unit $m_7$ outputs element $o^3_2$.

After an initial delay of four processing cycles, MAC unit $m_8$ receives weights from MAC unit $m_4$ and input data from MAC unit $m_7$, transmits weights to MAC unit $m_{12}$, and calculates the dot product of the fourth row of converted weight matrix 212 (i.e., converted weight set $212^4$) and the second column of converted input data matrix 214 to generate element $o^4_2$ of converted output data matrix 216. The initial delay of four processing cycles allows the weights to become available from MAC unit $m_4$, and the input data to become available from MAC unit $m_7$. At the end of processing cycle 20, MAC unit $m_8$ outputs element $o^4_2$.

The third row of MAC array 218 includes MAC units $m_9$, $m_{10}$, $m_{11}$ and $m_{12}$.

After an initial delay of two processing cycles, MAC unit $m_9$ receives weights from MAC unit $m_5$ and input data from a second delay register $ff_2$, transmits weights to MAC unit $m_{13}$ and input data to MAC unit $m_{10}$, and calculates the dot product of the first row of converted weight matrix 212 (i.e., converted weight set $212^1$) and the third column of converted input data matrix 214 to generate element $o^1_3$ of converted output data matrix 216. The initial delay of two processing cycles allows the delay pipeline (i.e., delay registers $ff_1$ and $ff_2$) to be filled with input data transferred from memory, and the weights to become available from MAC unit $m_5$. At the end of processing cycle 18, MAC unit $m_9$ outputs element $o^1_3$.

After an initial delay of three processing cycles, MAC unit $m_{10}$ receives weights from MAC unit $m_6$ and input data from MAC unit $m_9$, transmits weights to MAC unit $m_{14}$ and input data to MAC unit $m_{11}$, and calculates the dot product of the second row of converted weight matrix 212 (i.e., converted weight set $212^2$) and the third column of converted input data matrix 214 to generate element $o^2_3$ of converted output data matrix 216. The initial delay of three processing cycles allows the weights to become available from MAC unit $m_6$, and the input data to become available from MAC unit $m_9$. At the end of processing cycle 19, MAC unit $m_{10}$ outputs element $o^2_3$.

After an initial delay of four processing cycles, MAC unit $m_{11}$ receives weights from MAC unit $m_7$ and input data from MAC unit $m_{10}$, transmits weights to MAC unit $m_{15}$ and input data to MAC unit $m_{12}$, and calculates the dot product of the third row of converted weight matrix 212 (i.e., converted weight set $212^3$) and the third column of converted input data matrix 214 to generate element $o^3_3$ of converted output data matrix 216. The initial delay of four processing cycles allows the weights to become available from MAC unit $m_7$, and the input data to become available from MAC unit $m_{10}$. At the end of processing cycle 20, MAC unit mu outputs element $o^3_3$.

After an initial delay of five processing cycles, MAC unit $m_{12}$ receives weights from MAC unit $m_8$ and input data from MAC unit $m_{11}$, transmits weights to MAC unit $m_{16}$, and calculates the dot product of the fourth row of converted weight matrix 212 (i.e., converted weight set $212^4$) and the third column of converted input data matrix 214 to generate element $o^4_3$ of converted output data matrix 216. The initial delay of five processing cycles allows the weights to become available from MAC unit $m_8$, and the input data to become available from MAC unit $m_{11}$. At the end of processing cycle 21, MAC unit $m_{12}$ outputs element $o^4_3$.

The fourth row of MAC array 218 includes MAC units $m_{13}$, $m_{14}$, $m_{15}$ and $m_{16}$.

After an initial delay of three processing cycles, MAC unit $m_{13}$ receives weights from MAC unit $m_9$ and input data from a third delay register $ff_3$, transmits input data to MAC unit $m_{14}$, and calculates the dot product of the first row of converted weight matrix 212 (i.e., converted weight set $212^1$) and the fourth column of converted input data matrix 214 to generate element $o^1_4$ of converted output data matrix 216. The initial delay of three processing cycles allows the delay pipeline (i.e., delay registers $ff_1$, $ff_2$ and $ff_3$) to be filled with input data transferred from memory, and the weights to become available from MAC unit $m_9$. At the end of processing cycle 19, MAC unit $m_{13}$ outputs element $o^1_4$.

After an initial delay of four processing cycles, MAC unit $m_{14}$ receives weights from MAC unit $m_{10}$ and input data from MAC unit $m_{13}$, transmits input data to MAC unit $m_{15}$, and calculates the dot product of the second row of converted weight matrix 212 (i.e., converted weight set $212^2$) and the fourth column of converted input data matrix 214 to generate element $o^2_4$ of converted output data matrix 216. The initial delay of four processing cycles allows the weights to become available from MAC unit $m_{10}$, and the input data to become available from MAC unit $m_{13}$. At the end of processing cycle 20, MAC unit $m_{14}$ outputs element $o^2_4$.

After an initial delay of five processing cycles, MAC unit $m_{15}$ receives weights from MAC unit $m_{11}$ and input data from MAC unit $m_{14}$, transmits input data to MAC unit $m_{16}$, and calculates the dot product of the third row of converted weight matrix 212 (i.e., converted weight set $212^3$) and the fourth column of converted input data matrix 214 to generate element $o^3_4$ of converted output data matrix 216. The initial delay of five processing cycles allows the weights to become available from MAC unit $m_{11}$, and the input data to become available from MAC unit $m_{14}$. At the end of processing cycle 21, MAC unit $m_{15}$ outputs element $o^3_4$.

After an initial delay of six processing cycles, MAC unit $m_{16}$ receives weights from MAC unit $m_{12}$ and input data from MAC unit $m_{15}$, and calculates the dot product of the fourth row of converted weight matrix 212 (i.e., converted weight set $212^4$) and the fourth column of converted input data matrix 214 to generate element $o^4_4$ of converted output data matrix 216. The initial delay of six processing cycles allows the weights to become available from MAC unit $m_{12}$, and the input data to become available from MAC unit $m_{15}$. At the end of processing cycle 22, MAC unit $m_{16}$ outputs element $o^4_4$.

After the blocks of the first quadrants $a^1_{q1}$, $a^2_{q1}$, $a^3_{q1}$ and $a^4_{q1}$ of converted input data matrix 214 have been processed, the next sequence of operations processes the blocks of the second quadrants $a^1_{q2}$, $a^2_{q2}$, $a^3_{q2}$ and $a^4_{q2}$. After the blocks of the second quadrants $a^1_{q2}$, $a^2_{q2}$, $a^3_{q2}$ and $a^4_{q2}$ have been processed, the next sequence of operations processes the blocks of the third quadrants $a^1_{q3}$, $a^2_{q3}$, $a^3_{q3}$ and $a^4_{q3}$. And, after the blocks of the third quadrants $a^1_{q3}$, $a^2_{q3}$, $a^3_{q3}$ and $a^4_{q3}$ have been processed, the final sequence of operations processes the blocks of the fourth quadrants $a^1_{q4}$, $a^2_{q4}$, $a^3_{q4}$ and $a^4_{q4}$. Converted weight matrix 212 is accessed for each sequence of operations.

Unfortunately, for CNNs executing on CPUs or other coprocessors, GEMM operations consume a significant number of processor cycles due to the large number of multiplications that are required. For example, one known image recognition CNN requires 3 giga operations per second (GOPS) per input data frame. Compounding this problem, many of the matrices upon which the GEMM operations are performed are sparse, which produces a very inefficient use of processing resources. Conversely, if GEMM operations could significantly reduce "multiply by zero" conditions, processing and power requirements could be significantly reduced.

Certain approaches that attempt to reduce "multiply by zero" conditions complicate the GEMM operations and introduce significant processing overhead on the CPU. Additionally, other approaches fail when applied to activations due to the dynamic variation of the position of the zero values in the input feature maps during the inference. Because of this difficulty, ANN accelerators maintain the input feature maps in a dense or uncompressed form, even though the input feature maps typically contain a significant amount of activations that have a value of zero (e.g., greater than 60%).

Embodiments of the present disclosure advantageously compress the input feature maps during inference by dynamically removing or pruning smaller value activations (including zero values), lower the memory footprint of the activation memory by factor greater than 2×, reduce the power consumption related to activation memory accesses (e.g., DRAM, SRAM, cache, etc.), and increase the effective processing throughput by factor greater than 2× for a MAC array.

Figure 5A:
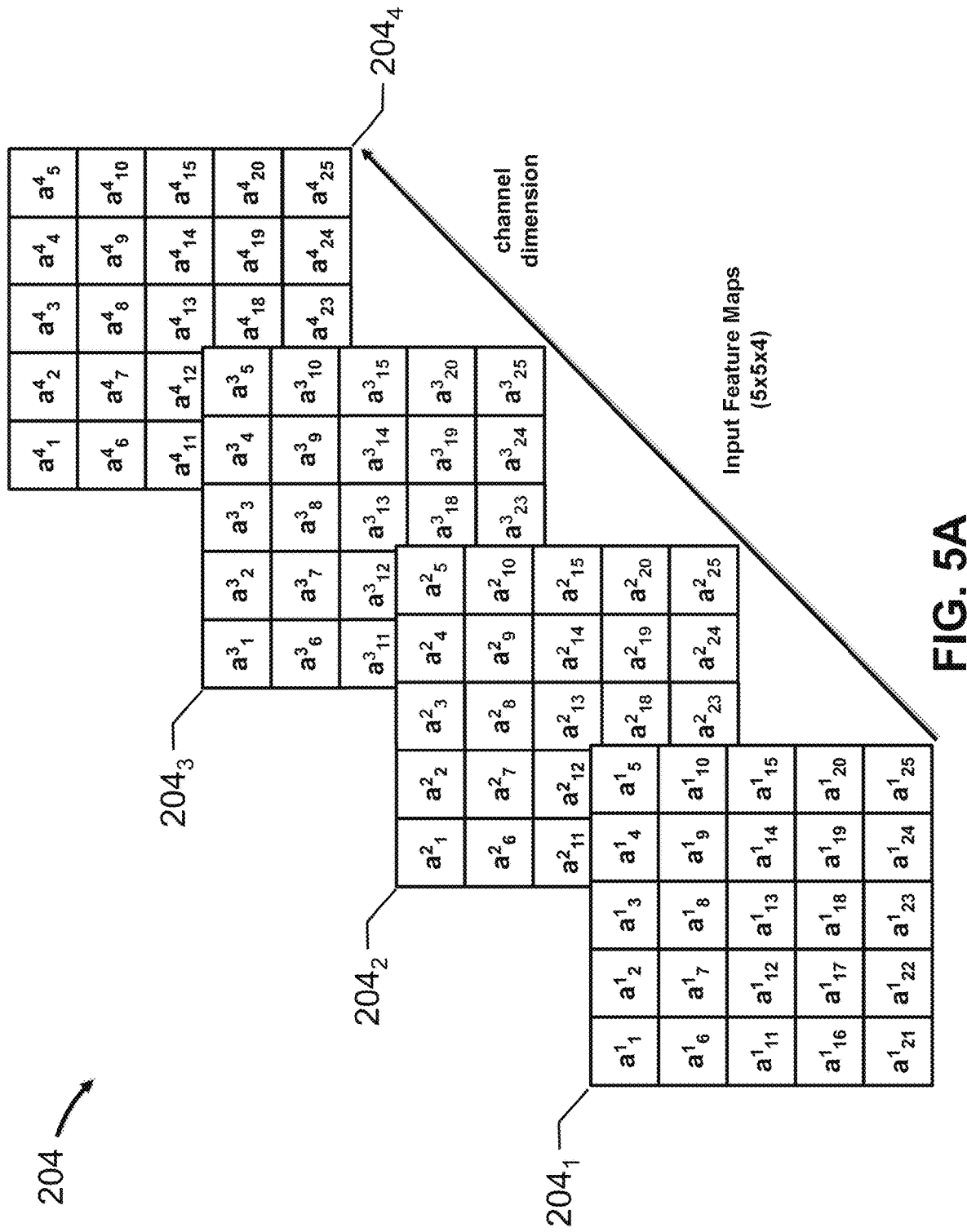
FIG. 5A depicts input feature maps.

FIG. 5A depicts input feature maps 204 from FIG. 3A, in accordance with an embodiment of the present disclosure. As discussed above, input feature maps 204 include one 5×5 input data matrix for each channel, i.e., input data matrices $204^1$, $204^2$, $204^3$ and $204^4$.

Figure 5B:
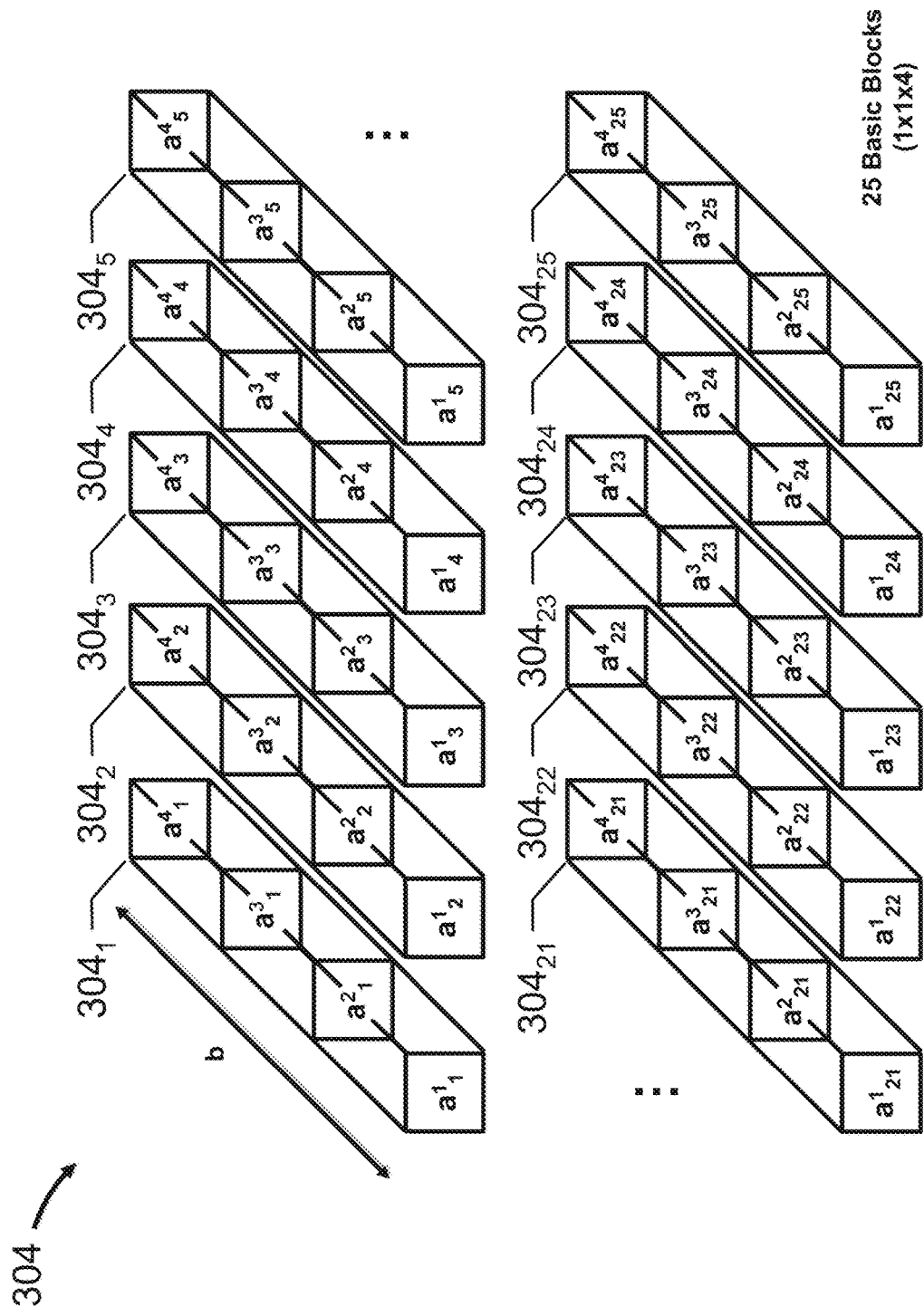
FIG. 5B depicts basic blocks.

FIG. 5B depicts basic blocks 304, in accordance with an embodiment of the present disclosure.

Generally, input feature maps 204 may be decomposed into 25 basic blocks 304 along the depth or channel dimension. Each basic block is a 1×1×b tensor, and includes b activation values. The depth, b, is a hyperparameter having a value of 4, 8, 16, etc. In this embodiment, b equals 4, i.e., the number of channels.

Basic block $304_1$ includes activations $a^1_1$, $a^2_1$, $a^3_1$ and $a^4_1$, basic block $304_2$ includes activations $a^1_2$, $a^2_2$, $a^3_2$ and $a^4_2$, basic block $304_3$ includes activations $a^1_3$, $a^2_3$, $a^3_3$ and $a^4_3$, basic block $304_4$ includes activations $a^1_4$, $a^2_4$, $a^3_4$ and $a^4_4$, and basic block $304_5$ includes activations $a^1_5$, $a^2_5$, $a^3_5$ and $a^4_5$.

Basic blocks $304_6$, $304_7$, $304_8$, $304_9$, $304_{10}$, $304_{11}$, $304_{12}$, $304_{13}$, $304_{14}$, $304_{15}$, $304_{16}$, $304_{17}$, $304_{18}$, $304_{19}$ and $304_{20}$, indicated by the ellipses, are not depicted for clarity. Basic block $304_6$ includes activations $a^1_6$, $a^2_6$, $a^3_6$ and $a^4_6$, basic block $304_7$ includes activations $a^1_7$, $a^2_7$, $a^3_7$ and $a^4_7$, basic block $304_8$ includes activations $a^1_8$, $a^2_8$, $a^3_8$ and $a^4_8$, basic block $304_9$ includes activations $a^1_9$, $a^2_9$, $a^3_9$ and $a^4_9$, basic block $304_{10}$ includes activations $a^1_{10}$, $a^2_{10}$, $a^3_{10}$ and $a^4_{10}$, basic block $304_{11}$ includes activations $a^1_{11}$, $a^2_{11}$, $a^3_{11}$ and $a^4_{11}$, basic block $304_{12}$ includes activations $a^1_{12}$, $a^2_{12}$, $a^3_{12}$ and $a^4_{12}$, basic block $304_{13}$ includes activations $a^1_{13}$, $a^2_{13}$, $a^3_{13}$ and $a^4_{13}$, basic block $304_{14}$ includes activations $a^1_{14}$, $a^2_{14}$, $a^3_{14}$ and $a^4_{14}$, basic block $304_{15}$ includes activations $a^1_{15}$, $a^2_{15}$, $a^3_{15}$ and $a^4_{15}$, basic block $304_{16}$ includes activations $a^1_{16}$, $a^2_{16}$, $a^3_{16}$ and $a^4_{16}$, basic block $304_{17}$ includes activations $a^1_{17}$, $a^2_{17}$, $a^3_{17}$ and $a^4_{17}$, basic block $304_{18}$ includes activations $a^1_{18}$, $a^2_{18}$, $a^3_{18}$ and $a^4_{18}$, basic block $304_{19}$ includes activations $a^1_{19}$, $a^2_{19}$, $a^3_{19}$ and $a^4_{19}$, and basic block $304_{20}$ includes activations $a^1_{20}$, $a^2_{20}$, $a^3_{20}$ and $a^4_{20}$.

Basic block $304_{21}$ includes activations $a^1_{21}$, $a^2_{21}$, $a^3_{21}$ and $a^4_{21}$, basic block $304_{22}$ includes activations $a^1_{22}$, $a^2_{22}$, $a^3_{22}$ and $a^4_{22}$, basic block $304_{23}$ includes activations $a^1_{23}$, $a^2_{23}$, $a^3_{23}$ and $a^4_{23}$, basic block $304_{24}$ includes activations $a^1_{24}$, $a^2_{24}$, $a^3_{24}$ and $a^4_{24}$, and basic block $304_{25}$ includes activations $a^1_{25}$, $a^2_{25}$, $a^3_{25}$ and $a^4_{25}$.

Figure 5C:
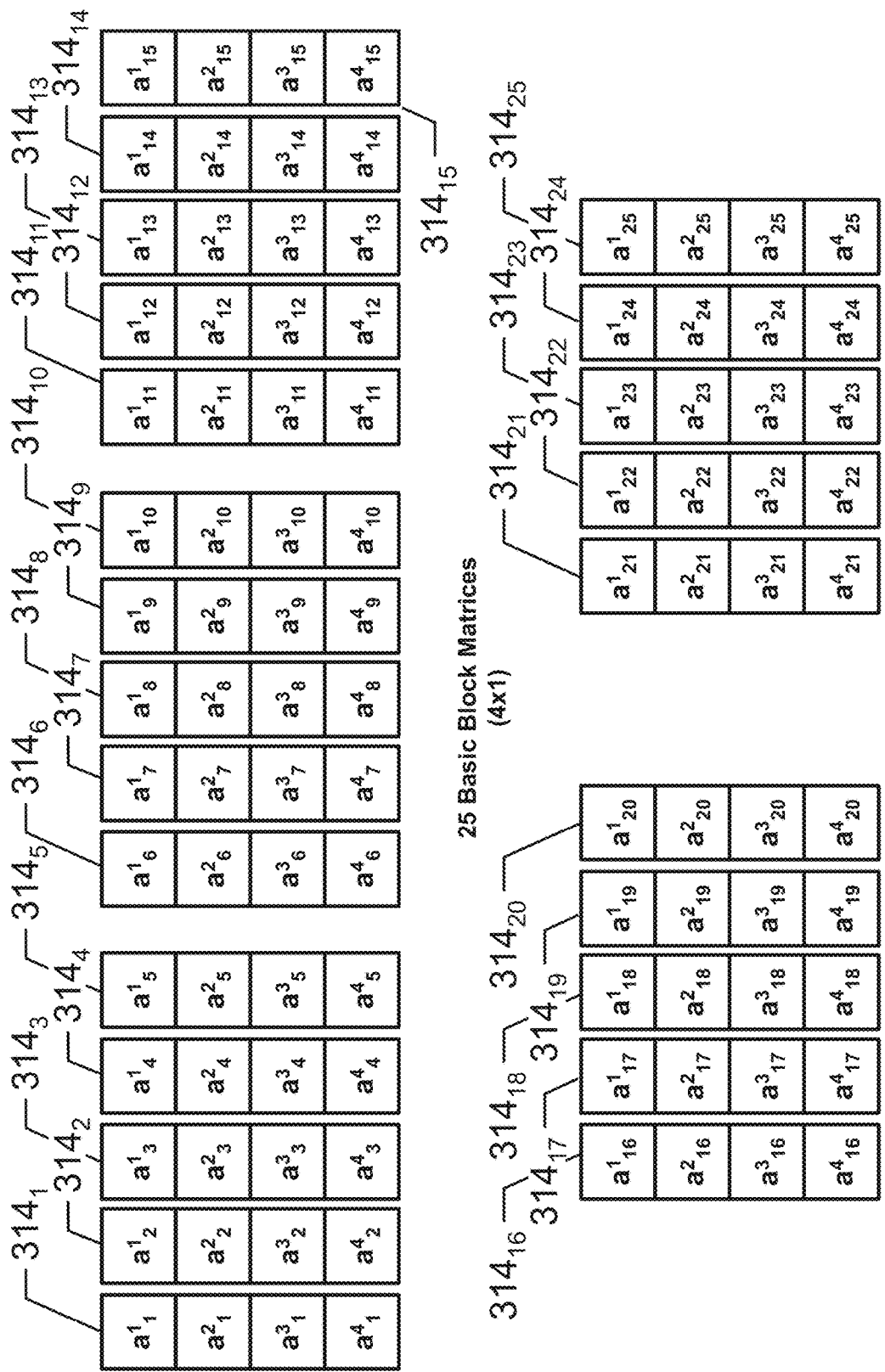
FIG. 5C depicts basic block matrices, in accordance with an embodiment of the present disclosure.

FIG. 5C depicts basic block matrices 314, in accordance with an embodiment of the present disclosure.

Basic blocks 304 may be reformed as 25 respective basic block matrices 314, i.e., basic block matrices $314_1$, $314_2$, $314_3$, $314_4$, $314_5$, $314_6$, $314_7$, $314_8$, $314_9$, $314_{10}$, $314_{11}$, $314_{12}$, $314_{13}$, $314_{14}$, $314_{15}$, $314_{16}$, $314_{17}$, $314_{18}$, $314_{19}$, $314_{20}$, $314_{21}$, $314_{22}$, $314_{23}$, $314_{24}$, and $314_{25}$. Each basic block matrix 314 has 4 rows and a single column (4×1), and the same activations elements as the respective basic block 304. For example, basic block $304_1$ and basic block matrix $314_1$ both include activations $a^1_1$, $a^2_1$, $a^3_1$ and $a^4_1$.

Because input feature maps 204 have been reformed into basic block matrices 314, dynamic activation pruning (DAP) may be easily effected across the channel dimension rather than the height and width dimensions, which advantageously avoids adverse effects on the local data within any particular input data matrix. A sparsity value, p, is initially selected, such as, for example, 25%, 50% 75%., etc. In this embodiment, p is 0.5 (or 50%), and half of the values in basic block matrices 314 will have a value of 0 after pruning. Advantageously, the positions of the zeros within each basic block matrix 314 will be random due to the nature of DAP.

Figure 6A:
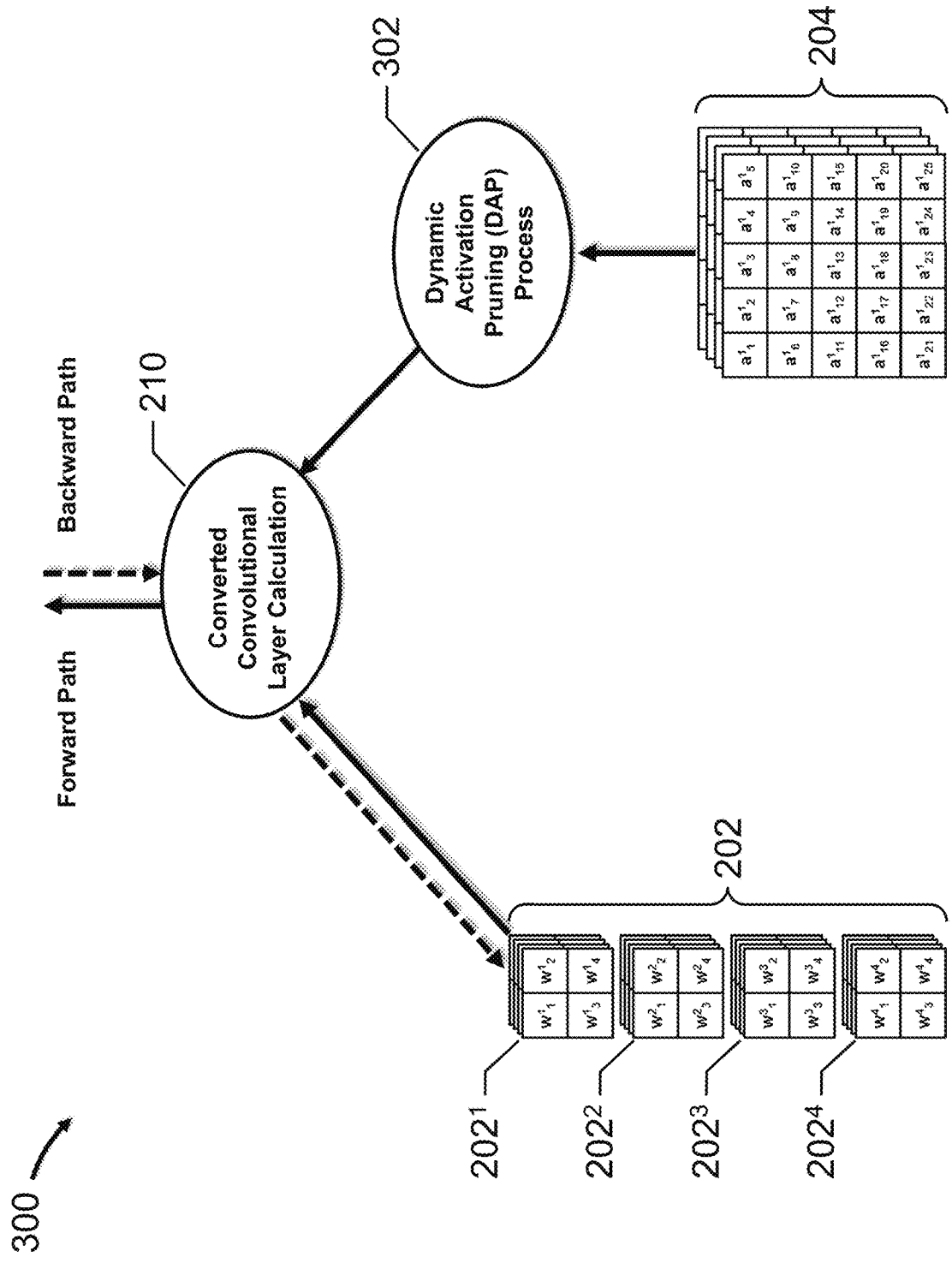
FIG. 6A depicts a data flow diagram for a portion of a training process for CNN 15.

FIG. 6A depicts a data flow diagram 300 for a portion of a training process for CNN 15, according to an embodiment of the present disclosure.

In order to compress the input feature maps during inference, CNN 15 is first trained using a DAP process in the forward path of the convolutional layer calculations. For example, data flow diagram 300 depicts a portion of the training process for CNN 15 that includes converted convolutional layer calculation 210. During the forward phase, filter 202 is provided to converted convolutional layer calculation 210. Input feature maps are first provided to DAP process 302, which creates, prunes and compresses basic block matrices 314, and then provides compressed basic block matrices 324 to converted convolutional layer calculation 210, as described below. Converted convolutional layer calculation 210 then generates output feature maps 206, which are provided to the next layer of CNN 15. During the backward phase, the gradients are backpropagated and weight sets $202^1$, $202^2$, $202^3$ and $202^4$ within filter 202 are updated.

In one embodiment, DAP process 302 creates basic block matrices 314 based on the input feature maps, selects a number ("k") of the largest activation values for each basic block matrix 314 based on the magnitude of the activation values and the sparsity value, prunes the remaining activation values in each basic block matrix 314 by setting the values to 0, and generates each compressed basic block matrix 324 by discarding the zero-valued activations from the basic block matrix 314. In other embodiments, each compressed basic block matrix 324 may be formed directly from the identified activation values within the corresponding basic block matrix 314. A mask is generated for each basic block matrix 314 to identify the selected activation values, as described below.

During training, DAP process 302 may be implemented by the processor that is hosting the training process for CNN 15, such as, for example, a graphics processing unit (GPU), neural processing unit (NPU), central processing unit (CPU), etc. During inference, DAP process 302 must be efficiently executed, which includes identifying or selecting the largest "k" activation values for each basic block matrix 314. In many embodiments, a DAP selection circuit may be implemented in hardware, such as, for example, for low power mobile device applications, while in other embodiments, DAP selection may be implemented in software.

Figure 6B:
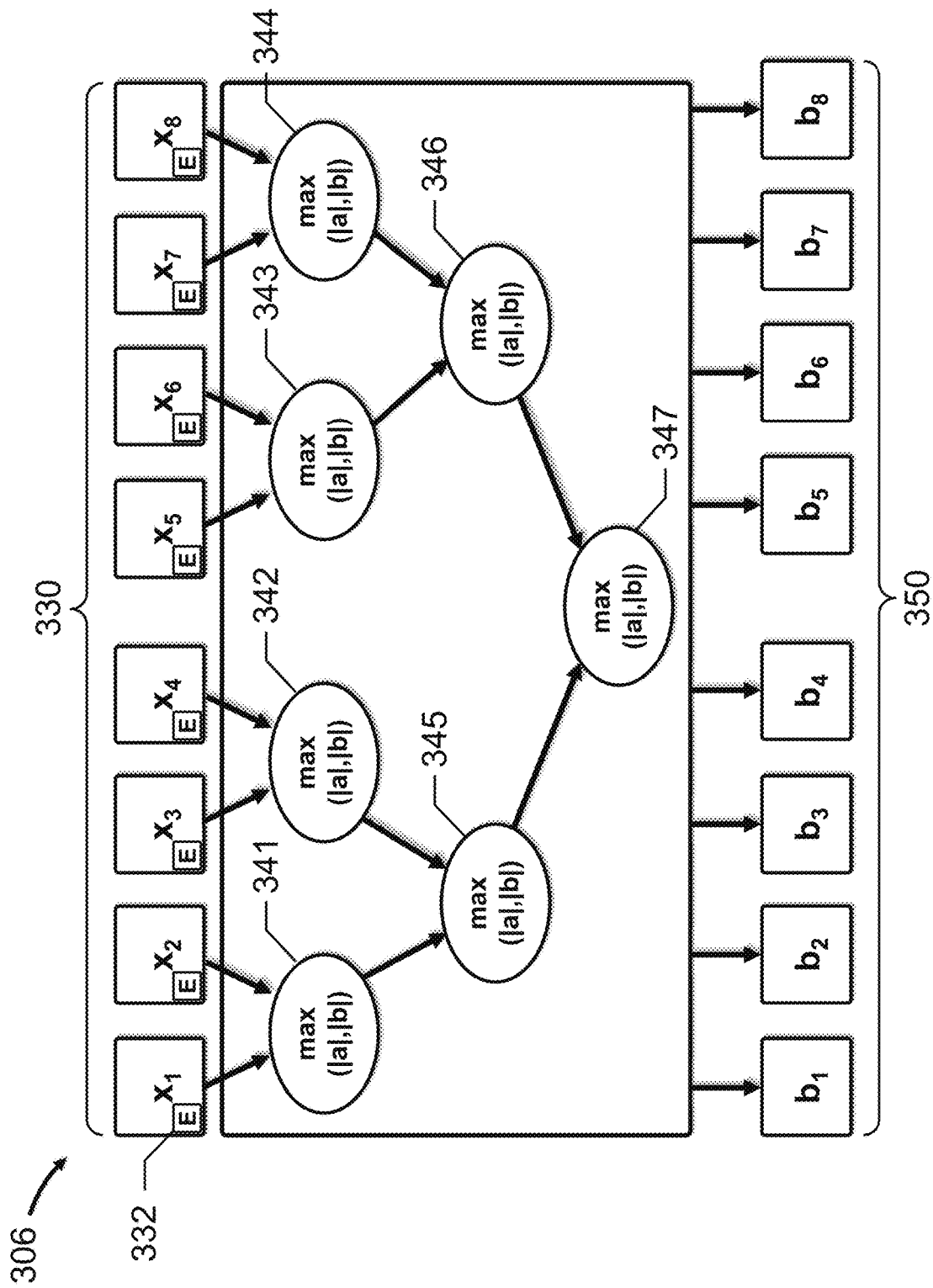
FIGS. 6B and 6C depict block diagrams of dynamic activation pruning (DAP) selection circuits, according to embodiments of the present disclosure.

FIG. 6B depicts a block diagram of DAP selection circuit 306, in accordance with an embodiment of the present disclosure.

DAP selection circuit 306 may select activation values for basic block matrices that have eight activation elements. Other configurations of basic block matrices are also contemplated. DAP selection circuit 306 includes input registers 330, i.e., $x_1$, $x_2$, $x_3$, $x_4$, $x_5$, $x_6$, $x_7$ and $x_8$, magnitude compactors 341, 342, 343, 344, 345, 346 and 347, and 8-bit output register 350 that includes output bits $b_1$, $b_2$, $b_3$, $b_4$, $b_5$, $b_6$, $b_7$ and $b_8$. Each input register 330 stores one activation value, and includes an enable bit 332 to allow the stored activation value to be included or excluded from the selection process. Each output bit is associated with a respective input register 330, i.e., output bit $b_1$ is associated with input register $x_1$, and so on.

Magnitude compactor 341 has two inputs coupled to input register $x_1$ and $x_2$, and an output. Magnitude compactor 342 has two inputs coupled to input register $x_3$ and $x_4$, and an output. Magnitude compactor 343 has two inputs coupled to input register $x_5$ and $x_6$, and an output. Magnitude compactor 344 has two inputs coupled to input register $x_7$ and $x_8$, and an output. Magnitude compactor 345 has two inputs coupled to the outputs of magnitude compactors 341 and 342, and an output. Magnitude compactor 346 has two inputs coupled to the outputs of magnitude compactors 343 and 344, and an output. Magnitude compactor 347 has two inputs coupled to the outputs of magnitude compactors 345 and 346.

Each magnitude compactor 341, 342, 343, 344, 345 and 346 receives two activation values, determines which activation value has the greater magnitude, and then passes the activation value with the greater magnitude to the next magnitude compactor in the chain. Magnitude compactor 347 receives the final two activation values, determines which activation value has the greater magnitude, and sets the respective output bit within output register 350.

If the basic block matrices include 8 activations values and the sparsity value is 0.5 (50%), DAP selection circuit 306 may be executed four times to select the four largest activation values. Alternatively, 4 DAP selection circuits 306 may be executed simultaneously to select the four largest activation values.

Figure 6C:
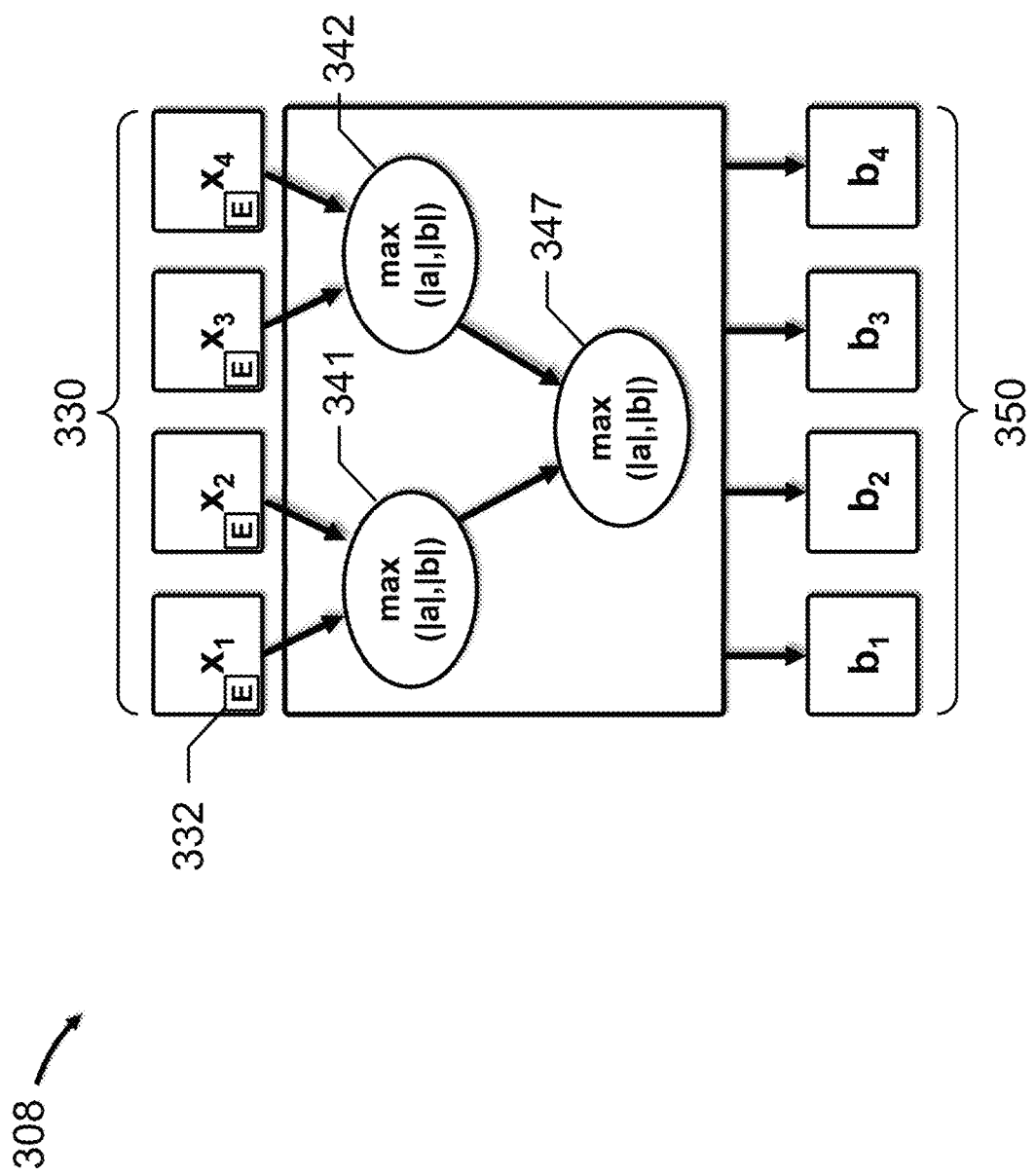

FIG. 6C depicts a block diagram of DAP selection circuit 308, in accordance with an embodiment of the present disclosure.

DAP may select activation values for basic block matrices that have four activation elements, e.g., basic block matrices 314. DAP selection circuit 308 includes input registers 330, i.e., $x_1$, $x_2$, $x_3$ and $x_4$, magnitude compactors 341, 342 and 347, and 4-bit output register 350 that includes output bits $b_1$, $b_2$, $b_3$ and $b_4$. Each input register 330 stores one activation value, and includes an enable bit 332 to allow the stored activation value to be included or excluded from the selection process. Each output bit is associated with a respective input register 330, i.e., output bit $b_1$ is associated with input register $x_1$, and so on.

Magnitude compactor 341 has two inputs coupled to input register $x_1$ and $x_2$, and an output. Magnitude compactor 342 has two inputs coupled to input register $x_3$ and $x_4$, and an output. Magnitude compactor 347 has two inputs coupled to the outputs of magnitude compactors 341 and 342. Each magnitude compactor 341 and 342 receives two activation values, determines which activation value has the greater magnitude, and then passes the activation value with the greater magnitude to magnitude compactor 347. Magnitude compactor 347 receives the final two activation values, determines which activation value has the greater magnitude, and sets the respective output bit within output register 350.

In the embodiment discussed above, basic block matrices 314 each have 4 activation values, b equals 4, k equals 4, and, in one example, p equals 0.5 (50%). In order to determine the 2 largest activation values within a particular basic block matrix 314, DAP selection circuit 308 is executed twice, and output register 350 stores the 4-bit mask for that particular basic block matrix 314. Two of the bits will be set to 1, indicating that the respective activation values have been selected, and two of the bits will be set to 0, indicating that the respective activation values may be discarded during the compression process.

For example, basic block matrix $314_1$ includes four elements, i.e., activations $a^1_1$, $a^2_1$, $a^3_1$ and $a^4_1$, and, in one example, $a^1_1 > a^3_1 > a^2_1 > a^4_1$. During the first execution of DAP selection circuit 308, activation $a^1_1$ is stored in input register $x_1$ and the enable bit is set to 1, activation $a^2_1$ is stored in input register $x_2$ and the enable bit is set to 1, activation $a^3_1$ is stored in input register $x_2$ and the enable bit is set to 1, and activation $a^4_1$ is stored in input register $x_4$ and the enable bit is set to 1. Magnitude compactor 341 determines that $a^1_1 > a^2_1$, and outputs $a^1_1$ to magnitude compactor 347. Magnitude compactor 342 determines that $a^3_1 > a^4_1$, and outputs $a^3_1$ to magnitude compactor 347. Magnitude compactor 347 determines that $a^1_1 > a^3_1$, and sets bit $b_1$ in output register 250 to 1, and bits $b_2$, $b_3$ and $b_4$ in output register 250 to 0.

During the second execution of DAP selection circuit 308, the enable bit for input register $x_1$ is set to 0 to prevent activation $a^1_1$ from being provided to magnitude compactor 341. Magnitude compactor 341 determines that $a^2_1 > 0$ (i.e., the value that replaced $a^1_1$), and outputs $a^2_1$ to magnitude compactor 347. Magnitude compactor 342 determines that $a^3{}_1 > a^4{}_1$, and outputs $a^3{}_1$ to magnitude compactor 347. Magnitude compactor 347 determines that $a^3{}_1 > a^2{}_1$, and sets bit $b_3$ in output register 250 to 1. Output register 250 now stores the mask for basic block matrix $314_1$, which is "1010".

In another embodiment, an index set may be generated for each basic block matrix 314 rather than a mask. The index set includes two index values that indicate which activation values have the greatest magnitude. For example, the index set for basic block matrix $314_1$ would be {0,2}, which indicates that the first and the third elements of basic block matrix $314_1$ have the greatest magnitude. The index values may start at 0 or 1.

Figure 7A:
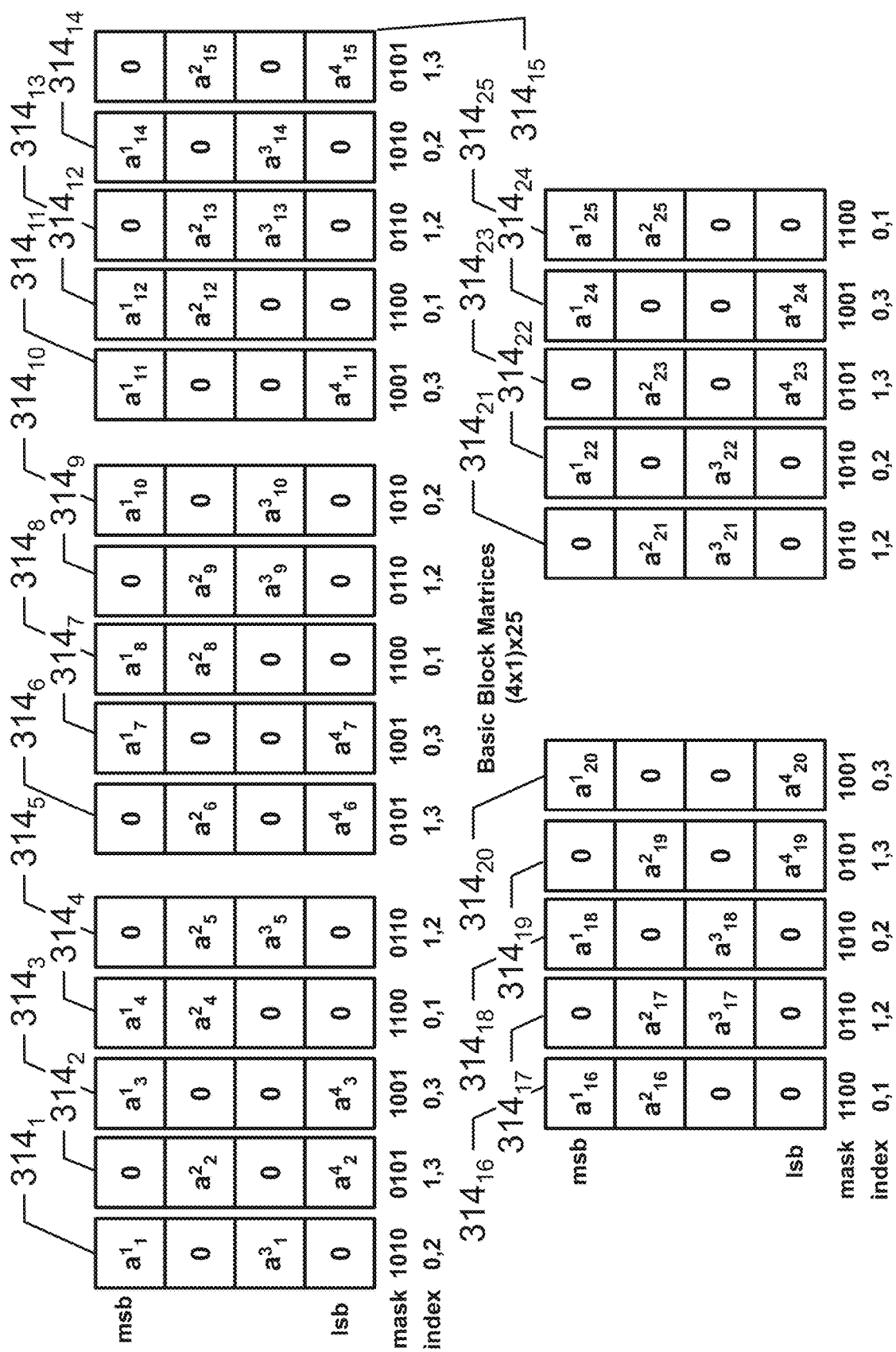
FIG. 7A depicts basic block matrices after DAP selection.

FIG. 7A depicts basic block matrices 314 after DAP selection, in accordance with an embodiment of the present disclosure.

After DAP selection, each basic block matrix 314 includes two activation values and two 0 values, as well as the associated mask (or index set).

Basic block matrix $314_1$ includes activations $a^1{}_1$ and $a^3{}_1$ and mask "1010". Basic block matrix $314_2$ includes activations $a^2{}_2$ and $a^4{}_2$ and mask "0101". Basic block matrix $314_3$ includes activations $a^1{}_3$ and $a^4{}_3$ and mask "1001". Basic block matrix $314_4$ includes activations $a^1{}_4$ and $a^2{}_4$ and mask "1100". Basic block matrix $314_5$ includes activations $a^2{}_5$ and $a^3{}_5$ and mask "0110". Basic block matrix $314_6$ includes activations $a^2{}_6$ and $a^4{}_6$ and mask "0101". Basic block matrix $314_7$ includes activations $a^1{}_7$ and $a^4{}_7$ and mask "1001". Basic block matrix $314_8$ includes activations $a^1{}_8$ and $a^2{}_8$ and mask "1100". Basic block matrix $314_9$ includes activations $a^2{}_9$ and $a^3{}_9$ and mask "0110". Basic block matrix $314_{10}$ includes activations $a^1{}_{10}$ and $a^3{}_{10}$ and mask "1010".

Basic block matrix $314_{11}$ includes activations $a^1{}_{11}$ and $a^4{}_{11}$ and mask "1001". Basic block matrix $314_{12}$ includes activations $a^1{}_{12}$ and $a^2{}_{12}$ and mask "1100". Basic block matrix $314_{13}$ includes activations $a^2{}_{13}$ and $a^3{}_{13}$ and mask "0110". Basic block matrix $314_{14}$ includes activations $a^1{}_{14}$ and $a^3{}_{14}$ and mask "1010". Basic block matrix $314_{15}$ includes activations $a^2{}_{15}$ and $a^4{}_{15}$ and mask "0101". Basic block matrix $314_{16}$ includes activations $a^1{}_{16}$ and $a^2{}_{16}$ and mask "1100". Basic block matrix $314_{17}$ includes activations $a^2{}_{17}$ and $a^3{}_{17}$ and mask "0110". Basic block matrix $314_{18}$ includes activations $a^1{}_{18}$ and $a^3{}_{18}$ and mask "1010". Basic block matrix $314_{19}$ includes activations $a^2{}_{19}$ and $a^4{}_{19}$ and mask "0101". Basic block matrix $314_{29}$ includes activations $a^1{}_{20}$ and $a^4{}_{20}$ and mask "1001".

Basic block matrix $314_{21}$ includes activations $a^2{}_{21}$ and $a^3{}_1$ and mask "0110". Basic block matrix $314_{22}$ includes activations $a^1{}_{22}$ and $a^3{}_{22}$ and mask "1010". Basic block matrix $314_{23}$ includes activations $a^2{}_{23}$ and $a^4{}_{23}$ and mask "0101". Basic block matrix $314_{24}$ includes activations $a^1{}_{24}$ and $a^4{}_{24}$ and mask "1001". Basic block matrix $314_{25}$ includes activations $a^1{}_{25}$ and $a^2{}_{25}$ and mask "1100".

Figure 7B:
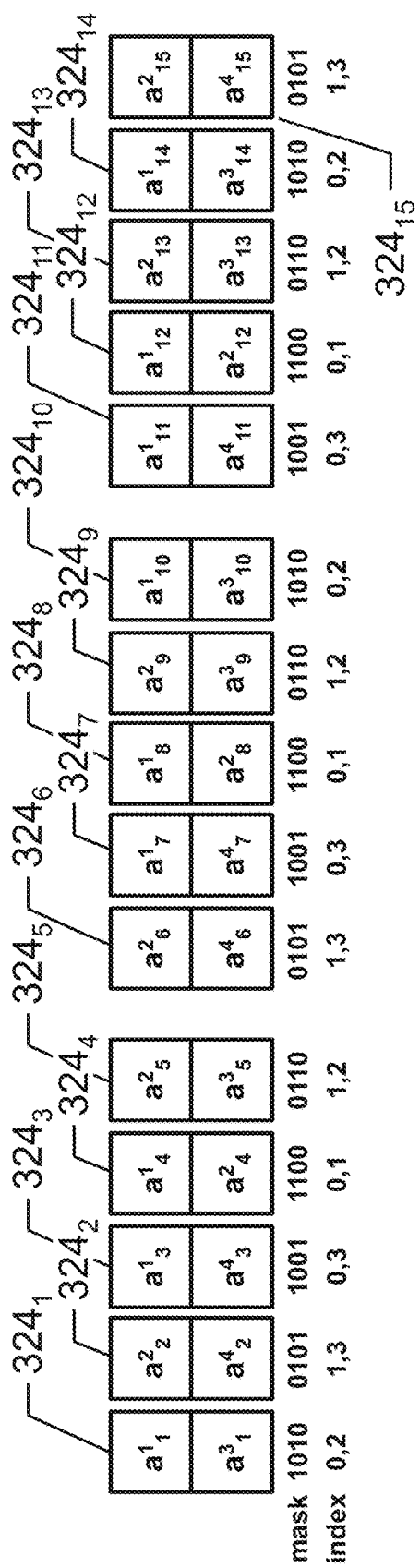
FIG. 7B depicts compressed basic block matrices, in accordance with an embodiment of the present disclosure
Figure 7B:
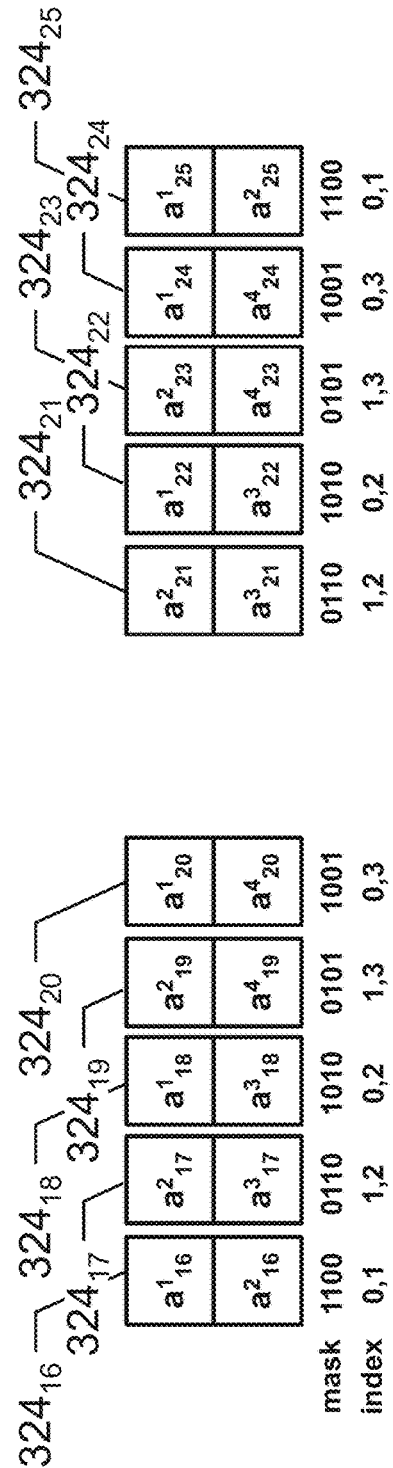

FIG. 7B depicts compressed basic block matrices 324, in accordance with an embodiment of the present disclosure.

After DAP selection, compressed basic block matrices 324 are generated, based on the mask or index, by removing the 0 values from basic block matrices 314 which resizes each basic block matrix 314 from 4×1 to 2×1. For example, if the sparsity is 50%, each basic block matrix 314 is compressed into half of its original size plus a small amount of meta data for the mask or index. The compression rate for 8-bit activations is 64/ (32+8)=8/5=1.60.

Compressed basic block matrix $324_1$ includes activations $a^1{}_1$ and $a^3{}_1$ and mask "1010". Compressed basic block matrix $324_2$ includes activations $a^2{}_2$ and $a^4{}_2$ and mask "0101". Compressed basic block matrix $324_3$ includes activations $a^1{}_3$ and $a^4{}_3$ and mask "1001". Compressed basic block matrix $324_4$ includes activations $a^1{}_4$ and $a^2{}_4$ and mask "1100". Compressed basic block matrix $324_5$ includes activations $a^2{}_5$ and $a^3{}_5$ and mask "0110". Compressed basic block matrix $324_6$ includes activations $a^2{}_6$ and $a^4{}_6$ and mask "0101". Compressed basic block matrix $324_7$ includes activations $a^1{}_7$ and $a^4{}_7$ and mask "1001". Compressed basic block matrix $324_8$ includes activations $a^1{}_8$ and $a^2{}_8$ and mask "1100". Compressed basic block matrix $324_9$ includes activations $a^2{}_9$ and $a^3{}_9$ and mask "0110". Compressed basic block matrix $324_{10}$ includes activations $a^1{}_{10}$ and $a^3{}_{10}$ and mask "1010".

Compressed basic block matrix $324_{11}$ includes activations $a^1{}_{11}$ and $a^4{}_{11}$ and mask "1001". Compressed basic block matrix $324_{12}$ includes activations $a^1{}_{12}$ and $a^2{}_{12}$ and mask "1100". Compressed basic block matrix $324_{13}$ includes activations $a^2{}_{13}$ and $a^3{}_{13}$ and mask "0110". Compressed basic block matrix $324_{14}$ includes activations $a^1{}_{14}$ and $a^{324}$ and mask "1010". Compressed basic block matrix $324_{15}$ includes activations $a^2{}_{15}$ and $a^4{}_{15}$ and mask "0101". Compressed basic block matrix $324_{16}$ includes activations $a^1{}_{16}$ and $a^2{}_{16}$ and mask "1100". Compressed basic block matrix $324_{17}$ includes activations $a^2{}_{17}$ and $a^3{}_{17}$ and mask "0110". Compressed basic block matrix $324_{18}$ includes activations $a^1{}_{18}$ and $a^3{}_{18}$ and mask "1010". Compressed basic block matrix $324_{19}$ includes activations $a^2{}_{19}$ and $a^4{}_{19}$ and mask "0101". Compressed basic block matrix $324_{20}$ includes activations $a^1{}_{20}$ and $a^4{}_{20}$ and mask "1001".

Compressed basic block matrix $324_{21}$ includes activations $a^2{}_{21}$ and $a^3{}_1$ and mask "0110". Compressed basic block matrix $324_{22}$ includes activations $a^1{}_{22}$ and $a^3{}_{22}$ and mask "1010". Compressed basic block matrix $324_{23}$ includes activations $a^2{}_{23}$ and $a^4{}_{23}$ and mask "0101". Compressed basic block matrix $324_{24}$ includes activations $a^1{}_{24}$ and $a^4{}_{24}$ and mask "1001". Compressed basic block matrix $324_{25}$ includes activations $a^1{}_{25}$ and $a^2{}_{25}$ and mask "1100".

FIGS. 8A, 8B, 8C and 8D depict weight matrix re-sequencing and converted input data matrix re-sequencing and compression, in accordance with an embodiment of the present disclosure.

Figure 8A:
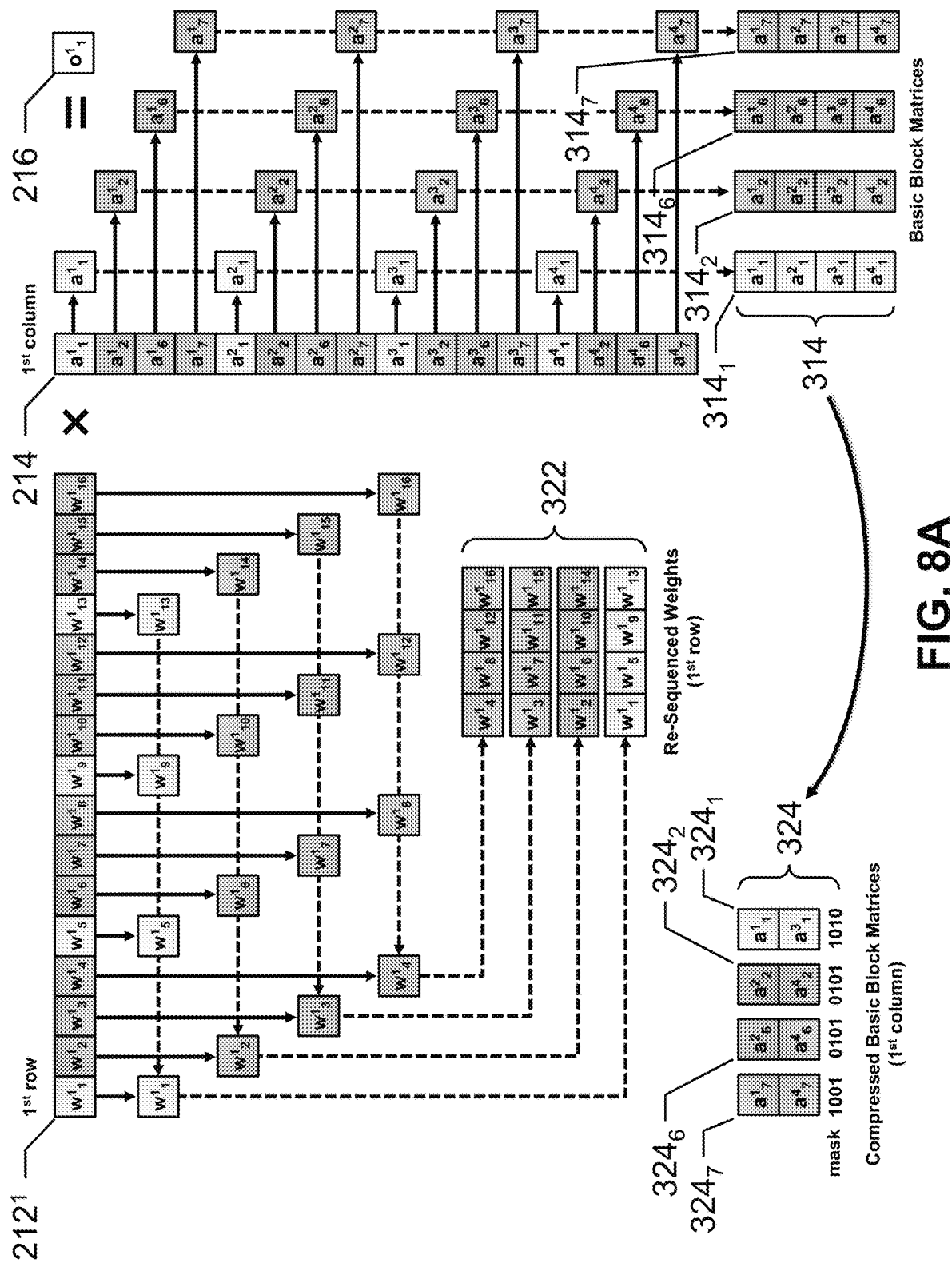
FIGS. 8A, 8B, 8C and 8D depict weight matrix re-sequencing and converted input data matrix re-sequencing and compression, in accordance with an embodiment of the present disclosure.

FIG. 8A depicts weight matrix re-sequencing and converted input data matrix re-sequencing and compression for output element $o^1{}_1$ of converted output data matrix 216. Output element $o^1{}_1$ is equal to the dot product of the first row of converted weight matrix 212, i.e., converted weight set $212^1$, and the first column of converted input data matrix 214, as follows:

$$o^1{}_1 = w^1{}_1 \cdot a^1{}_1 + w^1{}_2 \cdot a^1{}_2 + w^1{}_3 \cdot a^1{}_6 + w^1{}_4 \cdot a^1{}_7 + w^1{}_5 \cdot a^2{}_1 + w^1{}_6 \cdot a^2{}_2 +$$
$$w^1{}_7 \cdot a^2{}_7 + w^1{}_8 \cdot a^2{}_7 + w^1{}_9 \cdot a^3{}_1 + w^1{}_{10} \cdot a^3{}_2 + w^1{}_{11} \cdot a^3{}_6 +$$
$$w^1{}_{12} \cdot a^3{}_7 + w^1{}_{13} \cdot a^4{}_1 + w^1{}_{14} \cdot a^4{}_2 + w^1{}_{15} \cdot a^4{}_6 + w^1{}_{16} \cdot a^4{}_7$$

The dot product of the first row of converted weight matrix 212 and the first column of converted input data matrix 214 may be re-sequenced as follows:

$$o^1{}_1 = (w^1{}_1 \cdot a^1{}_1 + w^1{}_5 \cdot a^2{}_1 + w^1{}_9 \cdot a^3{}_1 + w^1{}_{13} \cdot a^4{}_1) +$$
$$(w^1{}_2 \cdot a^1{}_2 + w^1{}_6 \cdot a^2{}_2 + w^1{}_{10} \cdot a^3{}_2 + w^1{}_{14} \cdot a^4{}_2) +$$
$$(w^1{}_3 \cdot a^1{}_6 + w^1{}_7 \cdot a^2{}_6 + w^1{}_{11} \cdot a^3{}_6 + w^1{}_{15} \cdot a^4{}_6) +$$
$$(w^1{}_4 \cdot a^1{}_7 + w^1{}_8 \cdot a^2{}_7 + w^1{}_{12} \cdot a^3{}_7 + w^1{}_{16} \cdot a^4{}_7)$$

It is clear that the first column of converted input data matrix 214 includes four, interspersed basic block matrices 314, i.e., basic block matrix 314₁ (activations $a^1_1$, $a^2_1$, $a^3_1$ and $a^4_1$), basic block matrix 314₂ (activations $a^1_2$, $a^2_2$, $a^3_2$ and $a^4_2$), basic block matrix 314₆ (activations $a^1_6$, $a^2_6$, $a^3_6$ and $a^4_6$) and basic block matrix 314₇ (activations $a^1_7$, $a^2_7$, $a^3_7$ and $a^4_7$).

Advantageously, the first column of converted input data matrix 214 may be re-sequenced into basic block matrices 314₁, 314₂, 314₆ and 314₇, and then basic block matrices 314₁, 314₂, 314₆ and 314₇ may be compressed and replaced by compressed basic block matrices 324₁, 324₂, 324₆ and 324₇. Converted weight set 212¹ may also be re-sequenced to generate four weight groups 322; each weight group 322 corresponds to one of basic block matrices 314₁, 314₂, 314₆ and 314₇. The first weight group includes $w^1_1$, $w^1_5$, $w^1_9$ and $w^1_{13}$, the second weight group includes $w^1_2$, $w^1_6$, $w^1_{10}$ and $w^1_{14}$, the third weight group includes $w^1_3$, $w^1_7$, $w^1_{11}$ and $w^1_{15}$, and the fourth weight group includes $w^1_4$, $w^1_8$, $w^1_{12}$ and $w^1_{16}$.

Figure 8B:
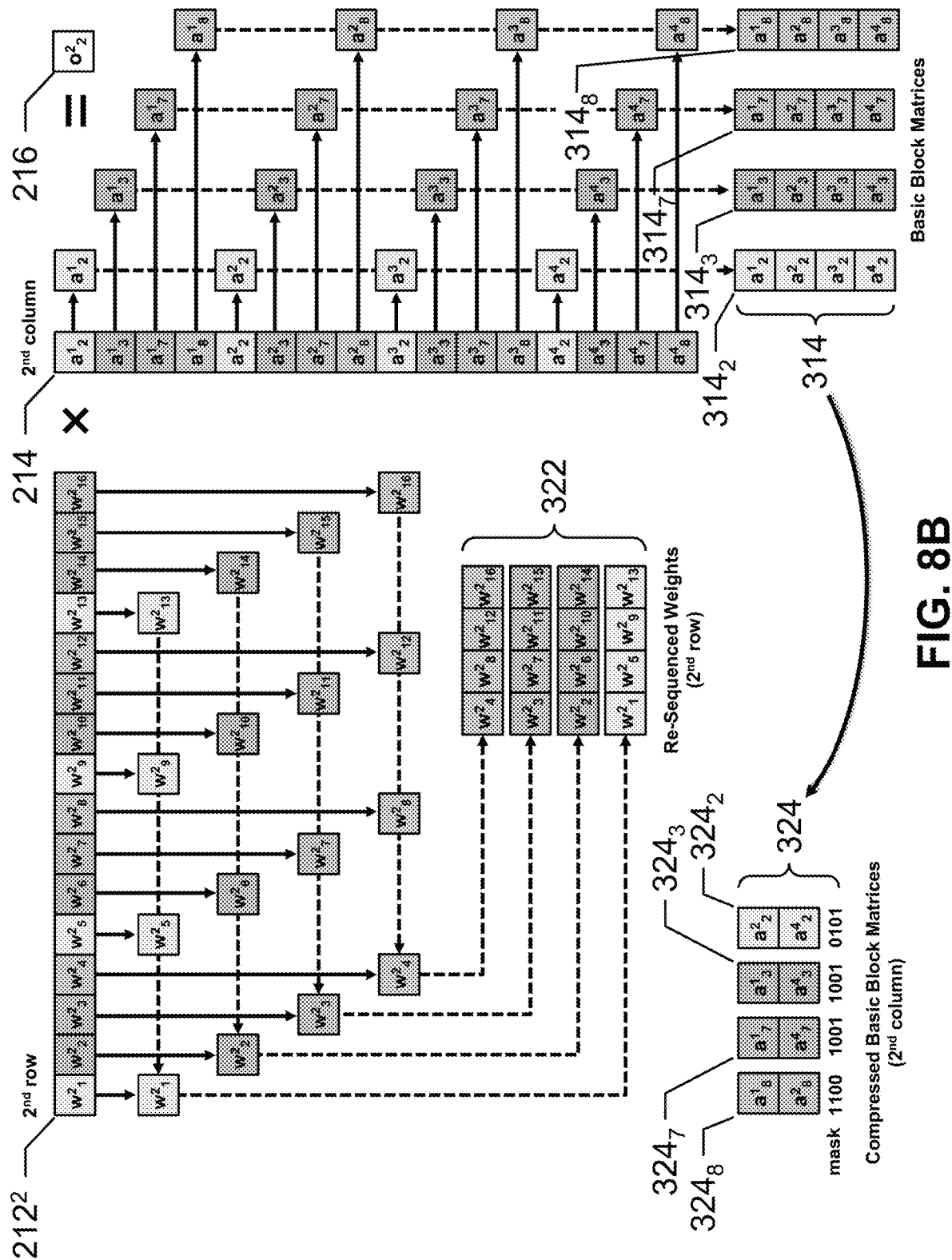

FIG. 8B depicts weight matrix re-sequencing and converted input data matrix re-sequencing and compression for output element $o^2_2$ of converted output data matrix 216. Output element $o^2_2$ is equal to the dot product of the second row of converted weight matrix 212, i.e., converted weight set 212², and the second column of converted input data matrix 214, as follows:

$$o^2_2 = w^2_1 \cdot a^1_2 + w^2_2 \cdot a^1_3 + w^2_3 \cdot a^1_7 + w^2_4 \cdot a^1_8 + w^2_5 \cdot a^2_2 + w^2_6 \cdot a^2_3 +$$
$$w^2_7 \cdot a^2_7 + w^2_8 \cdot a^2_8 + w^2_9 \cdot a^3_2 + w^2_{10} \cdot a^3_3 + w^2_{11} \cdot a^3_7 +$$
$$w^2_{12} \cdot a^3_8 + w^2_{13} \cdot a^4_2 + w^2_{14} \cdot a^4_3 + w^2_{15} \cdot a^4_7 + w^2_{16} \cdot a^4_8$$

The dot product of the second row of converted weight matrix 212 and the second column of converted input data matrix 214 may be re-sequenced as follows:

$$o^2_2 = (w^2_1 \cdot a^1_2 + w^2_5 \cdot a^2_2 + w^2_9 \cdot a^3_2 + w^2_{13} \cdot a^4_2) +$$
$$(w^2_2 \cdot a^1_3 + w^2_6 \cdot a^2_3 + w^2_{10} \cdot a^3_3 + w^2_{14} \cdot a^4_3) +$$
$$(w^2_3 \cdot a^1_7 + w^2_7 \cdot a^2_7 + w^2_{11} \cdot a^3_7 + w^2_{15} \cdot a^4_7) +$$
$$(w^2_4 \cdot a^1_8 + w^2_8 \cdot a^2_8 + w^2_{12} \cdot a^3_8 + w^2_{16} \cdot a^4_8)$$

It is clear that the second column of converted input data matrix 214 includes four, interspersed basic block matrices 314, i.e., basic block matrix 314₂ (activations $a^1_2$, $a^2_2$, $a^3_2$ and $a^4_2$), basic block matrix 314₃ (activations $a^1_3$, $a^2_3$, $a^3_3$ and $a^4_3$), basic block matrix 314₇ (activations $a^1_7$, $a^2_7$, $a^3_7$ and $a^4_7$) and basic block matrix 314₈ (activations $a^1_8$, $a^2_8$, $a^3_8$ and $a^4_8$).

Advantageously, the second column of converted input data matrix 214 may be re-sequenced into basic block matrices 314₂, 314₃, 314₇ and 314₈, and then basic block matrices 314₂, 314₃, 314₇ and 314₈ may be compressed and replaced by compressed basic block matrices 324₂, 324₃, 324₇ and 324₈. Converted weight set 212² may also be re-sequenced to generate four weight groups 322; each weight group 322 corresponds to one of basic block matrices 314₂, 314₃, 314₇ and 314₈. The first weight group includes $w^2_1$, $w^2_5$, $w^2_9$ and $w^2_{13}$, the second weight group includes $w^2_2$, $w^2_6$, $w^2_{10}$ and $w^2_{14}$, the third weight group includes $w^2_3$, $w^2_7$, $w^2_{11}$ and $w^2_{15}$, and the fourth weight group includes $w^2_4$, $w^2_8$, $w^2_{12}$ and $w^2_{16}$.

Figure 8C:
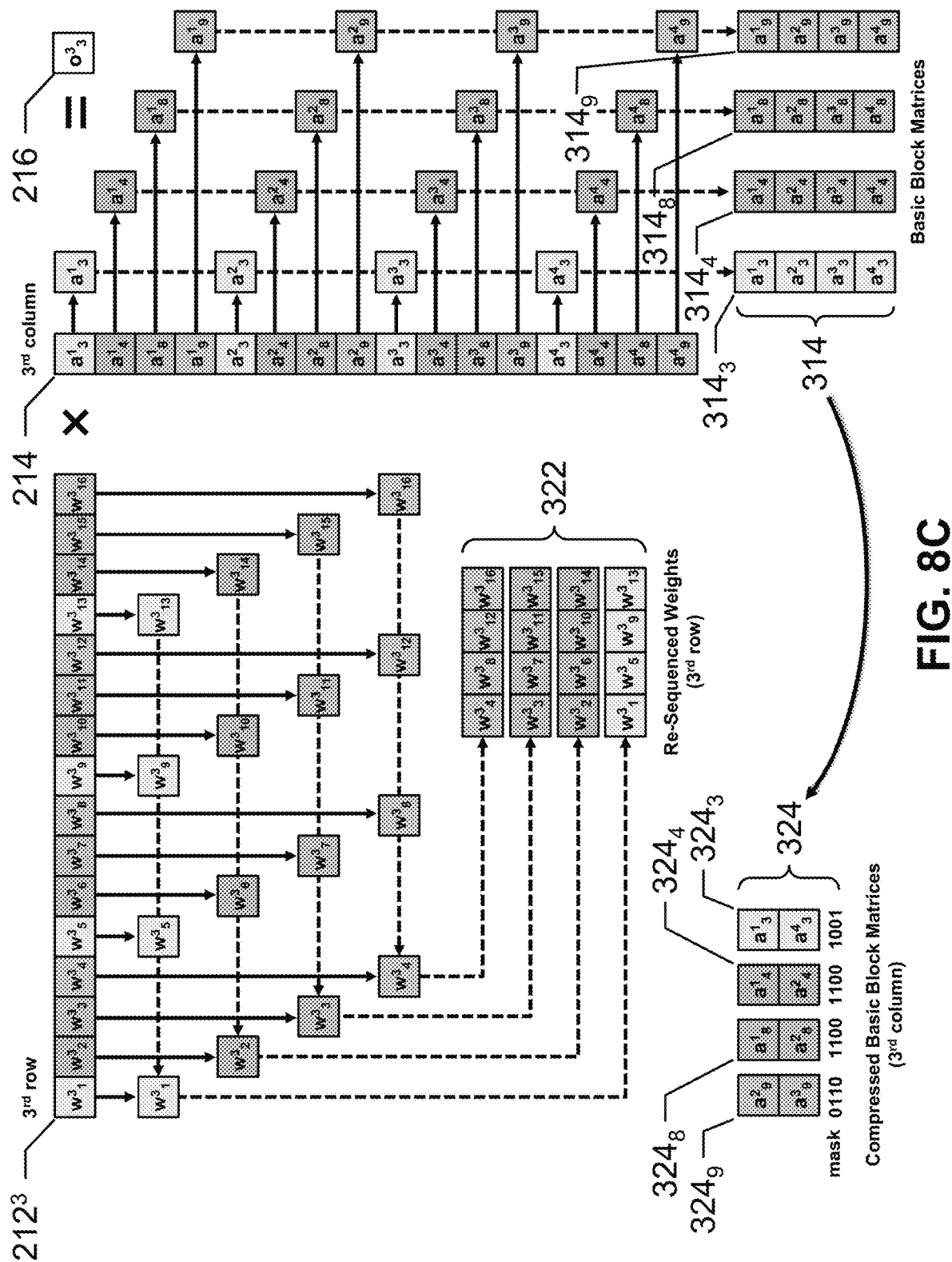

FIG. 8C depicts weight matrix re-sequencing and converted input data matrix re-sequencing and compression for output element $o^3_3$ of converted output data matrix 216. Output element $o^3_3$ is equal to the dot product of the third row of converted weight matrix 212, i.e., converted weight set 212³, and the third column of converted input data matrix 214, as follows:

$$o^3_3 = w^3_1 \cdot a^1_3 + w^3_2 \cdot a^1_4 + w^3_3 \cdot a^1_8 + w^3_4 \cdot a^1_9 + w^3_5 \cdot a^2_3 + w^3_6 \cdot a^2_4 +$$
$$w^3_7 \cdot a^2_8 + w^3_8 \cdot a^2_9 + w^3_9 \cdot a^3_3 + w^3_{10} \cdot a^3_4 + w^3_{11} \cdot a^3_8 +$$
$$w^3_{12} \cdot a^3_9 + w^3_{13} \cdot a^4_3 + w^3_{14} \cdot a^4_4 + w^3_{15} \cdot a^4_8 + w^3_{16} \cdot a^4_9$$

The dot product of the third row of converted weight matrix 212 and the third column of converted input data matrix 214 may be re-sequenced as follows:

$$o^3_3 = (w^3_1 \cdot a^1_3 + w^3_5 \cdot a^2_3 + w^3_9 \cdot a^3_3 + w^3_{13} \cdot a^4_3) +$$
$$(w^3_2 \cdot a^2_4 + w^3_6 \cdot a^2_4 + w^3_{10} \cdot a^3_4 + w^3_{14} \cdot a^4_4) +$$
$$(w^3_3 \cdot a^1_8 + w^3_7 \cdot a^2_8 + w^3_{11} \cdot a^3_8 + w^3_{15} \cdot a^4_8) +$$
$$(w^3_4 \cdot a^1_9 + w^3_8 \cdot a^2_9 + w^3_{12} \cdot a^3_9 + w^3_{16} \cdot a^4_9)$$

It is clear that the third column of converted input data matrix 214 includes four, interspersed basic block matrices 314, i.e., basic block matrix 314₃ (activations $a^1_3$, $a^2_3$, $a^3_3$ and $a^4_3$), basic block matrix 314₄ (activations $a^1_4$, $a^2_4$, $a^3_4$ and $a^4_4$), basic block matrix 314₈ (activations $a^1_8$, $a^2_8$, $a^3_8$ and $a^4_8$) and basic block matrix 314₉ (activations $a^1_9$, $a^2_9$, $a^3_9$ and $a^4_9$).

Advantageously, the third column of converted input data matrix 214 may be re-sequenced into basic block matrices 314₃, 314₄, 314₈ and 314₉, and then basic block matrices 314₃, 314₄, 314₈ and 314₉ may be compressed and replaced by compressed basic block matrices 324₃, 324₄, 324₈ and 324₉. Converted weight set 212³ may also be re-sequenced to generate four weight groups 322; each weight group 322 corresponds to one of basic block matrices 314₃, 314₄, 314₈ and 314₉. The first weight group includes $w^3_1$, $w^3_5$, $w^3_9$ and $w^3_{13}$, the second weight group includes $w^3_2$, $w^3_6$, $w^3_{10}$ and $w^3_{14}$, the third weight group includes $w^3_3$, $w^3_7$, $w^3_{11}$ and $w^3_{15}$, and the fourth weight group includes $w^3_4$, $w^3_8$, $w^3_{12}$ and $w^3_{16}$.

Figure 8D:
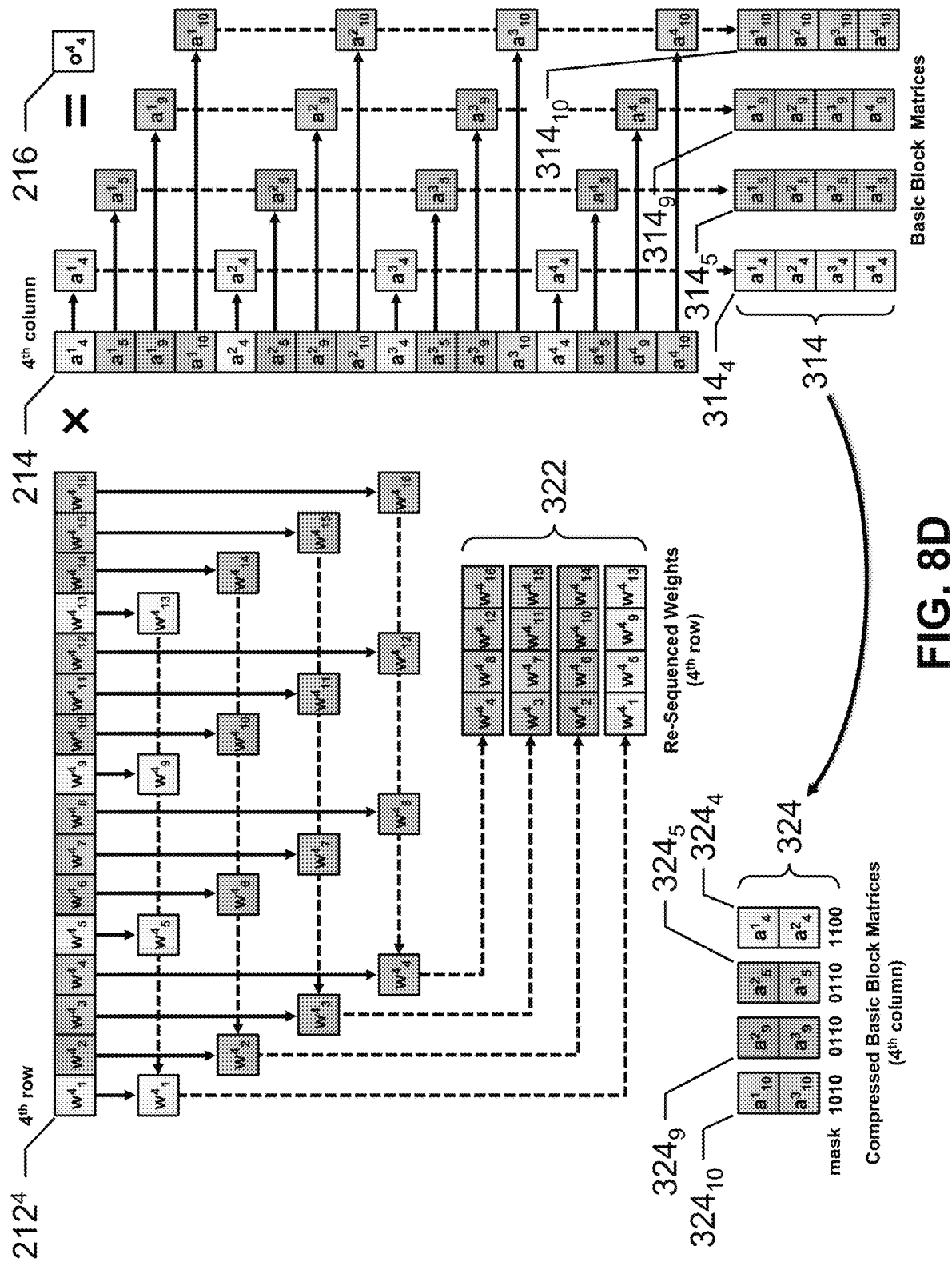

FIG. 8D depicts weight matrix re-sequencing and converted input data matrix re-sequencing and compression for output element $o^4_4$ of converted output data matrix 216. Output element $o^4_4$ is equal to the dot product of the fourth row of converted weight matrix 212, i.e., converted weight set 212⁴, and the fourth column of converted input data matrix 214, as follows:

$$o^4_4 = w^4_1 \cdot a^1_4 + w^4_2 \cdot a^1_5 + w^4_3 \cdot a^1_9 + w^4_4 \cdot a^1_{10} + w^4_5 \cdot a^2_4 + w^4_6 \cdot a^2_5 +$$
$$w^4_7 \cdot a^2_9 + w^4_8 \cdot a^2_{10} + w^4_9 \cdot a^3_4 + w^4_{10} \cdot a^3_5 + w^4_{11} \cdot a^3_9 +$$
$$w^4_{12} \cdot a^3_{10} + w^4_{13} \cdot a^4_4 + w^4_{14} \cdot a^4_5 + w^4_{15} \cdot a^4_9 + w^4_{16} \cdot a^4_{10}$$

The dot product of the fourth row of converted weight matrix 212 and the fourth column of converted input data matrix 214 may be re-sequenced as follows:

$$o^4{}_4 = (w^4{}_1 \cdot a^1{}_4 + w^4{}_5 \cdot a^2{}_4 + w^4{}_9 \cdot a^3{}_4 + w^4{}_{13} \cdot a^4{}_4) +$$
$$(w^4{}_2 \cdot a^2{}_5 + w^4{}_6 \cdot a^2{}_5 + w^4{}_{10} \cdot a^3{}_5 + w^4{}_{14} \cdot a^4{}_5) +$$
$$(w^4{}_3 \cdot a^1{}_9 + w^4{}_7 \cdot a^2{}_9 + w^4{}_{11} \cdot a^3{}_9 + w^4{}_{15} \cdot a^4{}_9) +$$
$$(w^4{}_4 \cdot a^1{}_{10} + w^4{}_8 \cdot a^2{}_{10} + w^4{}_{12} \cdot a^3{}_{10} + w^4{}_{16} \cdot a^4{}_{10})$$

It is clear that the fourth column of converted input data matrix 214 includes four, interspersed basic block matrices 314, i.e., basic block matrix $314_4$ (activations $a^1{}_4$, $a^2{}_4$, $a^3{}_4$ and $a^4{}_4$), basic block matrix $314_5$ (activations $a^1{}_5$, $a^2{}_5$, $a^3{}_5$ and $a^4{}_5$), basic block matrix $314_9$ (activations $a^1{}_9$, $a^2{}_9$, $a^3{}_9$ and $a^4{}_9$) and basic block matrix $314_{10}$ (activations $a^1{}_{10}$, $a^2{}_{10}$, $a^3{}_{10}$ and $a^4{}_{10}$).

Advantageously, the fourth column of converted input data matrix 214 may be re-sequenced into basic block matrices $314_4$, $314_5$, $314_9$ and $314_{10}$, and then basic block matrices $314_4$, $314_5$, $314_9$ and $314_{10}$ may be compressed and replaced by compressed basic block matrices $324_4$, $324_5$, $324_9$ and $324_{10}$. Converted weight set $212^4$ may also be re-sequenced to generate four weight groups 322; each weight group 322 corresponds to one of basic block matrices $314_4$, $314_5$, $314_9$ and $314_{10}$. The first weight group includes $w^4{}_1$, $w^4{}_5$, $w^4{}_9$ and $w^4{}_{13}$, the second weight group includes $w^4{}_2$, $w^4{}_6$, $w^4{}_{10}$ and $w^4{}_{14}$, the third weight group includes $w^4{}_3$, $w^4{}_7$, $w^4{}_{11}$ and $w^4{}_{15}$, and the fourth weight group includes $w^4{}_4$, $w^4{}_8$, $w^4{}_{12}$ and $w^4{}_{16}$.

This re-sequencing and compression may be performed in software or hardware.

Figure 9:
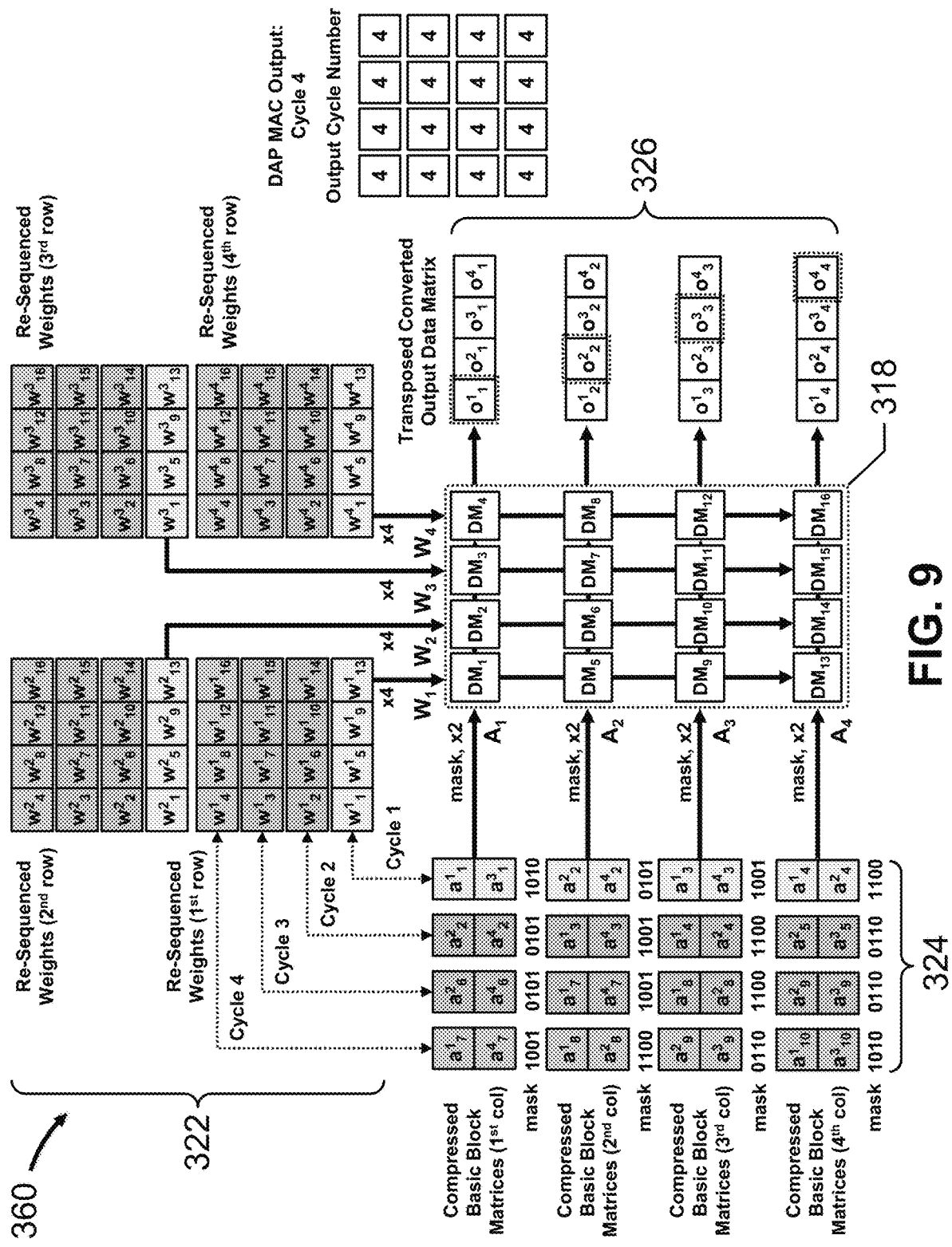
FIG. 9 depicts a data flow diagram for DAP MAC array, in accordance with an embodiment of the present disclosure.

FIG. 9 depicts a data flow diagram 360 for DAP MAC array 318, in accordance with an embodiment of the present disclosure.

Each DAP MAC (DM) unit calculates a dot product, between a row of converted weight matrix 212 and a column of converted input data matrix 214, to generate an element of converted output data matrix 216. Generally, the rows from converted weight matrix 212 are read from local memory, re-sequenced, and provided to DAP MAC array 318 as a number of weight groups 322. Similarly, the columns from converted input data matrix 214 are read from local memory, re-sequenced and compressed, and provided to DAP MAC array 318 as a number of compressed basic block matrices 324. Each DAP MAC unit includes, inter alia, a data selection circuit, two or more multiplexers, two or more multipliers, an adder and a storage register, and is reset by clearing or zeroing its storage register prior to, or at the start of, a new dot product calculation.

In this embodiment, each row of converted weight matrix 212 is re-sequenced and then divided into a number of weight groups, as discussed above. Each weight group from each row is simultaneously provided to all of the DAP MAC units in one column during a different processing cycle.

More particularly, the re-sequenced weight groups of the first row of converted weight matrix 212 (i.e., converted weight matrix $212^1$) are provided to the first column of DAP MAC units in DAP MAC array 318 (i.e., $DM_1$, $DM_5$, $DM_9$ and $DM_{13}$). The re-sequenced weight groups of the second row of converted weight matrix 212 (i.e., converted weight matrix $212^2$) are provided to the second column of DAP MAC units in DAP MAC array 318 (i.e., $DM_2$, $DM_6$, $DM_{10}$ and $DM_{14}$). The re-sequenced weight groups of the third row of converted weight matrix 212 (i.e., converted weight matrix $212^3$) are provided to the third column of DAP MAC units in DAP MAC array 318 (i.e., $DM_3$, $DM_7$, $DM_{11}$ and $DM_{15}$). The re-sequenced weight groups of the fourth row of converted weight matrix 212 (i.e., converted weight matrix $212^4$) are provided to the fourth column of DAP MAC units in DAP MAC array 318 (i.e., $DM_4$, $DM_8$, $DM_{12}$ and $DM_{16}$).

Similarly, each column of converted input data matrix 214 is re-sequenced and compressed into a number of compressed basic block matrices 324, as discussed above. Each compressed basic block matrix 324 from each column is simultaneously provided to all of the DAP MAC units in one row during a different processing cycle.

More particularly, the compressed basic block matrices 324 of the first column of converted input data matrix 214 are provided to the first row of DAP MAC units in DAP MAC array 318 (i.e., $DM_1$, $DM_2$, $DM_3$ and $DM_4$). The compressed basic block matrices 324 of the $5^{th}$, $9^{th}$ and $13^{th}$ columns are also provided to the first row of DAP MAC units during later processing cycles. The compressed basic block matrices 324 of the second column of converted input data matrix 214 are provided to the second row of DAP MAC units in DAP MAC array 318 (i.e., $DM_5$, $DM_6$, $DM_7$ and $DM_8$). The compressed basic block matrices 324 of the $6^{th}$, $10^{th}$ and $14^{th}$ columns are also provided to the second row of DAP MAC units during later processing cycles. The compressed basic block matrices 324 of the third column of converted input data matrix 214 are provided to the third row of DAP MAC units in DAP MAC array 318 (i.e., $DM_9$, $DM_{10}$, $DM_{11}$ and $DM_{12}$). The compressed basic block matrices 324 of the $7^{th}$, $11^{th}$ and $15^{th}$ columns are also provided to the third row of DAP MAC units during later processing cycles. The compressed basic block matrices 324 of the fourth column of converted input data matrix 214 are provided to the fourth row of DAP MAC units in DAP MAC array 318 (i.e., $DM_{13}$, $DM_{14}$, $DM_{15}$ and $DM_{16}$). The compressed basic block matrices 324 of the $8^{th}$, $12^{th}$ and $16^{th}$ columns are also provided to the fourth row of DAP MAC units during later processing cycles.

In another embodiment, the weights groups and compressed basic block matrices 324 may be provided to DAP MAC array 318 using delay registers or flip flops similar to those described for MAC array 218. While the principle of operation is the same, the number of delay registers for the rows of DAP MAC array 318 is doubled, i.e., two delay registers for the second row, four delay registers for the third row and six delay register for the fourth row, due to the presentation of two activation elements per compressed basic block matrix during each processing cycle. Similarly, the number of delay registers for the columns of DAP MAC array 318 is quadrupled, i.e., four delay registers for the second column, eight delay registers for the third column and 12 delay registers for the fourth column, due to the presentation of four weights per weight group during each processing cycle. Larger weight group sizes and compressed basic block matrix dimensions are also contemplated, which would require additional delay registers.

The first row of DAP MAC array 318 includes DAP MAC units $DM_1$, $DM_2$, $DM_3$ and $DM_4$. The dot product calculations performed by $DM_1$ for the blocks of the first quadrants $a^1{}_{q1}$, $a^2{}_{q1}$, $a^3{}_{q1}$ and $a^4{}_{q1}$ of converted input data matrix 214 are discussed in detail below, while the dot product calculations performed by $DM_2$, $DM_3$ and $DM_4$ are summarized below. $DM_1$ calculates the dot product of the first row of converted weight matrix 212 (i.e., converted weight set $212^1$) and the first column of converted input data matrix 214 to generate element $o^1{}_1$ of converted output data matrix 216.

During the processing cycle 1, $DM_1$ receives $w^1{}_1$, $w^1{}_5$, $w^1{}_9$, $w^1{}_{13}$, $a^1{}_1$, $a^3{}_1$ and mask "1010" from local memory, selects $w^1{}_1$ and $w^1{}_9$ based on mask "1010", multiplies $w^1{}_1$ and $a^1_1$ to generate a first intermediate product, multiples $w^1_9$ and $a^3_1$ to generate a second intermediate product, adds the first and second intermediate products to the value stored in the storage register (i.e., 0), and stores the accumulated result back in the storage register.

During the processing cycle 2, $DM_1$ receives $w^1_2$, $w^1_6$, $w^1_{10}$, $w^1_{14}$, $a^2_2$, $a^4_2$ and mask "0101" from local memory, selects $w^1_6$ and $w^1_{14}$ based on mask "0101", multiplies $w^1_6$ and $a^2_2$ to generate a first intermediate product, multiples $w^1_{14}$ and $a^4_2$ to generate a second intermediate product, adds the first and second intermediate products to the value stored in the storage register, and stores the accumulated result back in the storage register.

During the processing cycle 3, $DM_1$ receives $w^1_3$, $w^1_7$, $w^1_{11}$, $w^1_{15}$, $a^2_6$, $a^4_6$ and mask "0101" from local memory, selects $w^1_7$ and $w^1_{15}$ based on mask "0101", multiplies $w^1_7$ and $a^2_6$ to generate a first intermediate product, multiples $w^1_{15}$ and $a^4_6$ to generate a second intermediate product, adds the first and second intermediate products to the value stored in the storage register, and stores the accumulated result back in the storage register.

During the processing cycle 4, $DM_1$ receives $w^1_4$, $w^1_8$, $w^1_{12}$, $w^1_{16}$, $a^1_7$, $a^4_7$ and mask "1001" from local memory, selects $w^1_4$ and $w^1_{16}$ based on mask "1001", multiplies $w^1_4$ and $a^2_7$ to generate a first intermediate product, multiples $w^1_{16}$ and $a^4_7$ to generate a second intermediate product, adds the first and second intermediate products to the value stored in the storage register, and stores the accumulated result back in the storage register. At the end of the processing cycle 4, $DM_1$ outputs element $o^1_1$.

The remainder of the first row of DAP MAC array 318 includes $DM_2$, $DM_3$ and $DM_4$. These DAP MAC units operate in the same manner as $DM_1$ but receive weight groups from the second, third and fourth rows of converted weight matrix 212, respectively.

The second row of DAP MAC array 318 includes DAP MAC units $DM_5$, $DM_6$, $DM_7$ and $DM_8$. The dot product calculations performed by $DM_5$ for the blocks of the first quadrants $a^1_{q1}$, $a^2_{q1}$, $a^3_{q1}$ and $a^4_{q1}$ of converted input data matrix 214 are discussed in detail below, while the dot product calculations performed by $DM_6$, $DM_7$ and $DM_8$ are summarized below. $DM_5$ calculates the dot product of the first row of converted weight matrix 212 (i.e., converted weight set $212^1$) and the second column of converted input data matrix 214 to generate element $o^1_2$ of converted output data matrix 216.

During the processing cycle 1, $DM_5$ receives $w^1_1$, $w^1_5$, $w^1_9$, $w^1_{13}$, $a^2_2$, $a^4_2$ and mask "0101" from local memory, selects $w^1_5$ and $w^1_{13}$ based on mask "0101", multiplies $w^1_5$ and $a^2_2$ to generate a first intermediate product, multiples $w^1_{13}$ and $a^4_2$ to generate a second intermediate product, adds the first and second intermediate products to the value stored in the storage register (i.e., 0), and stores the accumulated result back in the storage register.

During the processing cycle 2, $DM_5$ receives $w^1_2$, $w^1_6$, $w^1_{10}$, $w^1_{14}$, $a^1_3$, $a^4_3$ and mask "1001" from local memory, selects $w^1_2$ and $w^1_{14}$ based on mask "1001", multiplies $w^1_2$ and $a^1_3$ to generate a first intermediate product, multiples $w^1_{14}$ and $a^4_3$ to generate a second intermediate product, adds the first and second intermediate products to the value stored in the storage register, and stores the accumulated result back in the storage register.

During the processing cycle 3, $DM_5$ receives $w^1_3$, $w^1_7$, $w^1_{11}$, $w^1_{15}$, $a^1_7$, $a^4_7$ and mask "1001" from local memory, selects $w^1_3$ and $w^1_{15}$ based on mask "1001", multiplies $w^1_7$ and $a^1_7$ to generate a first intermediate product, multiples $w^1_{15}$ and $a^4_7$ to generate a second intermediate product, adds the first and second intermediate products to the value stored in the storage register, and stores the accumulated result back in the storage register.

During the processing cycle 4, $DM_5$ receives $w^1_4$, $w^1_8$, $w^1_{12}$, $w^1_{16}$, $a^1_8$, $a^2_8$ and mask "1100" from local memory, selects $w^1_4$ and $w^1_8$ based on mask "1100", multiplies $w^1_4$ and $a^1_8$ to generate a first intermediate product, multiples $w^1_8$ and $a^2_8$ to generate a second intermediate product, adds the first and second intermediate products to the value stored in the storage register, and stores the accumulated result back in the storage register. At the end of the processing cycle 4, $DM_5$ outputs element $o^1_2$.

The remainder of the second row of DAP MAC array 318 includes $DM_6$, $DM_7$ and $DM_8$. These DAP MAC units operate in the same manner as $DM_5$ but receive weight groups from the second, third and fourth rows of converted weight matrix 212, respectively.

The third row of DAP MAC array 318 includes DAP MAC units $DM_9$, $DM_{10}$, $DM_{11}$ and $DM_{12}$. The dot product calculations performed by $DM_9$ for the blocks of the first quadrants $a^1_{q1}$, $a^2_{q1}$, $a^3_{q1}$ and $a^4_{q1}$ of converted input data matrix 214 are discussed in detail below, while the dot product calculations performed by $DM_{10}$, $DM_{11}$ and $DM_{12}$ are summarized below. $DM_9$ calculates the dot product of the first row of converted weight matrix 212 (i.e., converted weight set $212^1$) and the third column of converted input data matrix 214 to generate element $o^1_3$ of converted output data matrix 216.

During the processing cycle 1, $DM_9$ receives $w^1_1$, $w^1_5$, $w^1_9$, $w^1_{13}$, $a^1_3$, $a^4_3$ and mask "1001" from local memory, selects $w^1_1$ and $w^1_{13}$ based on mask "1001", multiplies $w^1_1$ and $a^1_3$ to generate a first intermediate product, multiples $w^1_{13}$ and $a^4_3$ to generate a second intermediate product, adds the first and second intermediate products to the value stored in the storage register (i.e., 0), and stores the accumulated result back in the storage register.

During the processing cycle 2, $DM_9$ receives $w^1_2$, $w^1_6$, $w^1_{10}$, $w^1_{14}$, $a^1_4$, $a^2_4$ and mask "1100" from local memory, selects $w^1_2$ and $w^1_6$ based on mask "1100", multiplies $w^1_2$ and $a^1_4$ to generate a first intermediate product, multiples $w^1_6$ and $a^2_4$ to generate a second intermediate product, adds the first and second intermediate products to the value stored in the storage register, and stores the accumulated result back in the storage register.

During the processing cycle 3, $DM_9$ receives $w^1_3$, $w^1_7$, $w^1_{11}$, $w^1_{15}$, $a^1_8$, $a^2_8$ and mask "1100" from local memory, selects $w^1_3$ and $w^1_7$ based on mask "1100", multiplies $w^1_3$ and $a^1_8$ to generate a first intermediate product, multiples $w^1_7$ and $a^2_8$ to generate a second intermediate product, adds the first and second intermediate products to the value stored in the storage register, and stores the accumulated result back in the storage register.

During the processing cycle 4, $DM_9$ receives $w^1_4$, $w^1_8$, $w^1_{12}$, $w^1_{16}$, $a^2_9$, $a^3_9$ and mask "0110" from local memory, selects $w^1_8$ and $w^1_{12}$ based on mask "0110", multiplies $w^1_8$ and $a^2_9$ to generate a first intermediate product, multiples $w^1_{12}$ and $a^3_9$ to generate a second intermediate product, adds the first and second intermediate products to the value stored in the storage register, and stores the accumulated result back in the storage register. At the end of the processing cycle 4, $DM_9$ outputs element $o^1_3$.

The remainder of the third row of DAP MAC array 318 includes $DM_{10}$, $DM_{11}$ and $DM_{12}$. These DAP MAC units operate in the same manner as $DM_9$ but receive weight groups from the second, third and fourth rows of converted weight matrix 212, respectively.

The fourth row of DAP MAC array 318 includes DAP MAC units $DM_{13}$, $DM_{14}$, $DM_{15}$ and $DM_{16}$. The dot product calculations performed by $DM_{13}$ for the blocks of the first quadrants $a^1_{q1}$, $a^2_{q1}$, $a^3_{q1}$ and $a^4_{q1}$ of converted input data matrix 214 are discussed in detail below, while the dot product calculations performed by $DM_{14}$, $DM_{15}$ and $DM_{16}$ are summarized below. $DM_{13}$ calculates the dot product of the first row of converted weight matrix 212 (i.e., converted weight set $212^1$) and the fourth column of converted input data matrix 214 to generate element $o^1_4$ of converted output data matrix 216.

During the processing cycle 1, $DM_{13}$ receives $w^1_1$, $w^1_5$, $w^1_9$, $w^1_{13}$, $a^1_4$, $a^2_4$ and mask "1100" from local memory, selects $w^1_1$ and $w^1_5$ based on mask "1100", multiplies $w^1_1$ and $a^1_4$ to generate a first intermediate product, multiples $w^1_5$ and $a^2_4$ to generate a second intermediate product, adds the first and second intermediate products to the value stored in the storage register (i.e., 0), and stores the accumulated result back in the storage register.

During the processing cycle 2, $DM_{13}$ receives $w^1_2$, $w^1_6$, $w^1_{10}$, $w^1_{14}$, $a^2_5$, $a^3_5$ and mask "0110" from local memory, selects $w^1_6$ and $w^1_{10}$ based on mask "0110", multiplies $w^1_6$ and $a^2_5$ to generate a first intermediate product, multiplies $w^1_{10}$ and $a^3_5$ to generate a second intermediate product, adds the first and second intermediate products to the value stored in the storage register, and stores the accumulated result back in the storage register.

During the processing cycle 3, $DM_{13}$ receives $w^1_3$, $w^1_7$, $w^1_{11}$, $w^1_{15}$, $a^2_9$, $a^3_9$ and mask "0110" from local memory, selects $w^1_7$ and $w^1_{11}$ based on mask "0110", multiplies $w^1_7$ and $a^2_9$ to generate a first intermediate product, multiples $w^1_{11}$ and $a^3_9$ to generate a second intermediate product, adds the first and second intermediate products to the value stored in the storage register, and stores the accumulated result back in the storage register.

During the processing cycle 4, $DM_{13}$ receives $w^1_4$, $w^1_8$, $w^1_{12}$, $w^1_{16}$, $a^1_{10}$, $a^3_{10}$ and mask "1010" from local memory, selects $w^1_4$ and $w^1_{12}$ based on mask "1010", multiplies $w^1_4$ and $a^1_{10}$ to generate a first intermediate product, multiples $w^1_{12}$ and $a^3_{10}$ to generate a second intermediate product, adds the first and second intermediate products to the value stored in the storage register, and stores the accumulated result back in the storage register. At the end of the processing cycle 4, $DM_{13}$ outputs element $o^1_4$.

The remainder of the fourth row of DAP MAC array 318 includes $DM_{10}$, $DM_{11}$ and $DM_{12}$. These DAP MAC units operate in the same manner as $DM_9$ but receive weight groups from the second, third and fourth rows of converted weight matrix 212, respectively.

After the blocks of the first quadrants $a^1_{q1}$, $a^2_{q1}$, $a^3_{q1}$ and $a^4_{q1}$ of converted input data matrix 214 have been processed, the next sequence of operations processes the blocks of the second quadrants $a^1_{q2}$, $a^2_{q2}$, $a^3_{q2}$ and $a^4_{q2}$. After the blocks of the second quadrants $a^1_{q2}$, $a^2_{q2}$, $a^3_{q2}$ and $a^4_{q2}$ have been processed, the next sequence of operations processes the blocks of the third quadrants $a^1_{q3}$, $a^2_{q3}$, $a^3_{q3}$ and $a^4_{q3}$. And, after the blocks of the third quadrants $a^1_{q2}$, $a^2_{q3}$, $a^3_{q3}$ and $a^4_{q3}$ have been processed, the final sequence of operations processes the blocks of the fourth quadrants $a^1_{q4}$, $a^2_{q4}$, $a^3_{q4}$ and $a^4_{q4}$. Converted weight matrix 212 is accessed for each sequence of operations.

Advantageously, compressed basic block matrices 324 may retain their compressed form in the datapath. In another embodiment, converted weight matrix 212 may be compressed in a similar manner, and each compressed weight set may include a mask to identify weights with non-zero values.

Figure 10:
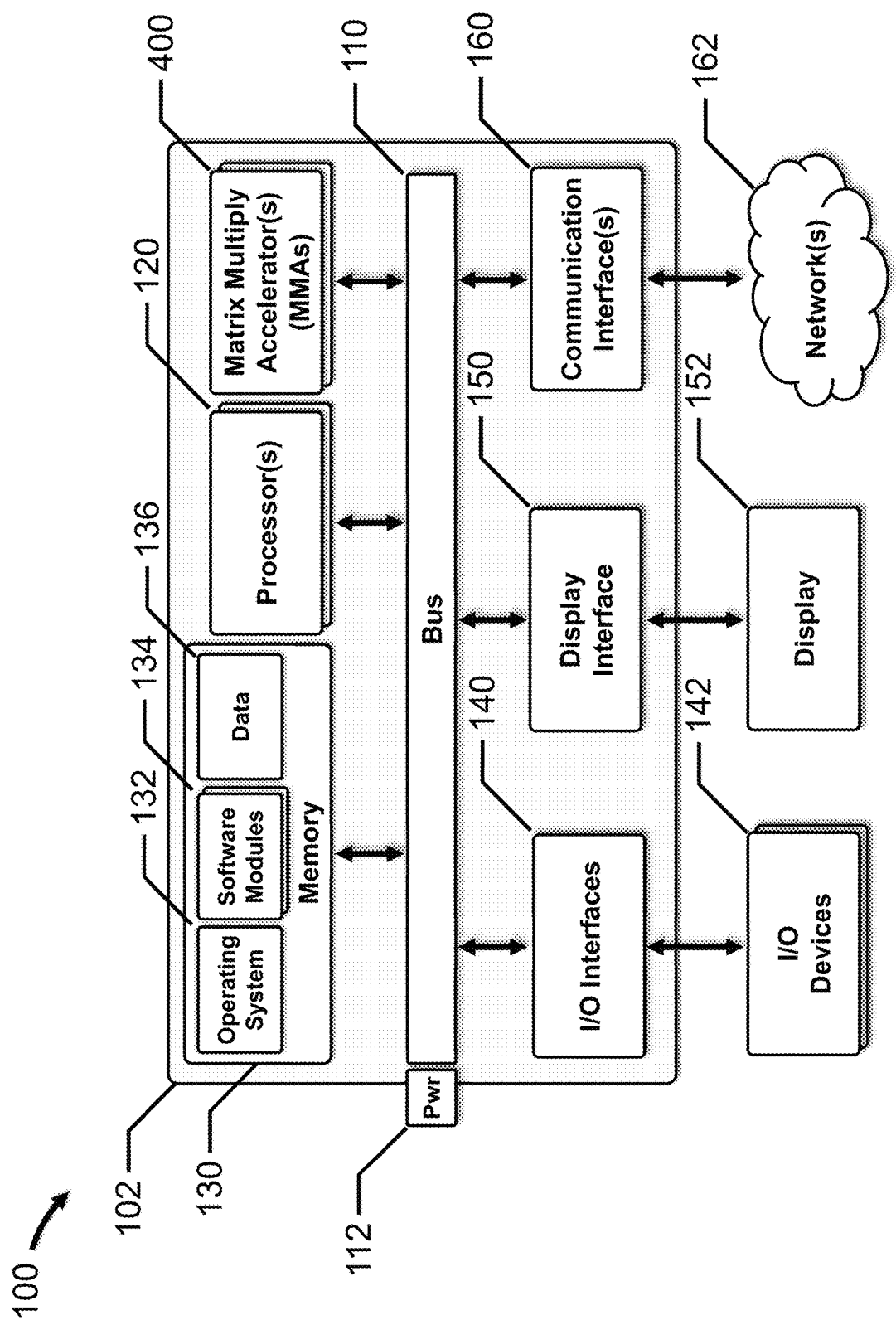
FIG. 10 depicts a block diagram of system, in accordance with an embodiment of the present disclosure.

FIG. 10 depicts a block diagram of system 100, in accordance with an embodiment of the present disclosure.

Computer 102 includes bus 110 coupled to one or more processors 120, memory 130, I/O interfaces 140, display interface 150, one or more communication interfaces 160 and one or more MMAs 400. Generally, I/O interfaces 140 are coupled to I/O devices 142 using a wired or wireless connection, display interface 150 is coupled to display 152, and communication interface 160 is connected to network 162 using a wired or wireless connection.

Bus 110 is a communication system that transfers data between processor 120, memory 130, I/O interfaces 140, display interface 150, communication interface 160, MMA 400, as well as other components not depicted in FIG. 1. Power connector 112 is coupled to bus 110 and a power supply (not shown).

Processor 120 includes one or more general-purpose or application-specific microprocessors that executes instructions to perform control, computation, input/output, etc. functions for computer 102. Processor 120 may include a single integrated circuit, such as a micro-processing device, or multiple integrated circuit devices and/or circuit boards working in cooperation to accomplish the functions of processor 120. In addition, processor 120 may execute computer programs or modules, such as operating system 132, software modules 134, etc., stored within memory 130. For example, software modules 134 may include an ML application, an ANN application, a CNN application, etc.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of random access memory (RAM), dynamic RAM (DRAM), static RAM (SRAM), read only memory (ROM), flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for computer 102. Software modules 134 provide various functionality, such as image classification using convolutional neural networks, etc. Data 136 may include data associated with operating system 132, software modules 134, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WIFI™ BLUETOOTH™ cellular, etc.

Generally, I/O devices 142 provide input to computer 102 and/or output from computer 102. As discussed above, I/O devices 142 are operably connected to computer 102 using a wired and/or wireless connection. I/O devices 142 may include a local processor coupled to a communication interface that is configured to communicate with computer 102 using the wired and/or wireless connection. For example, I/O devices 142 may include a keyboard, mouse, touch pad, joystick, etc.

Display interface 150 is configured to transmit image data from computer 102 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, BLUETOOTH™, etc. Network 162 may also include various combinations of wired and/or wireless physical layers, such as, for example, copper wire or coaxial cable networks, fiber optic networks, BLUETOOTH™ wireless networks, WIFI™ wireless networks, CDMA, FDMA and TDMA cellular wireless networks, etc.

MMA 400 is configured to multiply matrices and generate output matrices to support various applications implemented by software modules 134.

Figure 11:
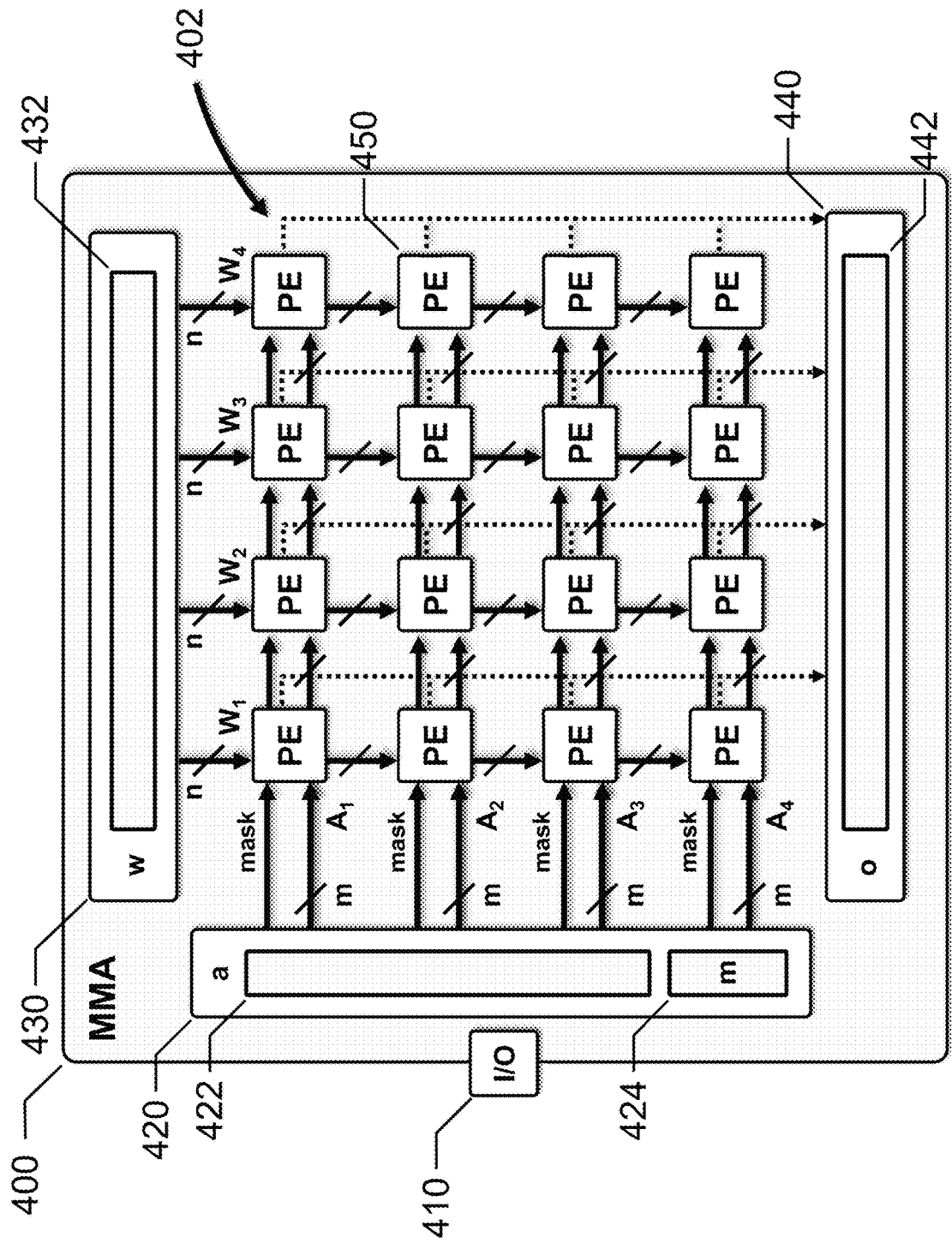
FIG. 11 depicts a block diagram of a matrix multiply accelerator (MMA), in accordance with an embodiment of the present disclosure.

FIG. 11 depict a block diagram of MMA 400, in accordance with embodiments of the present disclosure.

MMA 400 includes PE array 402, I/O interface 410, register 420, register 430 and register 440.

In this embodiment, PE array 402 includes 16 PEs 450 arranged in a 4×4 array; other numbers of PEs 450 and arrangements are also contemplated, such as, for example, four PEs 450 arranged in a 2×2 array, nine PEs 450 arranged in a 3×3 array, 25 PEs 450 arranged in a 5×5 array, 36 PEs 450 arranged in a 6×6 array, 49 PEs 450 arranged in a 7×7 array, 64 PEs 450 arranged in a 8×8 array, etc. Non-symmetric arrangements, such as a 2×3 array, a 3×4 array, a 4×5 array, a 4×6 array, etc., may be advantageous for certain applications. Each PE 450 is coupled to register 420, register 430 and register 440, and calculates a dot product for one element of converted output data matrix 216.

For example, the PE 450 located in the first row and the first column (i.e., upper left corner) of PE array 402 calculates the dot products of the $1^{st}$ row of converted weight matrix 212 and the $1^{st}$, $5^{th}$, $9^{th}$ and $13^{th}$ columns of converted input data matrix 214 to generate the $o^1_1$, $o^1_5$, $o^1_9$ and $o^1_{13}$ elements of converted output data matrix 216, as discussed above with respect to DAP MAC unit $DM_1$.

I/O interface 410 is coupled to bus 110, register 420, register 430 and register 440. I/O interface 410 includes a microcontroller that sends data to, and receives data and commands from, processor 120, memory 130, etc. The microcontroller implements a set of instructions that controls the data flow and the operation of PEs 450.

In some embodiments, a dedicated controller, microcontroller, field programmable gate array (FPGA), etc., may control the data flow and the operation of MMA 400. For example, the controller may implement load/store (L/S) instructions, memory mapped I/O (MMIO), direct memory access (DMA), etc., to load the compressed matrices and corresponding masks into register 420 and the weights into register 430, start the matrix multiply operation, read back the output matrix from register 440, etc. More particularly, one or more software modules 134, executing on processor 120, may calculate the masks and compress the matrices, send these data and the appropriate commands to MMA 400 to upload registers 420 and 430, start the matrix multiply operation, read back the results from register 440, etc.

Register 420 includes vector register 422 and scalar register 424. Vector register 422 stores the elements of the compressed matrices in the multiplication operation, such as compressed basic block matrices 324. Scalar register 424 stores the masks associated with the compressed matrices in the multiplication operation. In this embodiment, scalar register 424 is 32 bits wide, and vector register 422 is 8 elements wide, each element being the same size as the data contained within compressed basic block matrices 324, such as, for example, 8 bit integer data, 16 bit integer data, 32 bit integer data, 16 bit floating point data, 16 bit Bfloat data, 32 bit floating point data, etc.

Generally, vector register 422 simultaneously provides "m" elements to each row of PEs 450 in PE array 402. In this embodiment, vector register 422 simultaneously provides two elements to each row of PEs 450 in PE array 402. In certain embodiments, vector register 422 may be divided into four individual vector registers, while in other embodiments, vector register 422 may be a single register.

Register 430 includes vector register 432. Vector register 432 stores the elements of the other matrix in the multiplication operation, such as converted weight matrix 212. In this embodiment, vector register 432 is 16 elements wide, each element being the same size as the data contained within converted weight matrix 212, such as, for example, 8 bit integer data, 16 bit integer data, 32 bit integer data, 16 bit floating point data, 16 bit Bfloat data, 32 bit floating point data, etc.

Generally, vector register 432 simultaneously provides "n" elements to each column of PEs 450 in PE array 402. In this embodiment, vector register 432 simultaneously provides four elements to each column of PEs 450 in PE array 402. IN certain embodiments, vector register 432 may be divided into four individual vector registers, one for each row of converted weight matrix 212, while in other embodiments, vector register 432 may be a single register.

Register 440 includes vector register 442, which stores the elements of the output matrix in the multiplication operation, such as converted output data matrix 216. In this embodiment, vector register 442 is 16 elements wide, each element being the same size as the data contained within converted output data matrix 216, such as, for example, 8 bit integer data, 16 bit integer data, 32 bit integer data, 16 bit floating point data, 16 bit Bfloat data, 32 bit floating point data, etc. Vector registers 422, 432 and 442 all have the same size, such as, for example, 8 bit integer data, etc.

Figure 12:
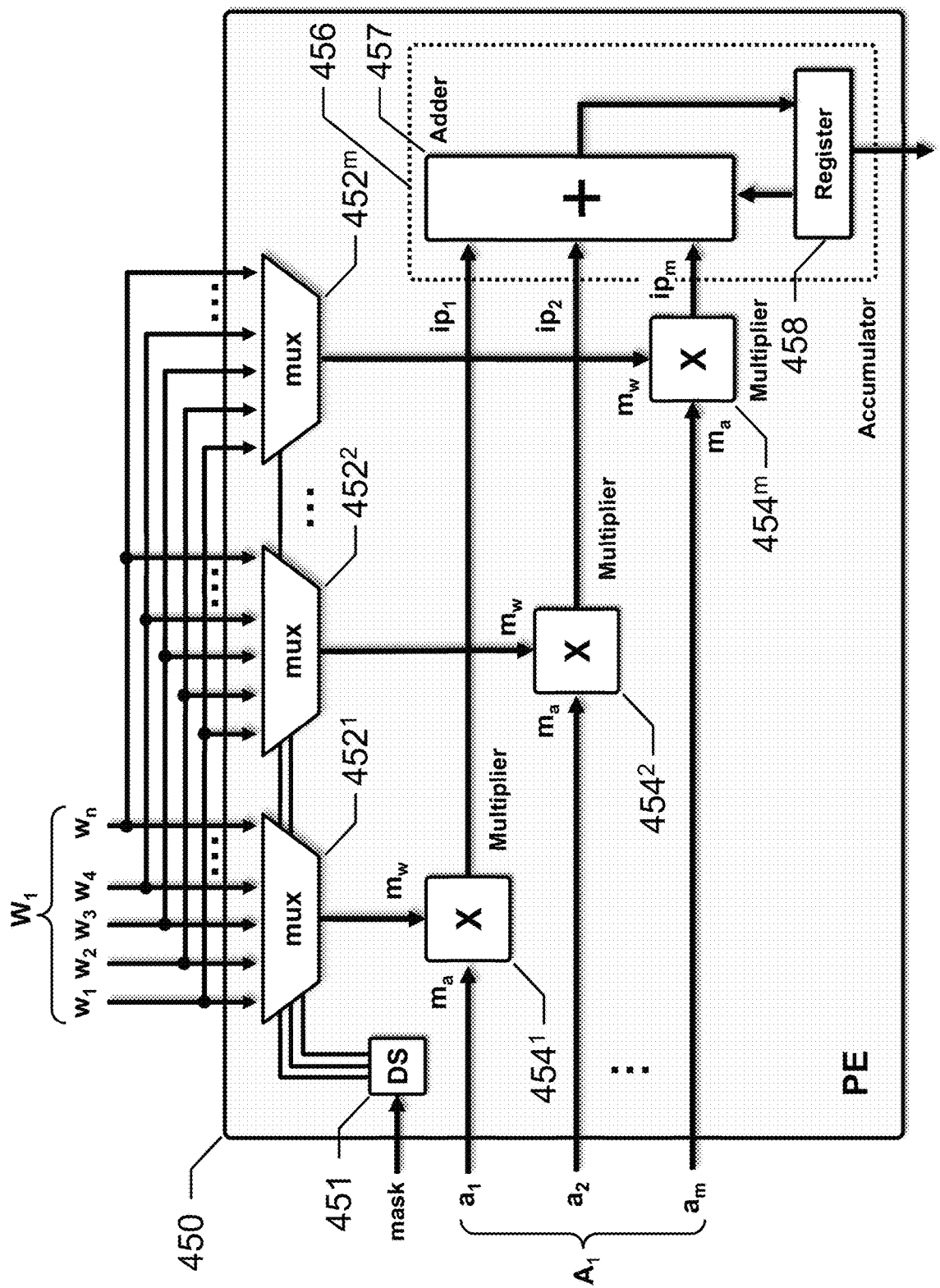
FIG. 12 depicts a block diagram of a processing engine (PE) for an MMA, in accordance with an embodiment of the present disclosure.

FIG. 12 depicts a block diagram of PE 450 for MMA 400, in accordance with an embodiment of the present disclosure. PE 450 represents one embodiment of a DAP MAC unit; other embodiments are also contemplated.

PE 450 includes data selection circuit 451, data selectors or multiplexers $452^1$, $452^2$, ..., $452^m$, multiplier circuits $454^1$, $454^2$, ..., $454^m$, and accumulator circuit 456 that includes adder circuit 457 and accumulator register 458. For the embodiment depicted in FIGS. 9, 10 and 11, "m" equals 2; other configurations are also contemplated. For clarity of discussion, PE 450 will be described with respect to this embodiment.

Data selection circuit 451 is coupled to scalar register 424 via a set of parallel data lines, and receives a mask or index, associated with a compressed basic block matrix 324, from scalar register 424. Data selection circuit 451 is configured to decode the mask by applying a bitmask, performing a bit shift operation, etc., and generate and send appropriate selection signals to multiplexers $452^1$ and $452^2$.

Multiplexers $452^1$ and $452^2$ are coupled to vector register 432 via "n" sets of parallel data lines. The number of parallel data line sets, "n," is equal to the number of weights in each weight group 322. In this embodiment, there are 4 weights in each weight group 322 and 4 sets of parallel data lines, so "n" equals 4. Each parallel data line set transfers one weight element from vector register 432 to each multiplexer $452^1$ and $452^2$. The number of parallel data lines in each set is equal to the size of the element in vector register 432, such as 8 for 8 bit integer data, 16 for 16-bit integer data, etc., as discussed above.

Multiplexers $452^1$ and $452^2$ are coupled to data selection circuit 451 via individual selection signal lines. Each selection signal line transmits a selection signal that commands the particular multiplexer $452^i$ to select a respective set of parallel data lines to output to an associated multiplier circuit $454^i$. In other words, each multiplexer $452^i$ selects an element from vector register 432, and provides that element to the associated multiplier circuit $454^i$. In this embodiment, multiplexer $452^1$ is coupled to multiplier circuit $454^1$ via a set of parallel data lines, and multiplexer $452^2$ is coupled to multiplier circuit $454^1$ via a set of parallel data lines.

Multiplier circuits $454^1$ and $454^2$ are coupled to vector register 422 via respective sets of parallel data lines. Each parallel data line set transfers one element of a compressed basic block matrix from vector register 422 to multiplier circuit $454^1$ or $454^2$. The number of parallel data lines in each set is equal to the size of the element in vector register 422, such as 8 for 8 bit integer data, 16 for 16-bit integer data, etc., as discussed above. Multiplier circuits $454^1$ and $454^2$ are also coupled to accumulator circuit 256 via respective sets of parallel data lines.

Multiplier circuit $454^1$ multiplies the data value, $m_a$, provided by vector register 422, and the data value, $m_w$, provided by associated multiplexer $452^1$ and outputs the resulting data value or intermediate product, $ip_1$, to accumulator circuit 456. The data values $m_a$ and $m_w$ and $ip_1$ have the same size, such as, for example, 8 bit integer, etc. Similarly, multiplier circuit $454^2$ multiplies the data value, $m_a$, provided by vector register 422, and the data value, $m_w$, provided by associated multiplexer $452^2$ and outputs the resulting data value or intermediate product, $ip_2$, to accumulator circuit 456.

Accumulator circuit 456 includes adder circuit 457 and accumulator register 458. Generally, adder circuit 457 adds the intermediate products $ip_1$ and $ip_2$ from multiplier circuits $454^1$ and $454^2$, and outputs the resulting data value to accumulator register 458. During each processing cycle, data selection circuit 451 performs a selection cycle, multiplier circuits $454^1$ and $454^2$ perform simultaneous multiply cycles, and accumulator circuit 456 then performs an add cycle. During the selection cycle, data selection circuit 451 determines, based on the mask or index, which elements of the weight group 322 correspond to the elements of the compressed basic block matrix 324, and generates and sends the appropriate selection signals to multiplexers $452^1$ and $452^2$, which select the appropriate parallel data lines. For this embodiment, the dot product calculation is complete after four processing cycles, and accumulator circuit 456 then outputs the data value to the corresponding element of vector register 442.

More particularly, and in the interest of brevity, a single dot product calculation cycle will be described using the PE 450 located in the first row and the first column (i.e., upper left corner) of PE array 402. This particular PE 450 corresponds to DAP MAC unit $DM_1$ in FIG. 9.

During processing cycle 1, multiplexers $452^1$ and $452^2$ each receive $w^1_1$, $w^1_5$, $w^1_9$, $w^1_{13}$ from vector register 432, multiplier circuit $454^1$ receives $a^1_1$ from vector register 422, multiplier circuit $454^1$ receives $a^3_1$ from vector register 422, and data selection circuit 451 receives mask "1010" from scalar register 424. Data selection circuit 451 determines that the first element, $w^1_1$, should be selected by multiplexer $452^1$ based on the first bit of the mask being set to 1, determines that the third element, $w^1_9$, should be selected by multiplexer $452^2$ based on the third bit of the mask being set to 1, and then generates and sends the appropriate selection signals to multiplexers $452^1$ and $452^2$.

Multiplexer $452^1$ receives a selection signal from data selection circuit 451, selects and outputs the first element, $w^1_1$, to multiplier circuit $454^1$. Multiplier circuit $454^1$ multiplies $w^1_1$ and $a^1_1$ to generate intermediate product $ip_1$, and sends intermediate product $ip_1$ to adder circuit 457. Multiplexer $452^2$ receives a selection signal from data selection circuit 451, selects and outputs the third element, $w^1_9$, to multiplier circuit $454^2$. Multiplier circuit $454^2$ multiplies $w^1_9$ and $a^3_1$ to generate intermediate product $ip_2$, and sends intermediate product $ip_2$ to adder circuit 457. Adder circuit 457 adds intermediate products $ip_1$, $ip_2$ and the value stored in accumulator register 458 (i.e., 0), and then outputs the resulting data value to accumulator register 458.

During processing cycle 2, multiplexers $452^1$ and $452^2$ each receive $w^1_2$, $w^1_6$, $w^1_{10}$, $w^1_{14}$ from vector register 432, multiplier circuit $454^1$ receives $a^2_2$ from vector register 422, multiplier circuit $454^1$ receives $a^4_2$ from vector register 422, and data selection circuit 451 receives mask "0101" from scalar register 424. Data selection circuit 451 determines that the second element, $w^1_6$, should be selected by multiplexer $452^1$ based on the second bit of the mask being set to 1, determines that the fourth element, $w^1_{14}$, should be selected by multiplexer $452^2$ based on the fourth bit of the mask being set to 1, and then generates and sends the appropriate selection signals to multiplexers $452^1$ and $452^2$.

Multiplexer $452^1$ receives a selection signal from data selection circuit 451, selects and outputs the second element, $w^1_6$, to multiplier circuit $454^1$. Multiplier circuit $454^1$ multiplies $w^1_6$ and $a^2_2$ to generate intermediate product $ip_1$, and sends intermediate product $ip_1$ to adder circuit 457. Multiplexer $452^2$ receives a selection signal from data selection circuit 451, selects and outputs the fourth element, $w^1_{14}$, to multiplier circuit $454^2$. Multiplier circuit $454^2$ multiplies $w^1_{14}$ and $a^4_2$ to generate intermediate product $ip_2$, and sends intermediate product $ip_2$ to adder circuit 457. Adder circuit 457 adds intermediate products $ip_1$, $ip_2$ and the value stored in accumulator register 458, and then outputs the resulting data value to accumulator register 458.

During processing cycle 3, multiplexers $452^1$ and $452^2$ each receive $w^1_3$, $w^1_7$, $w^1_{11}$, $w^1_{15}$ from vector register 432, multiplier circuit $454^1$ receives $a^2_6$ from vector register 422, multiplier circuit $454^1$ receives $a^4_6$ from vector register 422, and data selection circuit 451 receives mask "0101" from scalar register 424. Data selection circuit 451 determines that the second element, $w^1_7$, should be selected by multiplexer $452^1$ based on the second bit of the mask being set to 1, determines that the fourth element, $w^1_{15}$, should be selected by multiplexer $452^2$ based on the fourth bit of the mask being set to 1, and then generates and sends the appropriate selection signals to multiplexers $452^1$ and $452^2$.

Multiplexer $452^1$ receives a selection signal from data selection circuit 451, selects and outputs the second element, $w^1_7$, to multiplier circuit $454^1$. Multiplier circuit $454^1$ multiplies $w^1_7$ and $a^2_6$ to generate intermediate product $ip_1$, and sends intermediate product $ip_1$ to adder circuit 457. Multiplexer $452^2$ receives a selection signal from data selection circuit 451, selects and outputs the fourth element, $w^1_{15}$, to multiplier circuit $454^2$. Multiplier circuit $454^2$ multiplies $w^1_{15}$ and $a^4_6$ to generate intermediate product $ip_2$, and sends intermediate product $ip_2$ to adder circuit 457. Adder circuit 457 adds intermediate products $ip_1$, $ip_2$ and the value stored in accumulator register 458, and then outputs the resulting data value to accumulator register 458.

During processing cycle 4, multiplexers $452^1$ and $452^2$ each receive $w^1_4$, $w^1_8$, $w^1_{12}$, $w^1_{16}$ from vector register 432, multiplier circuit $454^1$ receives $a^1_7$ from vector register 422, multiplier circuit $454^1$ receives $a^4_7$ from vector register 422, and data selection circuit 451 receives mask "1001" from scalar register 424. Data selection circuit 451 determines that the first element, $w^1_4$, should be selected by multiplexer $452^1$ based on the first bit of the mask being set to 1, determines that the fourth element, $w^1_{16}$, should be selected by multiplexer $452^2$ based on the fourth bit of the mask being set to 1, and then generates and sends the appropriate selection signals to multiplexers $452^1$ and $452^2$.

Multiplexer $452^1$ receives a selection signal from data selection circuit 451, selects and outputs the first element, $w^1_4$, to multiplier circuit $454^1$. Multiplier circuit $454^1$ multiplies $w^1_4$ and $a^2_7$ to generate intermediate product $ip_1$, and sends intermediate product $ip_1$ to adder circuit 457. Multiplexer $452^2$ receives a selection signal from data selection circuit 451, selects and outputs the fourth element, $w^1_{16}$, to multiplier circuit $454^2$. Multiplier circuit $454^2$ multiplies $w^1_{16}$ and $a^4_7$ to generate intermediate product $ip_2$, and sends intermediate product $ip_2$ to adder circuit 457. Adder circuit 457 adds intermediate products $ip_1$, $ip_2$ and the value stored in accumulator register 458, and then outputs the resulting data value to accumulator register 458.

At the end of processing cycle 4, accumulator register 458 outputs the stored data value to vector register 442.

Figure 13:
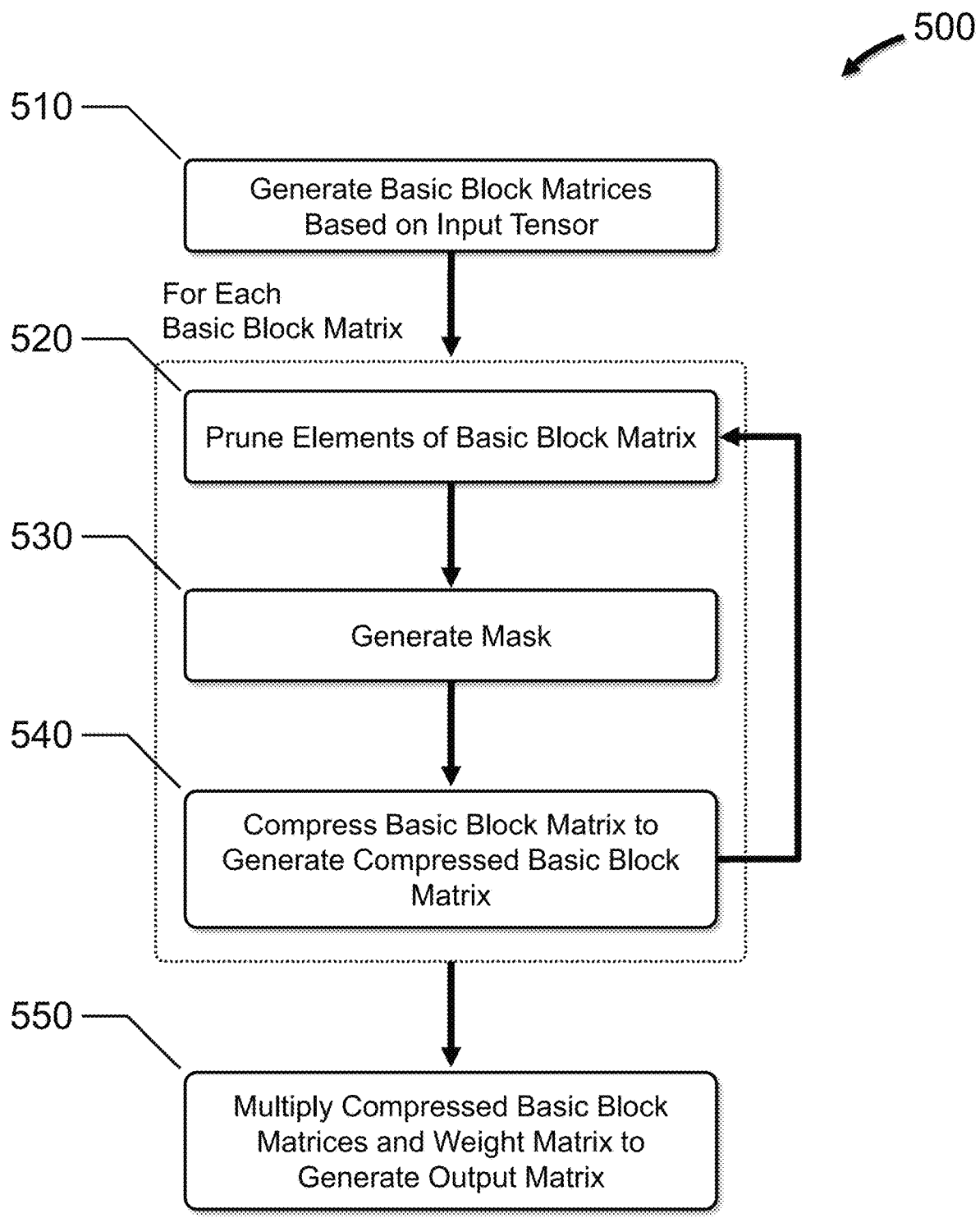
FIG. 13 depicts a flow diagram representing functionality associated with multiplying matrices, in accordance with embodiments of the present disclosure.

FIG. 13 depicts a flow diagram 500 representing functionality associated with multiplying matrices, in accordance with embodiments of the present disclosure.

At 510, a number of basic block matrices are generated based on an input tensor. Each basic block matrix includes a number of elements.

The functionality at 520, 530 and 540 is repeated for each basic block matrix.

At 520, the elements of the basic block matrix are pruned based on a sparsity value.

At 530, a mask is generated for the basic block matrix. The mask includes a number of bits. Each bit corresponds to a different element of the basic block matrix.

At 540, the basic block matrix is compressed to generate a compressed basic block matrix that has fewer elements than the basic block matrix.

At 550, the compressed basic block matrices and a weight matrix are multiplied, based on the masks, to generate an output matrix.

Embodiments of the present disclosure advantageously provide a system and method for multiplying matrices that significantly reduce "multiply by zero" conditions. Embodiments of the present disclosure are applicable to the multiplication of a dense matrix with a "sparse" matrix, and many embodiments accommodate any degree of sparsity ratio. The embodiments described above and summarized below are combinable.

In one embodiment, a system includes a processor coupled to a memory, and a matrix multiply accelerator (MMA) coupled to the processor and the memory. The processor is configured to generate, based on an input tensor, a number of basic block matrices, each basic block matrix including a number of elements; for each basic block matrix: prune, based on a sparsity value, the elements of the basic block matrix, generate a mask for the basic block matrix, each mask including a number of bits, each bit corresponding to a different element of the basic block matrix, and compress the basic block matrix to generate a compressed basic block matrix having fewer elements than the basic block matrix. The MMA is configured to multiply, based on the masks, the compressed basic block matrices and a weight matrix to generate an output matrix.

In another embodiment of the system, the sparsity value is a number greater than 0 and less than 1; and each bit in each mask has a value of 1 when the corresponding element of the basic block matrix is present within the compressed basic block matrix, and a value of 0 when the corresponding element of the basic block matrix is not present within the compressed basic block matrix.

In another embodiment of the system, the input tensor includes a number of input matrices, each input matrix has a same number of elements, and the number of input matrices is equal to a number of channels; the number of basic block matrices is equal to the number of input matrix elements, and each basic block matrix has a first dimension that is equal to 1 and a second dimension that is equal to a hyperparameter b; and each compressed basic block matrix has a first dimension that is equal to 1 and a second dimension that is less than the hyperparameter b.

In another embodiment of the system, the processor is further configured to flatten a number of weight tensors to generate the weight matrix, where each weight tensor has a first dimension, a second dimension, and a third dimension that is equal to the number of channels, and where each flattened weight tensor forms a row of the weight matrix.

In another embodiment of the system, the processor is further configured to convert the input tensor into a converted input data matrix based on a convolution operation, re-sequence each column of the converted input data matrix into a sequence of compressed basic block matrices, and re-sequence each row of the weight matrix into a sequence of weight groups based on the sequences of compressed basic block matrices; and the MMA is further configured to multiply, based on the masks, the sequences of compressed basic block matrices and the sequences of weight groups to generate the output matrix.

In another embodiment of the system, the MMA includes a first register configured to store the masks and the compressed basic block matrices; a second register configured to store the weight groups; a third register configured to store the output matrix; and an array of processing elements (PEs), coupled to the first, second and third registers, each PE configured to multiply, based on the masks, one sequence of compressed basic block matrices and one sequence of weight groups to generate one element of the output matrix.

In another embodiment of the system, each PE includes a first multiplexer configured to receive a weight group within the sequence of weight groups, and selectively output a first weight based on a first data selection signal; a second multiplexer configured to receive the weight group within the sequence of weight groups, and selectively output a second weight based on a second data selection signal; a data selection circuit, coupled to the first multiplexer and the second multiplexer, configured to receive the mask corresponding to a compressed basic block matrix within the sequence of compressed basic block matrices, generate the first data selection signal based on the mask, and generate the second data selection signal based on the mask; a first multiplier circuit, coupled to the first multiplexer, configured to receive a first element from the compressed basic block matrix and the first weight selectively output by the first multiplexer, multiply the first element and the first weight to generate a first intermediate product, and output the first intermediate product; a second multiplier circuit, coupled to the second multiplexer, configured to receive a second element from the compressed basic block matrix and the second weight selectively output by the second multiplexer, multiply the second element and the second weight to generate a second intermediate product, and output the second intermediate product; and an accumulator circuit, coupled to the first and second multiplier circuits, configured to receive the first and second intermediate products, and accumulate the first and second intermediate products into a value for one element of the output matrix.

In another embodiment of the system, each weight group includes at least four weights, each mask includes at least four bits, and each compressed basic block matrix includes at least two elements.

In another embodiment of the system, the system further includes a dynamic activation pruning (DAP) selection circuit, coupled to the processor, configured to generate the mask for each basic block matrix, the DAP selection circuit including a plurality of input registers, each input register including an enable bit and configured to store one basic block matrix element; a chain of magnitude compactors, coupled to the input registers, each magnitude compactor configured to receive two basic block matrix elements, determine which basic block matrix element has a greater magnitude, and then pass the basic block matrix element with the greater magnitude to a next magnitude compactor in the chain of magnitude compactors; and an output register including a plurality of output bits, each output bit corresponding to one of the input registers, where a final magnitude compactor in the chain of magnitude compactors is configured to set the respective output bit within the output register, and where the input register enable bit indicates whether the input register transmits or does not transmit the stored basic block matrix element to the chain of magnitude compactors.

In one embodiment, a computer-based method for multiplying matrices includes generating, based on an input tensor, a number of basic block matrices, each basic block matrix including a number of elements; for each basic block matrix: pruning, based on a sparsity value, the elements of the basic block matrix, generating a mask for the basic block matrix, the mask including a number of bits, each bit corresponding to a different element of the basic block matrix, and compressing the basic block matrix to generate a compressed basic block matrix having fewer elements than the basic block matrix; and multiplying, based on the masks, the compressed basic block matrices and a weight matrix to generate an output matrix.

In another embodiment of the computer-based method, the sparsity value is a number greater than 0 and less than 1; and each bit in each mask has a value of 1 when the corresponding element of the basic block matrix is present within the compressed basic block matrix, and a value of 0 when the corresponding element of the basic block matrix is not present within the compressed basic block matrix.

In another embodiment of the computer-based method, the input tensor includes a number of input matrices, each input matrix has a same number of elements, and the number of input matrices is equal to a number of channels; the number of basic block matrices is equal to the number of input matrix elements, and each basic block matrix has a first dimension that is equal to 1 and a second dimension that is equal to a hyperparameter b; and each compressed basic block matrix has a first dimension that is equal to 1 and a second dimension that is less than the hyperparameter b.

In another embodiment of the computer-based method, the method further includes flattening a number of weight tensors to generate the weight matrix, where each weight tensor has a first dimension, a second dimension, and a third dimension that is equal to the number of channels, and where each flattened weight tensor forms a row of the weight matrix.

In another embodiment of the computer-based method, the method further includes converting the input tensor into a converted input data matrix based on a convolution operation; re-sequencing each column of the converted input data matrix into a sequence of compressed basic block matrices; re-sequencing each row of the weight matrix into a sequence of weight groups based on the sequences of compressed basic block matrices; and multiplying, based on the masks, the sequences of compressed basic block matrices and the sequences of weight groups to generate the output matrix.

In another embodiment of the computer-based method, the multiplying is performed by an array of processing elements (PEs), each PE is configured to multiply, based on the masks, one sequence of compressed basic block matrices and one sequence of weight groups to generate one element of the output matrix.

In another embodiment of the computer-based method, each PE includes a first multiplexer configured to receive a weight group within the sequence of weight groups, and selectively output a first weight based on a first data selection signal; a second multiplexer configured to receive the weight group within the sequence of weight groups, and selectively output a second weight based on a second data selection signal; a data selection circuit, coupled to the first multiplexer and the second multiplexer, configured to receive the mask corresponding to a compressed basic block matrix within the sequence of compressed basic block matrices, generate the first data selection signal based on the mask, and generate the second data selection signal based on the mask; a first multiplier circuit, coupled to the first multiplexer, configured to receive a first element from the compressed basic block matrix and the first weight selectively output by the first multiplexer, multiply the first element and the first weight to generate a first intermediate product, and output the first intermediate product; a second multiplier circuit, coupled to the second multiplexer, configured to receive a second element from the compressed basic block matrix and the second weight selectively output by the second multiplexer, multiply the second element and the second weight to generate a second intermediate product, and output the second intermediate product; and an accumulator circuit, coupled to the first and second multiplier circuits, configured to receive the first and second intermediate products, and accumulate the first and second intermediate products into a value for one element of the output matrix.

In another embodiment of the computer-based method, each weight group includes at least four weights, each mask includes at least four bits, and each compressed basic block matrix includes at least two elements.

In one embodiment, a computer-based method for training a convolutional neural network (CNN) includes during a forward phase: providing a filter to a convolutional layer, the filter including a number of weight sets; providing input feature maps to a dynamic activation pruning (DAP) process; at the DAP process: generating, based on the input feature maps, a number of basic block matrices, each basic block matrix including a number of elements, pruning, based on a sparsity value, the elements of each basic block matrix, generating a mask for each basic block matrix, the mask including a number of bits, each bit corresponding to a different element of the basic block matrix, compressing each basic block matrix to generate a compressed basic block matrix having fewer elements than the basic block matrix, and providing the masks and the compressed basic block matrices to the convolutional layer; at the convolutional layer: multiplying, based on the masks, the compressed basic block matrices and the weight sets to generate output feature maps; during a backward phase: backpropagating gradients; and updating the weight sets.

In another embodiment of the computer-based training method, the sparsity value is a number greater than 0 and less than 1; and each bit in each mask has a value of 1 when the corresponding element of the basic block matrix is present within the compressed basic block matrix, and a value of 0 when the corresponding element of the basic block matrix is not present within the compressed basic block matrix In another embodiment of the computer-based training method, at the convolutional layer: flattening the weight sets to generate a weight matrix, each flattened weight set forming a row of the weight matrix; converting the input feature maps into a converted input data matrix based on a convolution operation; re-sequencing each column of the converted input data matrix into a sequence of compressed basic block matrices; re-sequencing each row of the weight matrix into a sequence of weight groups based on the sequences of compressed basic block matrices; multiplying, based on the masks, the sequences of compressed basic block matrices and the sequences of weight groups to generate an output data matrix; and generating the output feature maps based on the output data matrix.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A system, comprising:
a processor, coupled to a memory, configured to:
generate, based on an input tensor, a number of basic block matrices, each basic block matrix including a number of elements, the input tensor being an input feature map to a convolutional layer of a plurality of convolutional layers of a neural network and the elements of the basic block matrix being activation values, generate a sequence of compressed basic block matrices including, for each basic block matrix in a forward path of the convolutional layer:
dynamically prune the elements of the basic block matrix, the dynamic pruning of the elements of the basic block matrix including selecting a number k of the largest activation values of the basic block matrix based on the magnitude of the activation values and a sparsity value,
generate a mask for the basic block matrix, each mask including a number of bits, each bit in each mask having a first value when a corresponding activation value of the basic block matrix is one of the k largest activation values of basic block matrix, and having a second value when a corresponding activation value of the basic block matrix is not one of the k largest activation values of the basic block matrix, and
compress the basic block matrix to generate a compressed basic block matrix containing the k largest activation values of the basic block matrix; and
re-sequence each row of a weight matrix into a sequence of weight groups based on the sequences of compressed basic block matrices;

a matrix multiply accelerator (MMA), coupled to the processor and the memory, configured to:
multiply, based on the masks, the compressed basic block matrices and a weight matrix to generate an output matrix as an output feature map of the convolutional layer,
where the MMA includes:
a first register configured to store the masks and elements of a compressed basic block matrix;
a second register configured to store elements of the weight matrix;
a third register configured to store the output matrix;
an array of processing elements (PEs), coupled to the first, second and third registers, each PE including:
a first multiplexer configured to receive a weight group within the sequence of weight groups, and selectively output a first weight based on a first data selection signal;
a second multiplexer configured to receive the weight group within the sequence of weight groups, and selectively output a second weight based on a second data selection signal;
a data selection circuit, coupled to the first and second multiplexers, configured to receive a mask corresponding to a compressed basic block matrix within the sequence of compressed basic block matrices and generate the first and second data selection signals based on the mask;
a first multiplier circuit, coupled to the first multiplexer, configured to receive a first element from the compressed basic block matrix and the first weight selectively output by the first multiplexer, multiply the first element and the first weight to generate a first intermediate product, and output the first intermediate product;
a second multiplier circuit, coupled to the second multiplexer, configured to receive a second element from the compressed basic block matrix and the second weight selectively output by the second multiplexer, multiply the second element and the second weight to generate a second intermediate product, and output the second intermediate product; and
an accumulator circuit, coupled to the first and second multiplier circuits, configured to receive the first and second intermediate products and accumulate the first and second intermediate products into a value for one element of the output matrix.

2. The system according to claim 1, where:
the sparsity value is a number greater than 0 and less than 1; and
each bit in each mask has a value of 1 when the corresponding element of the basic block matrix is present within the compressed basic block matrix, and a value of 0 when the corresponding element of the basic block matrix is not present within the compressed basic block matrix.

3. The system according to claim 2, where:
the input tensor includes a number of input matrices, each input matrix has a same number of elements, and the number of input matrices is equal to a number of channels;
the number of basic block matrices is equal to the number of input matrix elements, and each basic block matrix has a first dimension that is equal to 1 and a second dimension that is equal to a hyperparameter b; and
each compressed basic block matrix has a first dimension that is equal to 1 and a second dimension that is less than the hyperparameter b.

4. The system according to claim 3, where the processor is further configured to:
flatten a number of weight tensors to generate the weight matrix,
where each weight tensor has a first dimension, a second dimension, and a third dimension that is equal to the number of channels, and
where each flattened weight tensor forms a row of the weight matrix.

5. The system according to claim 1, where:
the processor is further configured to:
convert the input tensor into a converted input data matrix based on a convolution operation, and
re-sequence each column of the converted input data matrix into a sequence of basic block matrices, and
the MMA is further configured to:
multiply, based on the masks, the sequences of compressed basic block matrices and the sequences of weight groups to generate the output matrix.

6. The system according to claim 1, where each weight group includes at least four weights, each mask includes at least four bits, and each compressed basic block matrix includes at least two elements.

7. The system according to claim 1, further comprising a dynamic activation pruning (DAP) selection circuit, coupled to the processor, configured to generate the mask for each basic block matrix, the DAP selection circuit including:
a plurality of input registers, each input register including an enable bit and configured to store one basic block matrix element;
a chain of magnitude compactors, coupled to the input registers, each magnitude compactor configured to receive two basic block matrix elements, determine which basic block matrix element has a greater magnitude, and then pass the basic block matrix element with the greater magnitude to a next magnitude compactor in the chain of magnitude compactors; and
an output register including a plurality of output bits, each output bit corresponding to one of the input registers, where a final magnitude compactor in the chain of magnitude compactors is configured to set the respective output bit within the output register, and
where the input register enable bit indicates whether the input register transmits or does not transmit the stored basic block matrix element to the chain of magnitude compactors.

8. A computer-based method for multiplying matrices, comprising:
generating, based on an input tensor, a number of basic block matrices, each basic block matrix including a number of elements, the input tensor being an input feature map to a convolutional layer of a plurality of convolutional layers of a neural network and the elements of the basic block matrix being activation values;
generating a sequence of compressed basic block matrices including, for each basic block matrix in a forward path of the convolutional layer:
dynamically pruning the elements of the basic block matrix, the dynamic pruning of the elements of the basic block matrix including selecting a number k of the largest activation values of the basic block matrix based on the magnitude of the activation values and a sparsity value,
generating a mask for the basic block matrix, the mask including a number of bits, each bit in each mask having a first value when a corresponding activation value of the basic block matrix is one of the k largest activation values of basic block matrix, and having a second value when a corresponding activation value of the basic block matrix is not one of the k largest activation values of the basic block matrix, and
compressing the basic block matrix to generate a compressed basic block matrix containing the k largest activation values of the basic block matrix; and
re-sequencing each row of a weight matrix into a sequence of weight groups based on the sequences of compressed basic block matrices;
multiplying, based on the masks, the compressed basic block matrices and a weight matrix to generate an output matrix as an input feature map of the convolutional layer, where said multiplying includes:
selecting, by a first multiplexer based on a first data selection signal, a first weight from a weight group within the sequence of weight groups;
selecting, by a second multiplexer based on a second data selection signal, a second weight from a weight group within the sequence of weight groups;
generating, by a data selection circuit based a mask corresponding to a compressed basic block matrix within the sequence of compressed basic block matrices, the first and second data selection signal;
multiplying, in a first multiplier circuit, a first element of the compressed basic block matrix and the first weight to produce a first intermediate product;
multiplying, in a second multiplier circuit, a second element of the compressed basic block matrix and the second weight to produce a second intermediate product; and
accumulating, by an accumulator circuit, the first and second intermediate products into a value for one element of the output matrix.

9. The computer-based method according to claim 8, where:
the sparsity value is a number greater than 0 and less than 1; and
each bit in each mask has a value of 1 when the corresponding element of the basic block matrix is present within the compressed basic block matrix, and a value of 0 when the corresponding element of the basic block matrix is not present within the compressed basic block matrix.

10. The computer-based method according to claim 9, where:
the input tensor includes a number of input matrices, each input matrix has a same number of elements, and the number of input matrices is equal to a number of channels;
the number of basic block matrices is equal to the number of input matrix elements, and each basic block matrix has a first dimension that is equal to 1 and a second dimension that is equal to a hyperparameter b; and
each compressed basic block matrix has a first dimension that is equal to 1 and a second dimension that is less than the hyperparameter b.

11. The computer-based method according to claim 10, further comprising:
flattening a number of weight tensors to generate the weight matrix,
where each weight tensor has a first dimension, a second dimension, and a third dimension that is equal to the number of channels, and
where each flattened weight tensor forms a row of the weight matrix.

12. The computer-based method according to claim 8, further comprising:
converting the input tensor into a converted input data matrix based on a convolution operation;
re-sequencing each column of the converted input data matrix into the sequence of compressed basic block matrices; and
multiplying, based on the masks, the sequences of compressed basic block matrices and the sequences of weight groups to generate the output matrix.

13. The computer-based method according to claim 12, where said multiplying is performed by an array of processing elements (PEs), each PE is configured to multiply, based on the masks, one sequence of compressed basic block matrices and one sequence of weight groups to generate one element of the output matrix.

14. The computer-based method according to claim 8, where each weight group includes at least four weights, each mask includes at least four bits, and each compressed basic block matrix includes at least two elements.

15. A computer-based method for training a convolutional neural network (CNN), comprising:
during a forward phase:
providing a filter to a convolutional layer, the filter including a number of weight sets;
providing input feature maps to a dynamic activation pruning (DAP) process;
at the DAP process, generating a sequence of compressed basic block matrices including, for each basic block matrix in the forward path of the convolutional layer:
generating, based on the input feature maps, a number of basic block matrices, each basic block matrix including a number of activation values,
dynamically pruning, based on a sparsity value, the activation values of each basic block matrix, where dynamically pruning of the activation values of each basic block matrix includes finding a number k of the largest activation values of the number of activation values;

generating a mask for each basic block matrix, the mask including a number of bits, each bit in each mask having a first value when a corresponding activation value of the basic block matrix is one of the k largest activation values of basic block matrix, and having a second value when a corresponding activation value of the basic block matrix is not one of the k largest values activation value of the basic block matrix, compressing each basic block matrix to generate a compressed basic block matrix containing the k largest activation values of the basic block matrix, and providing the masks and the compressed basic block matrices to the convolutional layer;

at the convolutional layer:
re-sequencing each row of a weight matrix into a sequence of weight groups based on the sequences of compressed basic block matrices;

multiplying, based on the masks, the compressed basic block matrices and the weight matrix to generate output feature maps, where said multiplying includes:

selecting, by a first multiplexer based on a first data selection signal, a first weight from a weight group within the sequence of weight groups;

selecting, by a second multiplexer based on a second data selection signal, a second weight from a weight group within the sequence of weight groups;

generating, by a data selection circuit based a mask corresponding to a compressed basic block matrix within the sequence of compressed basic block matrices, the first and second data selection signal;

multiplying, in a first multiplier circuit, a first element of the compressed basic block matrix and the first weight to produce a first intermediate product;

multiplying, in a second multiplier circuit, a second element of the compressed basic block matrix and the second weight to produce a second intermediate product; and accumulating, by an accumulator circuit, the first and second intermediate products into a value for one element of the output matrix; and during a backward phase:
backpropagating gradients; and
updating the number of weight sets.

16. The computer-based method according to claim 15, where the sparsity value is a number greater than 0 and less than 1; and each bit in each mask has a value of 1 when the corresponding element of the basic block matrix is present within the compressed basic block matrix, and a value of 0 when the corresponding element of the basic block matrix is not present within the compressed basic block matrix.

17. The computer-based method according to claim 16, further comprising:

at the convolutional layer:
flattening the number of weight sets to generate the weight matrix, each flattened weight set forming a row of the weight matrix;

converting the input feature maps into a converted input data matrix based on a convolution operation;

re-sequencing each column of the converted input data matrix into the sequence of compressed basic block matrices;

multiplying, based on the masks, the sequences of compressed basic block matrices and the sequences of weight groups to generate an output data matrix; and generating the output feature maps based on the output data matrix.

* * * * *